(12) United States Patent
Park et al.

(10) Patent No.: US 12,063,624 B2
(45) Date of Patent: Aug. 13, 2024

(54) SELECTION OF RADIO ACCESS TECHNOLOGIES FOR V2X MESSAGES

(71) Applicant: SHARP KABUSHIKI KAISHA, Sakai (JP)

(72) Inventors: Kenneth James Park, Sakai (JP); Tatsushi Aiba, Sakai (JP); Jia Sheng, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 523 days.

(21) Appl. No.: 17/274,780

(22) PCT Filed: Sep. 12, 2019

(86) PCT No.: PCT/JP2019/035942
§ 371 (c)(1),
(2) Date: Mar. 9, 2021

(87) PCT Pub. No.: WO2020/054812
PCT Pub. Date: Mar. 19, 2020

(65) Prior Publication Data
US 2022/0053458 A1 Feb. 17, 2022

Related U.S. Application Data

(60) Provisional application No. 62/730,851, filed on Sep. 13, 2018.

(51) Int. Cl.
*H04W 72/02* (2009.01)
*H04W 4/12* (2009.01)
(Continued)

(52) U.S. Cl.
CPC ............. *H04W 72/02* (2013.01); *H04W 4/12* (2013.01); *H04W 4/40* (2018.02); *H04W 72/542* (2023.01); *H04W 92/18* (2013.01)

(58) Field of Classification Search
None
See application file for complete search history.

(56) References Cited

U.S. PATENT DOCUMENTS 10,827,380 B2 * 11/2020 Rao .................. H04W 28/0268
2019/0082421 A1 * 3/2019 Sartori ................. H04W 48/16
(Continued)

FOREIGN PATENT DOCUMENTS

WO 2017/179286 A 10/2017
WO 2017/195531 A 11/2017
(Continued)

OTHER PUBLICATIONS

3GPP TS 23.285, "3rd Generation Partnership Project; Technical Specification Group Services and System Aspects; Architecture enhancements for V2X services (Release 15)", V15.1.0 (Jun. 2018).
(Continued)

*Primary Examiner* — Eunsook Choi
(74) *Attorney, Agent, or Firm* — ScienBiziP, P.C.

(57) ABSTRACT

A user equipment participates in vehicle-to-anything (V2X) communications. The user equipment comprises processor circuitry and a transmitter and/or receiver. The processor circuitry configured is to autonomously make a selection of a radio resource(s) for transmission and/or reception of a V2X message of the V2X communication in dependence upon a characteristic of the V2X message. The transmitter and/or receiver is configured to use the selected radio resource(s) for the transmission and/or reception of the V2X message.

12 Claims, 19 Drawing Sheets

AUTONOMOUSLY MAKING A SELECTION, FROM RADIO RESOURCES OF AT LEAST TWO RADIO ACCESS TECHNOLOGIES, OF A SELECTED RADIO RESOURCE(S) FOR TRANSMISSION AND/OR RECEPTION OF A V2X MESSAGE OF THE V2X COMMUNICATION IN DEPENDENCE UPON A CHARACTERISTIC OF THE V2X MESSAGE — 5A-1

USING THE SELECTED RADIO RESOURCE(S) FOR THE TRANSMISSION AND/OR RECEPTION OF THE V2X MESSAGE — 5A-2

(51) Int. Cl.
  *H04W 4/40* (2018.01)
  *H04W 72/542* (2023.01)
  *H04W 72/08* (2009.01)
  *H04W 92/18* (2009.01)

(56) References Cited

U.S. PATENT DOCUMENTS

2022/0287024 A1* 9/2022 Hahn .................... H04W 72/51
2022/0322369 A1* 10/2022 Wu ........................ H04L 5/0053
2022/0417867 A1* 12/2022 Yoshioka .......... H04W 72/1263

FOREIGN PATENT DOCUMENTS

WO    2018/016157 A    1/2018
WO    2018/058594 A    4/2018

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 13)", V13.0.0 (Dec. 2015).

LG Electronics et al., "New SI proposal: Feasibility Study on LTE-based V2X Services", 3GPP TSG RAN Meeting #68 Malmo, Sweden, Jun. 15-18, 2015, RP-151109.

LG Electronics et al., "New WI proposal: Support for V2V services based on LTE sidelink", 3GPP TSG RAN Meeting #70 Sitges, Spain, Dec. 7-10, 2015, RP-152293.

3GPP TR 38.913, "3rd Generation Partnership Project; Technical Specification Group Radio Access Network; Study on Scenarios and Requirements for Next Generation Access Technologies; (Release 15)", V15.0.0 (Jun. 2018).

3GPP TR 22.885, "3rd Generation Partnership Project; Technical Specification Group Services and System Aspects; Study on LTE support for Vehicle to Everything (V2X) services (Release 14)", V14.0.0 (Dec. 2015).

LG Electronics et al., "New WI proposal: LTE-based V2X Services", 3GPP TSG RAN Meeting #72 Busan, South Korea, Jun. 13-16, 2016, RP-161298.

* cited by examiner

```
┌─────────────────────────────────────────────────────┐
│  AUTONOMOUSLY MAKING A SELECTION, FROM RADIO        │
│  RESOURCES OF AT LEAST TWO RADIO ACCESS             │
│  TECHNOLOGIES, OF A SELECTED RADIO RESOURCE(S) FOR  │ 5A-1
│  TRANSMISSION AND/OR RECEPTION OF A V2X MESSAGE OF  │
│  THE V2X COMMUNICATION IN DEPENDENCE UPON A         │
│  CHARACTERISTIC OF THE V2X MESSAGE                  │
└─────────────────────────────────────────────────────┘
                            │
                            ▼
┌─────────────────────────────────────────────────────┐
│  USING THE SELECTED RADIO RESOURCE(S) FOR THE       │ 5A-2
│  TRANSMISSION AND/OR RECEPTION OF THE V2X MESSAGE   │
└─────────────────────────────────────────────────────┘
```

*Fig. 5A*

```
┌─────────────────────────────────────────────────────┐
│  AUTONOMOUSLY MAKING A SELECTION OF A SELECTED      │
│  RADIO RESOURCE(S) FOR TRANSMISSION AND/OR RECEPTION│
│  OF A V2X MESSAGE OF THE V2X COMMUNICATION IN       │ 5B-1
│  DEPENDENCE UPON A CHARACTERISTIC OF THE V2X        │
│  MESSAGE, THE CHARACTERISTIC OF THE V2X MESSAGE     │
│  COMPRISES AT LEAST ONE OF MESSAGE PROTOCOL AND     │
│  MESSAGE TYPE                                       │
└─────────────────────────────────────────────────────┘
                            │
                            ▼
┌─────────────────────────────────────────────────────┐
│  USING THE SELECTED RADIO RESOURCE(S) FOR THE       │ 5B-2
│  TRANSMISSION AND/OR RECEPTION OF THE V2X MESSAGE   │
└─────────────────────────────────────────────────────┘
```

*Fig. 5B*

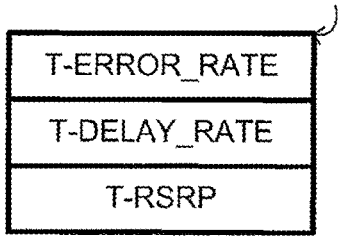

*Fig. 6A*

```
-- ASN1START

SystemInformationBlockTypeX-NR-V2X choice {
    sl-V2X-Config-LTE           SL-V2X-Config-LTE
    sl-V2X-Config-NR            SL-V2X-Config-NR
}

SL-V2X-Config-LTE ::=  SEQUENCE {
    v2x-RxPool-LTE                      SL-CommRxPoolListV2X-LTE-r14
    v2x-TxPool-LTE                      SL-CommTxPoolListV2X-LTE-r14
    v2x-ResourceSelectionConfig-r14     SL-CommTxPoolSensingConfig-r14
    v2x-SyncConfig-r14                  SL-SyncConfigListV2X-r14            OPTIONAL,  -- Need OR
    v2x-InterFreqInfoList-r14           SL-InterFreqInfoListV2X-r14         OPTIONAL,  -- Need OR
    zoneConfig-r14                      SL-ZoneConfig-r14                   OPTIONAL,  -- Need OR
    typeTxSync-r14                      SL-TypeTxSync-r14                   OPTIONAL,  -- Need OR
    thresSL-TxPrioritization-r14        SL-Priority-r13                     OPTIONAL,  -- Need OR
    anchorCarrierFreqList-r14           SL-AnchorCarrierFreqList-V2X-r14    OPTIONAL,  -- Need OR
    offsetDFN-r14                       INTEGER (0..1000)                   OPTIONAL,  -- Need OR
    cbr-CommonTxConfigList-r14          SL-CBR-CommonTxConfigList-r14       OPTIONAL   -- Need OR
}

SL-V2X-Config-NR ::=  SEQUENCE {
    v2x-RxPool-NR                       SL-CommRxPoolListV2X-NR-r16
    v2x-TxPool-NR                       SL-CommTxPoolListV2X-NR-r16
    v2x-ResourceSelectionConfig-r16     SL-CommTxPoolSensingConfig-r16
    V2X-ConfigCommon                    SL-CommConfig
}

-- ASN1STOP
```

Fig. 11

```
-- ASN1START

SL-ConfigCommon ::=            SEQUENCE {
    ssb-PositionsInBurst           CHOICE {
        shortBitmap                    BIT STRING (SIZE (4)),
        mediumBitmap                   BIT STRING (SIZE (8)),
        longBitmap                     BIT STRING (SIZE (64))
    }
    ssb-periodicityServingCell     ENUMERATED { ms5, ms10, ms20, ms40, ms80, ms160}
    subcarrierSpacing              SubcarrierSpacing
    ss-PBCH-BlockPower             INTEGER (-60..50), v2x-SyncConfig-r16                 SL-SyncConfigListV2X-r16               OPTIONAL, -- Need OR
    v2x-InterFreqInfolist-r16          SL-InterFreqInfolistV2X-r16            OPTIONAL, -- Need OR
    zoneConfig-r16                     SL-ZoneConfig-r16                      OPTIONAL, -- Need OR
    typeTxSync-r16                     SL-TypeTxSync-r16                      OPTIONAL, -- Need OR
    thresSL-TxPrioritization-r16       SL-Priority-r16                        OPTIONAL, -- Need OR
    anchorCarrierFreqList-r16          SL-AnchorCarrierFreqList-V2X-r16       OPTIONAL, -- Need OR
    offsetDFN-r16                      INTEGER (0..1000)                      OPTIONAL, -- Need OR
    cbr-CommonTxConfigList-r16         SL-CBR-CommonTxConfigList-r16          OPTIONAL  -- Need OR
}

-- ASN1STOP
```

Fig. 12

SELECTION OF RADIO ACCESS TECHNOLOGIES FOR V2X MESSAGES

CROSS-REFERENCE TO RELATED APPLICATION(S)

This application is a national stage application of International Patent Application PCT/JP2019/035942, filed Sep. 12, 2019, now published as WO 2020/054812 A1. International Patent Application PCT/JP2019/035942 claims the benefit of U.S. Provisional Patent Application 62/730,851, filed Sep. 13, 2018. U.S. Provisional Patent Application 62/730,851 and International Patent Application PCT/JP2019/035942, now published as WO 2020/054812 A1, are incorporated herein by reference.

TECHNICAL FIELD

The technology relates to wireless communications, and particularly to selecting radio resources for a vehicle (V2X) communications messages.

BACKGROUND ART

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals" or "communications") from one user equipment terminal to one or more other user equipment terminals may not be communicated through a base station or other network control device of a telecommunications system. "Device-to-device ("D2D") communication may also be known as "sidelink direct" communication (e.g., sidelink communication), or even as "sidelink", "SL", or "SLD" communication.

D2D or sidelink direct communication can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices.

3GPP Rel-14 specified a feature that covers use cases and potential requirements for LTE support for vehicular communications services (represented by the term, Vehicle-to-Everything (V2X) Services). The feature is documented in the TR 22.885 on LTE Study on LTE Support for V2X Services. V2X services may include one or more of the following:

V2V: covering LTE-based communication between vehicles.

V2P: covering LTE-based communication between a vehicle and a device carried by an individual (e.g. handheld terminal carried by a pedestrian, cyclist, driver or passenger).

V2I: covering LTE-based communication between a vehicle and a roadside unit. A roadside unit (RSU) is a transportation infrastructure entity (e.g. an entity transmitting speed notifications).

Thus far 3GPP deliberations concerning synchronization for vehicle-to-vehicle (V2V) communications have essentially assumed reuse of LTE sidelink for V2V, e.g., assumed that the V2V communications will essentially be indistinct from sidelink direct communications in the access stratum (AS), e.g., may use the same radio access interface between user equipments, UEs, such as the PC5 interface. As such, it has generally been assumed that the LTE 3GPP resource selection design for SLD would be reused for V2X communication as much as possible. On the other hand, there are still numerous differences between V2X and D2D, such as higher V2X user equipment (UE) density and much higher V2X UE velocity.

What is needed are methods, apparatus, and/or techniques for selecting radio resources for a V2X messages involved in vehicle (V2X) communications.

SUMMARY OF INVENTION

In one example, a user equipment which participates in vehicle-to-anything (V2X) communications, comprising: processor circuitry configured to autonomously make a selection of a selected radio resource(s) for transmission and/or reception of a V2X message of the V2X communication in dependence upon a characteristic of the V2X message; a transmitter and/or receiver configured to use the selected radio resource(s) for the transmission and/or reception of the V2X message.

In one example, a method in a user equipment which participates in vehicle-to-anything (V2X) communications, the method comprising: using processor circuitry configured to autonomously make a selection of a selected radio resource(s) for transmission and/or reception of a V2X message of the V2X communication in dependence upon a characteristic of the V2X message; using the selected radio resource(s) for the transmission and/or reception of the V2X message.

In one example, a node of a radio network comprising: processor circuitry configured to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message; transmitter circuitry configured to transmit the message comprising the index table over a radio interface to the user equipment.

In one example, a method in a node of a radio network comprising: using processor circuitry to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message; transmitting the message comprising the index table over a radio interface to the user equipment.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 5A is a flowchart showing basic, representative acts or steps performed by the user equipment of FIG. 4 in selecting radio resources for a V2X message according to a first example embodiment and mode wherein the selection is made from radio resources of plural radio access technologies.

FIG. 5B is a flowchart showing basic, representative acts or steps performed by the user equipment of FIG. 4 in selecting radio resources for a V2X message according to a second example embodiment and mode wherein radio access technology is not selection factor.

FIG. 6A is a diagrammatic view of an example set of thresholds which may be used by the user equipment of FIG. 4 in making a selection of radio resources for a V2X message.

FIG. 11 is a diagrammatic view of an example, non-limiting illustration of a SIB "SIBx-NR-V2X", e.g., a SystemInformationBlockTypeX-NR-V2X that comprises V2X sidelink communication configuration.

FIG. 12 is a diagrammatic view of an example, non-limiting illustration of a "SL-CommConfig" information element.

DESCRIPTION OF EMBODIMENTS

Figure 1:
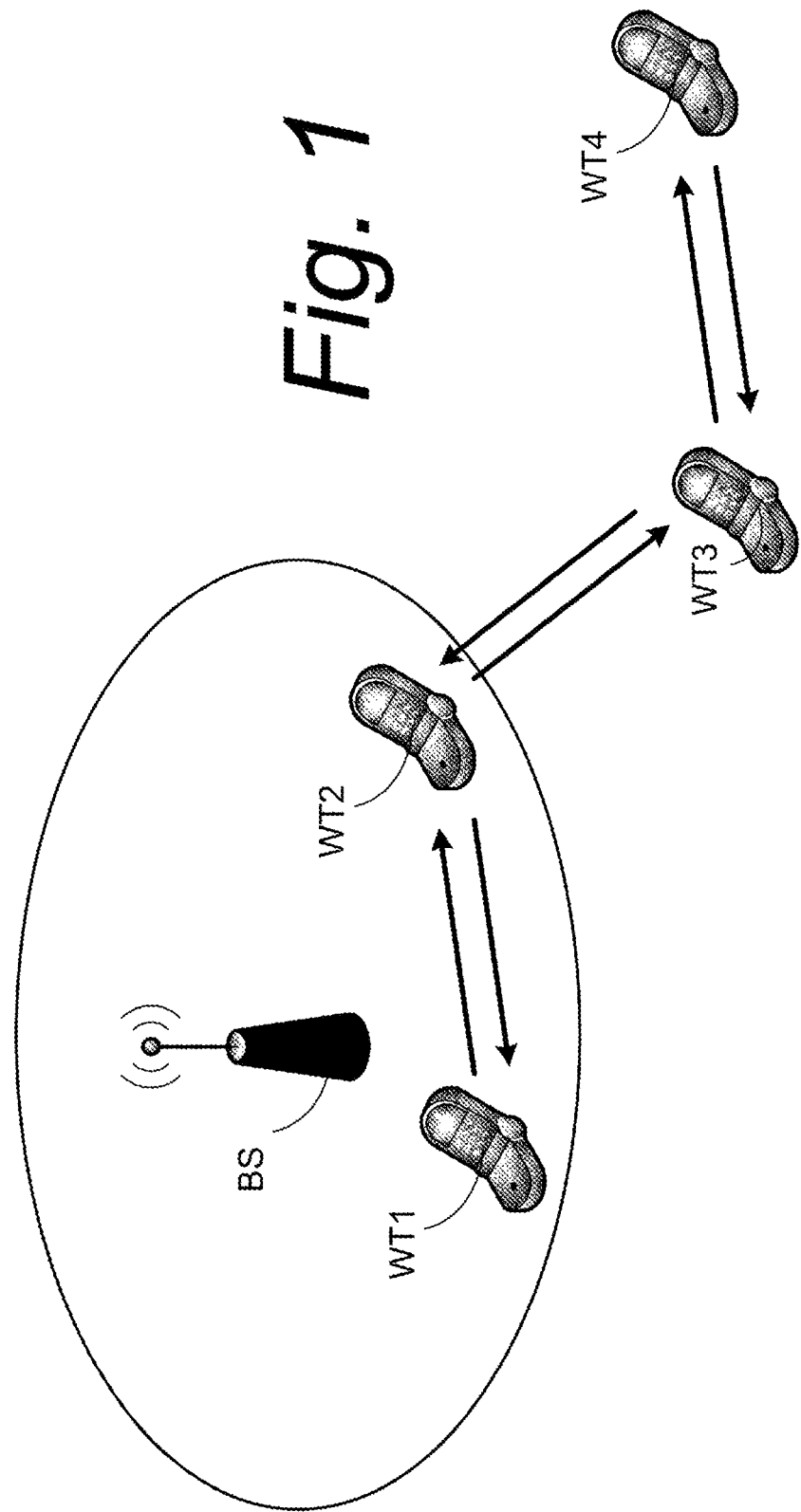
FIG. 1 is a diagrammatic view showing generally three scenarios which may occur in vehicle (V2X) communication, i.e., an in coverage vehicle (V2X) communication scenario; a partial coverage vehicle (V2X) communication scenario; and an out-of-coverage vehicle (V2X) communication scenario.

In one of its example aspects the technology disclosed herein concerns a user equipment which participates in vehicle-to-anything (V2X) communications and a method in the user equipment. In a generic example embodiment and mode the user equipment comprises processor circuitry and a transmitter and/or receiver. The processor circuitry configured is to autonomously make a selection of a selected radio resource(s) for transmission and/or reception of a V2X message of the V2X communication in dependence upon a characteristic of the V2X message. The characteristic of the V2X message comprises at least one of message protocol and message type. The selection may be made from radio resources of at least two radio access technologies, or from radio resources of a same radio access technology. The transmitter and/or receiver is configured to use the selected radio resource(s) for the transmission and/or reception of the V2X message. In another of its example aspects the threshold concerns a method of operating such user equipment.

In one of its example aspects the technology disclosed herein concerns a node of a core network and a method in the node. In a generic example embodiment and mode the core network node comprises processor circuitry and interface circuitry. The processor circuitry is configured to include, in a message, an index table which associates a characteristic of a V2X message with an index. The index is configured for use by a wireless terminal to access an appropriate set of thresholds of a table of thresholds. The table of thresholds is configured for use by the wireless terminal in an attempt to make a selection of a radio resource(s) for transmission and/or reception of the V2X message. Transmitter circuitry is configured to transmit the message comprising the index table over a radio interface to the user equipment. The processor circuitry may optionally be further configured to include in the message a Network Preference parameter. The Network Preference parameter is configured for use by the wireless terminal to select the radio resource(s) for transmission and/or reception of a V2X message when the attempt to make the selection using the table of thresholds is unsuccessful. In another of its example aspects the threshold concerns a method of operating such node.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "device-to-device (" D2D") communication" may refer to a mode of communication between or among wireless terminals that operate on a cellular network or other telecommunications system in which the communication data traffic from one wireless terminal to another wireless terminal does not pass through a centralized base station or other device in the cellular network or other telecommunications system. The "device-to-device (D2D) communication" encompasses one or both of D2D signaling (e.g., D2D control information) and D2D data. "Device-to-device ("D2D") communication may also be known as "sidelink direct" communication (e.g., sidelink communication). The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, 13, and thereafter), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Vehicle (V2X) communication is described in one or more of the following (all of which are incorporated herein by reference in their entirety):

3GPP TS 36.331 V13.0.0 "Evolved Universal Terrestrial Radio Access (E-UTRA); Radio Resource Control (RRC); Protocol specification", including but not limited to § 5.10.3 (Sidelink communication monitoring), § 5.10.4 (Sidelink communication transmission), and § 9.3.2 (pre-configurable parameters).

RP-151109, Feasibility Study on LTE-based V2X Services 3GPP TSG RAN Meeting #68, Malmö, Sweden, Jun. 15-18, 2015.

RP-152293, Support for V2V services based on LTE sidelink, 3GPP TSG RAN Meeting #70, Sitges, Spain, Dec. 7-10, 2015.

3GPP TSG RAN WG1 Meeting #84bis, Busan, Korea 11-15 Apr. 2016, Chairman notes.

3GPP TR 22.885 V14.0.0 3rd Generation Partnership Project; Technical Specification Group Services and System Aspects; Study on LTE Support for V2X Services (Release 14).

Chairman's Notes, RAN1 #85, Nanjing, China, May 23-May 27, 2016.

RP-161298, "LTE based V2X Services", Busan, South Korea, Jun. 13-16, 2016.

Chairman's Notes, RAN1 #86, Gothenburg, Sweden, Aug. 22-26, 2016.

Vehicle (V2X) communication is a communication that involves a radio connection established between a transmit device and a receive device (e.g., a wireless terminal or UE), which radio communication may or may not transit via a base station node of the network, with at least of one the transmit device and the receive device being mobile, e.g., capable of being moved. Generic V2X encompasses one or more of vehicle to infrastructure (V2I) communication; vehicle to person/pedestrian (V2P) communication; and vehicle to vehicle (V2V) communication. It is understood in the art, and intended herein, that V2X refers to both V2X and X2V; that V2I refers to both V2I and I2V; that V2P refers to both V2P and P2V; and so forth.

Generally, there are three general scenarios which may occur in vehicle (V2X) communication. Those three general vehicle (V2X) communications scenarios are illustrated in FIG. 1. A first vehicle (V2X) communication scenario is an "in coverage" vehicle (V2X) communication scenario, illustrated between WT1 and WT2 of FIG. 1, in which both WT1 and WT2 are within coverage of the cellular radio access network. A second vehicle (V2X) communication scenario is a "partial coverage" scenario, illustrated between WT2 and WT3 of FIG. 1. In the "partial coverage" vehicle (V2X) communication scenario the wireless terminal WT2 is within coverage of the cellular radio access network, but the wireless terminal WT3 is out-of-coverage of the cellular radio access network. A third vehicle (V2X) communication scenario is an "out-of-coverage" scenario, illustrated between wireless terminal WT3 and wireless terminal WT4 of FIG. 1. In the out-of-coverage vehicle (V2X) communication scenario both the wireless terminal WT3 and the wireless terminal WT4 are out-of-coverage of the cellular radio access network.

The three vehicle (V2X) communication scenarios are described with reference to whether or not a participating wireless terminals (e.g., WTs) are "in coverage" or "out-of-coverage" of one or more cellular radio access networks (which may collectively be referred to as a "cellular radio access network"). For sake of simplicity FIG. 1 depicts "coverage" as being with respect to an access node BS such as eNodeB which comprises a cellular radio access network. It should be understood, however, that a wireless terminal may also be in coverage of the cellular radio access network when served by any cell of the cellular radio access network(s). For example, if wireless terminal WT1 and wireless terminal WT2 were served by different cells, when participating in vehicle (V2X) communication the wireless terminal WT1 and wireless terminal WT2 would still be in an in coverage vehicle (V2X) communication scenario.

Figure 2:
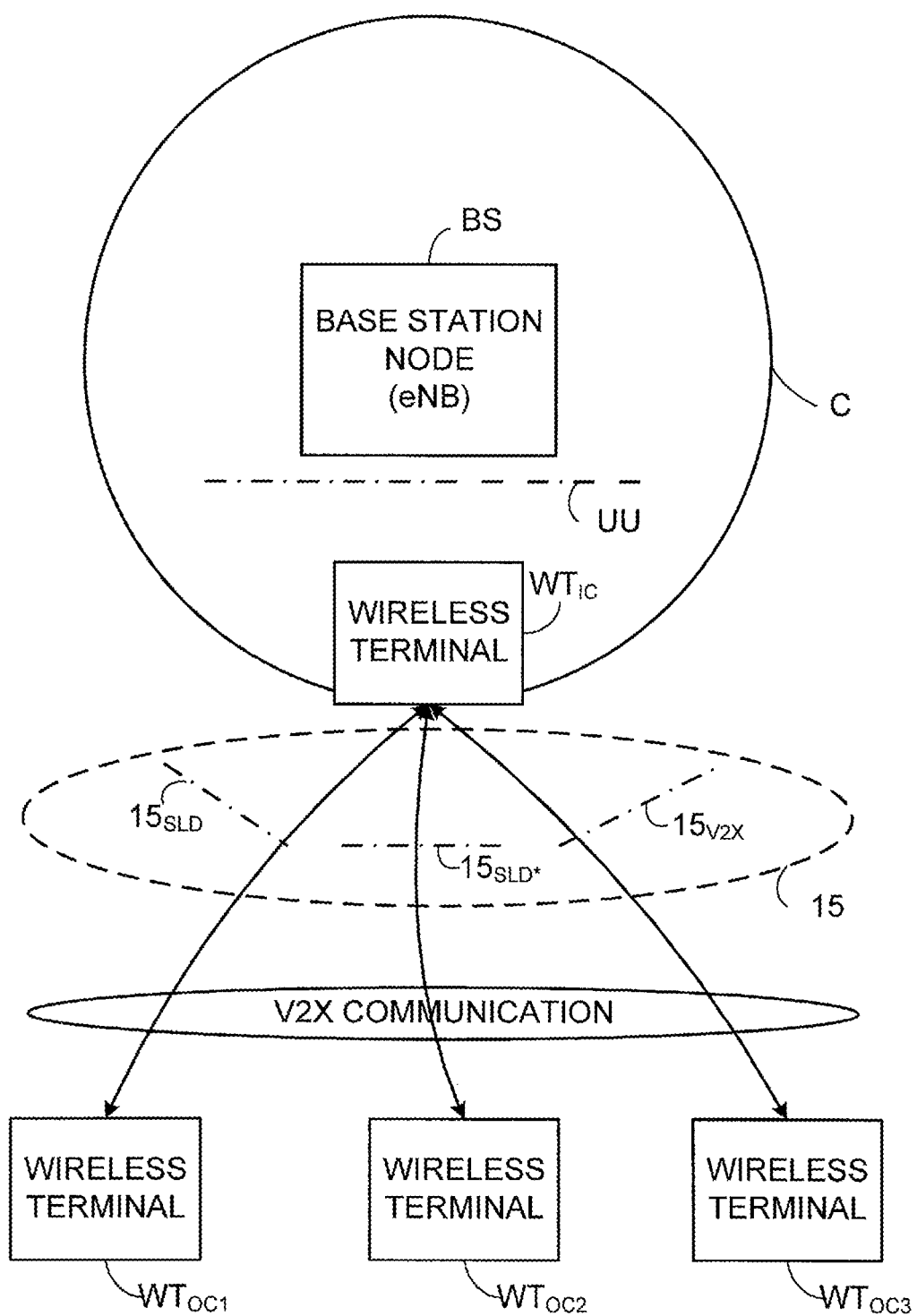
FIG. 2 is a diagrammatic view showing that, in differing implementations, V2X communication may be implemented either in conjunction with sidelink direct (SLD) communication, in conjunction with enhanced SLD, or apart from SLD as a separate V2X communication protocol.

As used herein and as illustrated in FIG. 2, V2X communication may be implemented in several ways. For illustrative context, FIG. 2 illustrates a base station node BS of a cellular radio access network which serves a cell C. The base station BS may communicate with a wireless terminal $WT_{IC}$ which is in coverage of the cellular radio access network over a radio interface UU. FIG. 2 further shows that wireless terminal $WT_{IC}$ may engage in vehicle (V2X) communication with one or more other wireless terminals which are outside of coverage of the cellular radio access network, particularly wireless terminal $WT_{OC1}$, wireless terminal $WT_{OC2}$, and wireless terminal $WT_{OC3}$. It is assumed that either wireless terminal $WT_{IC}$, or all of wireless terminal $WT_{OC1}$, wireless terminal $WT_{OC2}$, and wireless terminal $WT_{OC3}$ are mobile terminals for the communication to be vehicle (V2X) communication. Being "mobile" means that the wireless terminal is provided or situated in/with a mobile entity, such as a vehicle or a person.

As a first example implementation, V2X communication may be implemented using applications and resources of the type that were utilized for sidelink direct (SLD) communication (also known as device-to-device ("D2D") communication) before introduction of vehicle (V2X) communication. For example, when implemented as part of SLD communication the V2X communication may use resources and channels of the SLD communication scheme. In such first implementation the V2X communication may be said to be implemented using pre-V2X sidelink direct (SLD) protocol and over a pre-V2X sidelink direct (SLD) radio interface 15SLD.

As a second example implementation, V2X communication may be implemented using enhanced applications and enhanced resources utilized for sidelink direct (SLD) communication, e.g., sidelink direct communications augmented or enhanced with additional capabilities to accommodate vehicle (V2X) communication. In such second implementation the V2X communication may be said to be implemented using enhanced sidelink direct (SLD) protocol and over an enhanced sidelink direct (SLD) radio interface 15SLD*.

As a third example implementation, V2X communication may operate separately from sidelink direct (SLD) communication by, e.g., having separate and dedicated V2X communication resources and channels, and by being performed using application software which is specific to V2X communication. In such third implementation the V2X communication may be said to be implemented using separate vehicle (V2X) communications protocol and over a separate vehicle (V2X) communication radio interface 15V2X.

The fact that three example implementations are illustrated in FIG. 2 does not mean that a particular wireless terminal has to participate in all three or even two of the example implementations. FIG. 2 simply indicates the expansive meaning of the term vehicle (V2X) communication and that the technology disclosed herein encompasses vehicle (V2X) communication in all of its various existing and potential implementations.

In sidelink direct communications, a scheduling assignment (SA) is used to indicate the data radio resources that may be used to carry data in a sidelink direct transmission, e.g., to a receiving wireless terminal. As such, there may be one or more pools of scheduling assignment (SA) radio resources that are used to carry the scheduling assignment (SA) information, with the scheduling assignment (SA) resources being different than the data radio resources that are described by the scheduling assignment (SA). The data radio resources typically belong to a data pool (of data radio resources).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

Figure 3:
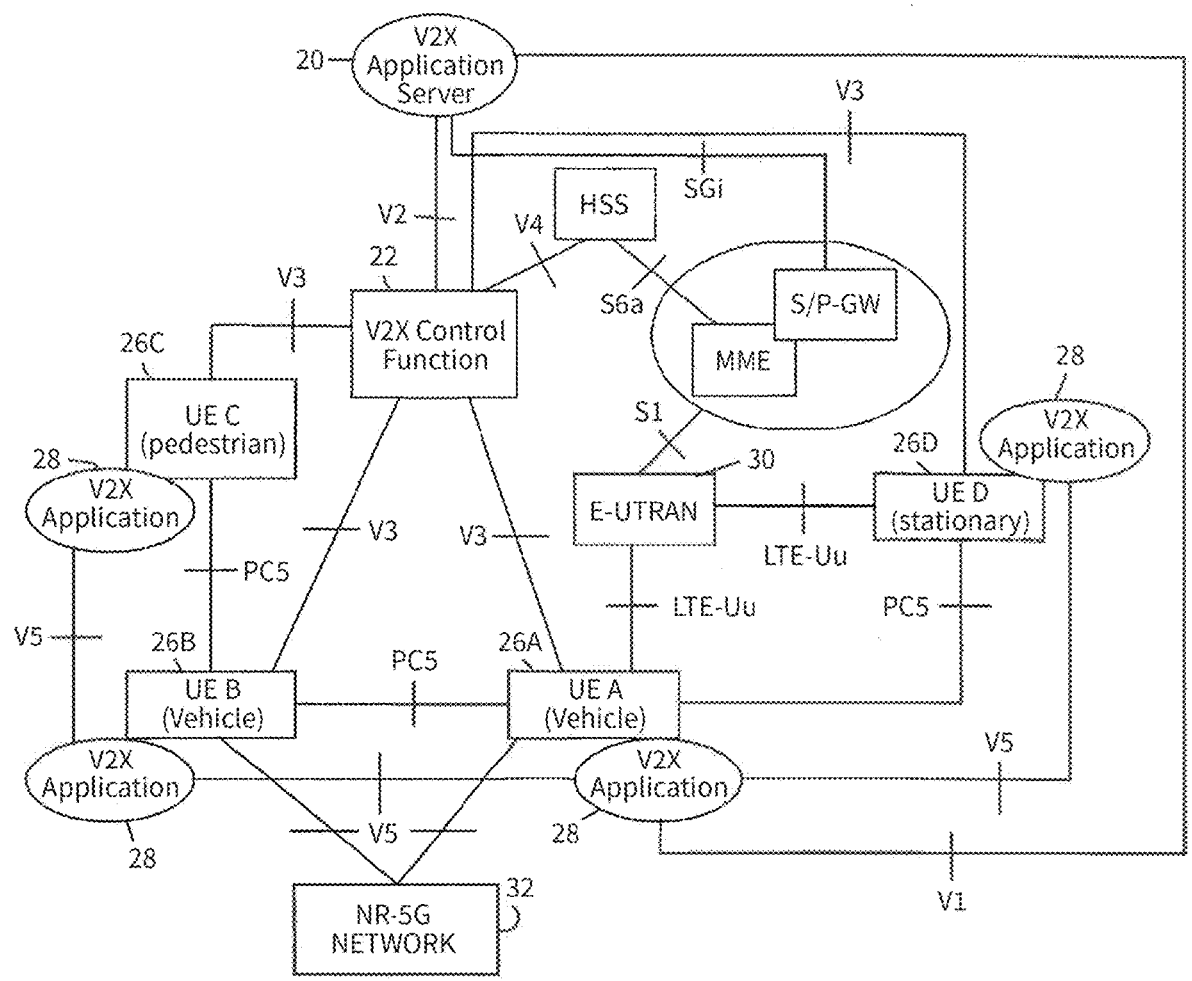
FIG. 3 is a schematic view of a network wherein at least one user equipment is in communication with plural radio access technologies and must select radio resources for a V2X message.

One aspect of the technology disclosed herein is a wireless terminal which autonomously makes a selection, from radio resources which may be of at least two radio access technologies, of a radio resource(s) for transmission and/or reception of a V2X message of the V2X communication in dependence upon a characteristic of the V2X message. FIG. 3 shows network architecture wherein V2X services are available through V2X application server 20 and V2X control function 22 to plural user equipment units (UEs) 26A, 26B, 26C, and 26D. The V2X application server 20 is connected to V2X control function 22 over interface V2, the V2X control function 22 is connected to the UEs 26 over interface V3. Of the shown user equipment units, UE 26A and UE 26B are vehicle user equipment units, UE 26C is a pedestrian user equipment, and UE 26D is a stationary user equipment. The plural user equipment units (UEs) 26A, 26B, 26C, and 26D may communicate with each other over an appropriate interface, such as the LTE interface known as PC5 interface or in any comparable interfaces between user equipments however such interfaces may be denominated in other radio access technologies or generations.

Each UE 26 capable of V2X service has an associated V2X application 28 which executes, e.g., on processor circuitry of the UE 26. The V2X applications 28 of the various user equipment units 26 may communicate with one another over a V5 interface, and with the V2X application server 20 over a V1 interface.

The user equipment units 26 shown in FIG. 3 communicate with at least one core network of a first radio access technology type, and may also communicate with a network of a second radio access technology type. For example, UE 26A and UE 26D are shown in FIG. 3 as communicating over a radio interface LTE-Uu with E-UTRAN network 30 which represents a first type radio access technology (Long Term Evolution). Although not shown as such, other user equipment units of FIG. 3 may also communicate with E-UTRAN network 30. The E-UTRAN network 30 is shown as being connected over interface S1 to, e.g., a mobility management unit (MME), and the MIME in turn being connected over interface Sha to Home Subscriber Server (HSS). The Home Subscriber Server (HSS) is connected by interface V4 to V2X control function 22.

In addition, UE 26A and UE 26B are shown as communicating over a radio interface NR-Uu with New Radio 5G network 32. The interface NR-Uu corresponds to the Uu interface for LTE but with protocol for NR rather than LTE. Although not shown as such in FIG. 3, the NR core network may comprise nodes comparable in functionality to the MME and HSS as shown for the LTE network.

The V2X application server 20, V2X control function 22, V2X applications 28, V1-V5 interfaces, and various reference points illustrated in FIG. 3 are described in 3GPP TS 23.285, v15.1.0 2018-06-19, which is incorporated herein by reference in its entirety. Among the reference points are those listed in Table 1 below.

TABLE 1

| | |
|---|---|
| V2: | The reference point between the V2X Application Server and the V2X Control Function in the operator's network. The V2X Application Server may connect to V2X Control Functions belonging to multiple PLMNs. |
| V3: | The reference point between the UE and the V2X Control Function in UE's home PLMN. It is based on the service authorization and provisioning part of the PC3 reference point defined in clause 5.2 of TS 23.303. It is applicable to both PC5 and LTE-Uu based V2X communication and optionally MBMS and |

TABLE 1-continued

| | |
|---|---|
| | LTE-Uu based V2X communication. |
| V4: | The reference point between the HSS and the V2X Control Function in the operator's network. |
| V6: | The reference point between the V2X Control Function in the HPLMN and the V2X Control Function in the VPLMN. |
| PC5: | The reference point between UEs used for user plane for ProSe Direct Communication for V2X Service. |
| S6a: | In addition to the relevant functions defined in TS 23.401 for S6a, in case of V2X Service S6a is used to download V2X Service related subscription information to MME during E-UTRAN attach procedure or to inform MME subscription information in the HSS has changed. |
| S1-MME: | In addition to the relevant functions defined in TS 23.401 for S1-MME, in case of V2X Service it is also used to convey the V2X Service authorization from MME to eNodeB. |
| xMB: | The reference point between the V2X Application Server (e.g. Content Provider) and the BM-SC, and defined in TS 26.346. |
| MB2: | The reference point between the V2X Application Server and the BM-SC, and defined in TS 23.468 [7]. |
| SGmb/ SGi-mb/ M1/M3: | The SGmb/SGi-mb/M1/M3 reference points are internal to the MBMS system and are defined in TS 23.246. |
| LTE-Uu: | The reference point between the UE and the E-UTRAN. |

Figure 4:
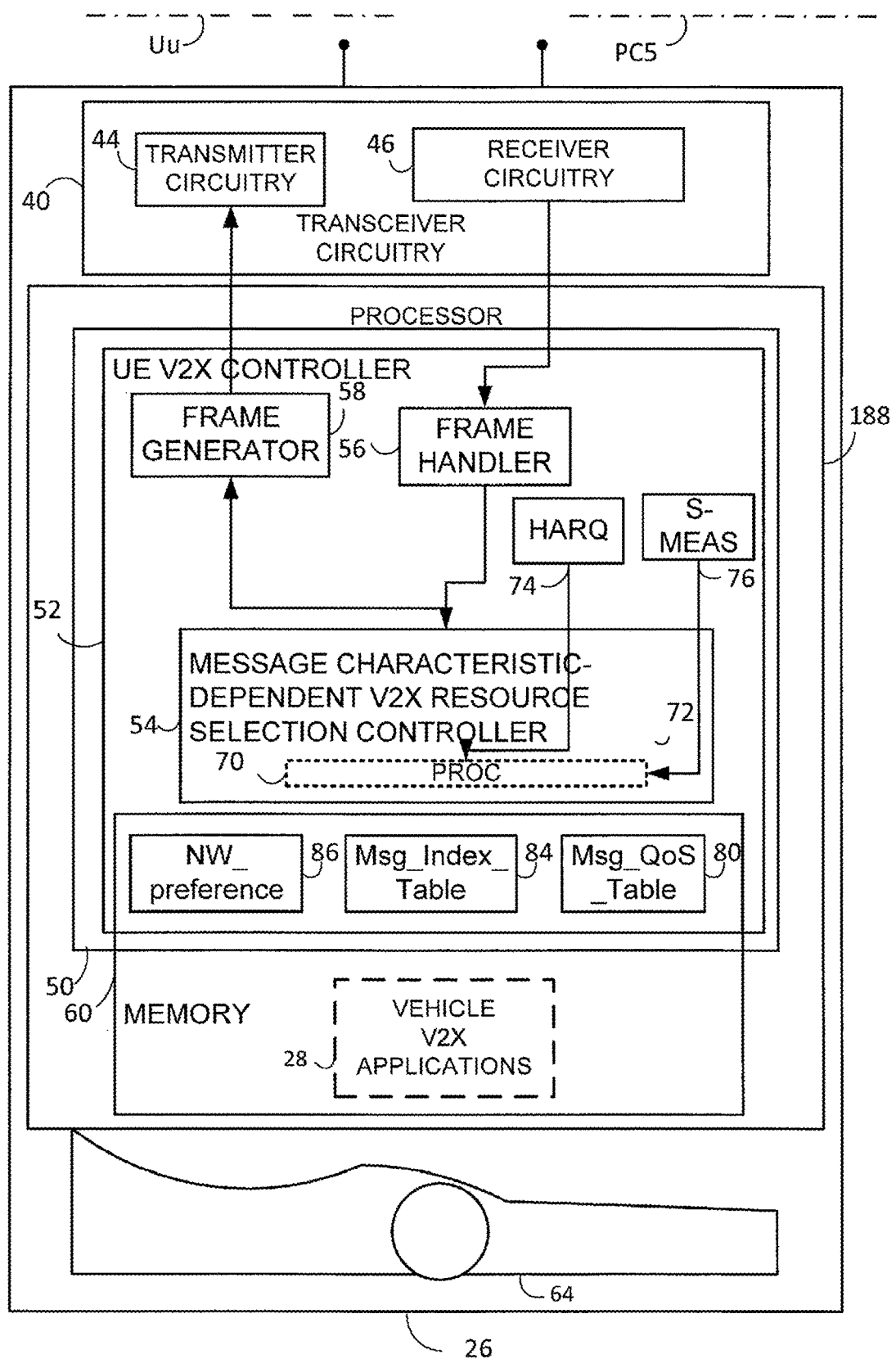
FIG. 4 is a schematic view of an example embodiment of a generic user equipment configured to make a selection of a radio resources for a V2X message in accordance with a characteristic of the V2X message.

FIG. 4 shows various example, representative, non-limiting components and functionalities herein pertinent of a generic wireless terminal or vehicle UE 26, such as UE 26A or UE 26B of FIG. 3. The wireless terminal 26 comprises transceiver circuitry 40, which in turn comprises transmitter circuitry 44 and receiver circuitry 46. The transceiver circuitry 40 includes antenna(e) for the wireless terminal 26. Transmitter circuitry 44 includes, e.g., amplifier(s), modulation circuitry and other conventional transmission equipment. Receiver circuitry 46 comprises, e.g., amplifiers, demodulation circuitry, and other conventional receiver equipment. The transceiver circuitry 40 is configured to use resources for communication with a radio access network, such as E-UTRAN network 30 and/or New Radio 5G network 32, as well as resources allocated for V2X communication, whether those resources be shared with sidelink direct (SLD) communications or separate and distinct for V2X communication as previously described.

The user equipment 26 further comprises processor circuitry, also herein known more simply as UE processor 50, or simply as processor 50. While processor 50 may have responsibility for operation of many aspects of wireless terminal 26 not specifically described herein, in one of its aspects processor 50 serves as UE V2X controller 52 for controlling aspects of vehicle (V2X) communication. As further illustrated in FIG. 4, the UE V2X may comprise V2X resource selection controller 54. The UE V2X controller 52 may also comprise, or work in conjunction with frame handler 56 and frame generator 58. In the particular example implementation shown in FIG. 4, the frame handler 56 and frame generator 58 are shown as comprising the UE processor 50 for handling frame operations with respect to transmissions with the radio access network in addition to the V2X transmissions.

In addition to UE processor circuitry 50, wireless terminal 26 also comprises UE memory 60, e.g., memory circuitry, which may store an operating system and various application programs, such as vehicle V2X communication application 28. The memory 60 may be any suitable type of memory, e.g., random access memory (RAM), read only memory (ROM), cache memory, processor register memory, or any combination of one or more memory types. The applications such as V2X application 28 comprises instructions executable by processor circuitry 50 and are stored in non-transient portions of memory 60. At least some aspects of UE memory 64 may also be considered as part of UE V2X controller 52.

The user equipment 26 further comprises UE user interface(s) 64. The user interfaces 64 may comprise one or more suitable input/output devices which are operable by a user. Some of all of the user interfaces 64 may be realized by a touch sensitive screen. The user interface(s) 64 may also comprise a keyboard, audio input and output, and other user I/O devices. Only a portion of the user interfaces 64 is depicted in FIG. 4, it being understood that the user interfaces 64 may be provided on a cover or case of UE 26 and thus may visibly obscure the underlying other components shown in FIG. 4.

The user equipment 26 participates in vehicle-to-anything (V2X) communications, meaning that the user equipment 26 may participate in one or more of vehicle to infrastructure (V2I) communication; vehicle to person/pedestrian (V2P) communication; and vehicle to vehicle (V2V) communication. FIG. 4 represents the fact that user equipment 26 participates in vehicle-to-anything (V2X) communications by showing the interface, such as the PC5 interface, for example, through which the user equipment 26 may engage in V2X communication with another user equipment 26. As also shown in FIG. 4, user equipment 26 also engages in communication across a Uu-type radio interface with a radio access network, such as E-UTRAN network 30 or New Radio 5G network 32. The UE transceiver circuitry 40 may be involved in both the radio access network communications over interface Uu and the V2X communications over the PC5 interface. But for the different types of communications, e.g., communications with a radio access network and V2X communications, different radio resources are utilized. For example, a sub-set of the radio resources of the radio access network, e.g., one or more "pools" of the radio access network radio resources, may be allocated to the V2X communications, e.g., for 3GPP V2X services.

3GPP V2X services may transport certain application layer messages, and those application layer messages may be defined by standards organizations. For example, 3GPP V2X services may transport application layer messages defined by the Society of Automotive Engineers (SAE) and the European Telecommunications Standards Institute (ETSI) EN.

Thus, 3GPP V2X messages may be defined by protocol(s). For example, 3GPP V2X services may be used to transport SAE J2735 messages, e.g., messages formatted according to the SAE J2735 protocol. J2735 defines the format and structure of message, data frames, and data elements for exchanging data between vehicles (V2V) and between vehicles and infrastructure (V2I). A "data elements" (DE) comprises primitive objects, such as speed, heading, latitude, longitude, elevation, etc. A "data frame" (DF) comprise a collection of Data Elements. For example, a Position3D Data Frame is comprised of latitude, longitude, and elevation Data Elements. A "message" comprises a collection of Data Frames and Data Elements.

The set of SAE J2735 Messages include at least the following messages:
Basic Safety Message (BSM),
MapData message (Map)
Signal Phase and Timing (SPaT),
Personal Safety Message (PSM)
Traveler Information Message (TIM) SignalStatusMessage (SSM)

SignalRequestMessage (SRM).

SAE J2735 uses a hierarchical methodology of data frames and data elements to organize its content into related grouping, as can be seen in the description of the Basic Safety Message (BSM) message shown in Table 2. The BSM includes at least the elements shown in Table 1. Other messages, such as the Map message, the Spat message, and the PSM message may be organized in a similar fashion. A hierarchical structure such as that shown in and exemplified by Table 2 lends itself to an ASN.1 compliant description as can be seen in the CAM and DENM message descriptions also below.

TABLE 2

The BSM contains at least the following elements:

Part 1 (mandatory)
- Position (local 3D) (DF)
  - Latitude (DE)
  - Longitude (DE)
  - Elevation (DE)
  - Positional accuracy (DE)
- Motion (DF)
  - Transmission and speed (DF)
    - Transmission state (DE)
    - Speed (DE)
  - Heading (DE)
  - Steering wheel angle (DE)
  - Acceleration set (DF)
    - Longitudinal acceleration (DE)
    - Lateral acceleration (DE)
    - Vertical acceleration (DE)
    - Yaw rate (DE)
- Brake system status (DF)
  - Brake applied status (DE)
  - Brake status not available (DE)
  - Traction control state (DE)
  - Antilock brake status (DE)
  - Stability control status (DE)
  - Brake boost applied (DE)
  - Auxiliary brake status (DE)
- Vehicle size (DF)
  - Vehicle width (DE)
  - Vehicle length (DE)

Thus, the SAE J2735 BSM (Basic Safety Message) is one type of message that may be transported by 3GPP V2X services. The BSM has two parts: Part 1 of the BSM (Basic Safety Message) includes the core data elements, e.g., vehicle size, position, speed, heading acceleration, brake system status, and is transmitted approximately 10× per second. BSM (Basic Safety Message) Part 2 includes a variable set of data elements drawn from many optional data elements, and is transmitted less frequently then part 1. The BSM is expected to have a transmission range of 1,000 meters, and is tailored for localized broadcast required by V2V safety applications.

Having described the BSM (Basic Safety Message), contents of the other SAE J2735 messages (e.g., the SPaT message, the PSM message, etc.) are not described herein in as much detail, for the sake of brevity. However, in terms of the technology disclosed herein these other messages may be structured and handled in a similar way as the BSM message.

In addition to SAE J2735 messages, the 3GPP V2X services may be used to transport ETSI EN 302 637-2 Cooperative Awareness Messages, CAM. Cooperative Awareness Messages (CAMs) are messages exchanged in the Intelligent Transport System (ITS) network between Intelligent Transport System (ITS) network stations, ITS-Ss, to create and maintain awareness of each other and to support cooperative performance of vehicles using the road network. The ASN.1 specification of a CAM message is described, e.g., in Annex A of ETSI EN 302 637-2 V1.3.1 (2014-09), which is incorporated herein by reference. A CAM comprises status and attribute information of the originating ITS-S. The content varies depending on the type of the ITS-S. For vehicle ITS-Ss the status information includes time, position, motion state, activated systems, etc. and the attribute information includes data about the dimensions, vehicle type and role in the road traffic, etc. On reception of a CAM the receiving ITS-S becomes aware of the presence, type, and status of the originating ITS-S. The received information may be used by the receiving ITS-S to support several ITS applications. For example, by comparing the status of the originating ITS-S with its own status, a receiving ITS-S is able to estimate the collision risk with the originating ITS-S and if necessary may inform the driver of the vehicle via the human machine interface, HMI. Multiple ITS applications may rely on a CA basic service known as CA basic service. The CA basic service is a facilities layer entity that operates the CAM protocol. The CA basic service provides two essentially services: sending and receiving of CAMs. The CA basic service uses the services provided by the protocol entities of the ITS networking & transport layer to disseminate the CAM, as described in ETSI EN 302 637-2. The CA basic service is assigned to domain application support facilities described in ETSI TS 102 894-1 [i.6], which is incorporated herein by reference. Besides the support of applications the awareness of other ITS-S gained by the CA basic service may be used in the networking & transport layer for the position dependent dissemination of messages, e.g. Decentralized Environmental Notification Message, DENM, by GeoBroadcasting as specified in ETSI EN 302 636-4-1 [i.5], which is incorporated herein by reference. The generation and transmission of CAM is managed by the CA basic service by implementing the CAM protocol. CAM payload shall include the containers basic-Container and highFrequency Container. CAM payload may include the additional containers lowFrequencyContainer and special VehicleContainer.

3GPP V2X services may be used to transport ETSI EN 302 637-3 Decentralized Environmental Notification Message (DENM). The ASN.1 specification of a Decentralized Environmental Notification Message is described, e.g., in Annex A of ETSI EN 302 637-3 V1.2.1 (2014-09), which is incorporated herein by reference. The DEN basic service is an application support facility provided by the facilities layer. It constructs, manages and processes the Decentralized Environmental Notification Message (DENM). The construction of a DENM is triggered by an ITS-S application. A DENM contains information related to a road hazard or an abnormal traffic conditions, such as its type and its position. The DEN basic service delivers the DENM as payload to the ITS networking & transport layer for the message dissemination. Typically for an ITS application, a DENM is disseminated to ITS-Ss that are located in a geographic area through direct vehicle-to-vehicle or vehicle-to-infrastructure communications. At the receiving side, the DEN basic service of a receiving ITS-S processes the received DENM and provides the DENM content to an ITS-S application. This ITS-S application may present the information to the driver if information of the road hazard or traffic condition is assessed to be relevant to the driver.

The above messages (BSM message, (and other messages in SAE J2735), various types of CAM messages, and various types of DENM messages) all have various data size, latency requirements, throughput requirements in accordance with their application and particular message type needs. In view of the fact that different messages will have different QoS Levels and the different QoS Levels will require different levels of transport resources assigned to the message, in accordance with one example aspect of the technology disclosed herein, the wireless terminal 26 autonomously makes a selection of a selected radio resource(s) for transmission and/or reception of a V2X message of the V2X communication in dependence upon a characteristic of the V2X message. The selection of the selected radio resource(s) may be made by terminal processor 50, and V2X resource selection controller 54 in particular. For this reason, the V2X resource selection controller 54 is shown in FIG. 4 as being a message characteristic-dependent V2X resource selection controller 54. In an example, non-limiting embodiment and mode the phrase "characteristic of the V2X message" may also mean "classification of the V2X message" or "categorization of the V2X message". The "characteristic", "categorization", and/or "classification" may encompass at least one of message protocol and message type. In another example, non-limiting embodiment and mode the phrase "characteristic of the V2X message" may mean both message protocol and message type. Examples of message protocol have been mentioned above, such as SAE J2735 protocol, a Cooperative Awareness Messages (CAM) protocol, and a Decentralized Environmental Notification Message (DENM) protocol. The V2X message may be characterized, e.g., classified or categorized, by yet other than the three above-mentioned protocols, e.g., by other protocols. Further, it should be understood that, within these and other message protocols, there may be various messages types. For example, in the SAE J2735 protocol the messages types for the V2X message may include at least the following messages: Basic Safety Message (BSM), MapData message (Map), Signal Phase and Timing (SPaT), Personal Safety Message (PSM), Traveler Information Message (TIM) SignalStatusMessage (SSM), SignalRequestMessage (SRM). So also other message protocols, such as the Cooperative Awareness Messages (CAM) protocol and the Decentralized Environmental Notification Message (DENM) protocol, comprise messages belonging to differing message types. Thus, any message may be characterized, or categorized, or classified, by one or both of message protocol and message type.

In at least some example embodiments and modes, the V2X resource selection controller 54 autonomously makes a selection, from radio resources of at least two radio access technologies, of the selected radio resource(s) in dependence upon the characteristic of the V2X message. For example, the V2X resource selection controller 54 may make the selection of the radio resource(s) for transmission and/or reception of the V2X message of the V2X communication from either: an LTE radio resource(s); a New Radio (NR) 5G radio resource(s); both the LTE radio resource(s) and the NR 5G radio resources.

In an example embodiment and mode, the terminal processor 50, and V2X resource selection controller 54 in particular, makes the selection so that probability of message reception of V2X message is commensurate with a level of importance that is associated with the V2X message. In other words, the V2X resource selection controller 54 makes the selection whereby resources allocated to the V2X message are commensurate with a level of importance that is associated with the V2X message. In an example implementation, the resources allocated to the V2X message comprises a number of protocol Resource Blocks (RBs) and a Modulation Schemes and Coding Scheme (MCS) used to transport the RBs of the V2X message. So that the resources allocated to the V2X message may be commensurate with the level of importance and so to provide the probability of message reception, the wireless terminal must know a property or characteristic of the channel utilized by the V2X message, e.g., the V2X-utilized message. The V2X-utilized message channel is preferably an interface such as the LTE PC5 interface, which may bear a different name in other radio access technologies and/or generation. As explained below, the property or quality that may be used to represent the V2X-utilized message channel may vary depending upon radio access technology. For example, the property or quality that may be used to represent the V2X-utilized message channel may be signal strength on the channel or quality of service of the channel.

As used herein, the term Quality of Service (QoS) Level may indicate a scaler value, such that a low value would be assigned to a message of low importance, and a high value would be assigned to a message of high importance. For example, the message CAM.cam.basicVehicleContainer-LowFrequency.BasicVehicleContainerLowFrequency.exteriorLights may be given a low QoS Level such as 3 out of 10, while a message with a high QoS Level such as CAM.cam. Special VehicleContainer.EmergencyContainer. lightBarSirenInUse may be given a higher QoS Level such as 9 out of 10. Thus we can see that different messages will have different QoS Levels and the different QoS Levels will require different levels of transport resources assigned to the message.

In Rel-14 LTE V2X (aka LTE V2X), a basic set of requirements for V2X service in TR 22.885 is supported, which are considered sufficient for basic road safety service. An LTE V2X enabled vehicle, e.g., a vehicle configured with a UE the supports V2X applications, may directly exchange status information via an interface such as the PC5 interface. An interface such as the PC5 interface, or any comparable interface in other radio access technologies and/or generations, may also be known as sidelink at the physical layer. The status information exchanged, e.g., via the PC5 or similar interface, may include position, speed and heading, and may be exchanged with other nearby vehicles, infrastructure nodes and/or pedestrians that are also enabled with LTE V2X. However, the LTE V2X transport service is broadcast only, thus no HARQ feedback is transmitted by the receiving UE. There is HARQ packet combining process at the receiving LTE V2X UE. Thus, in order to increase probability of correct demodulation, the LTE V2X retransmits its user data, e.g. a PSSCH, three times in consecutive subframes, and its control data, e.g. a PSCCH, twice in different subframes, using always QPSK modulation.

In 3GPP Release 16, e.g., Rel-16, the 3GPP Fifth Generation 5G New Radio, NR, is expected to provide for enhanced V2X service, also known as NR V2X, which includes a data transport services with much lower latency and much higher throughput. See, for example, the SA1 Study on Improvement of V2X Service Handling for Rel-16, also known as FS V2XIMP or Release 16 (Open)Specification: 22.886—Study on enhancement of 3GPP support for 5G V2X services Version: 15.1.0: Specification. Therefore, a HARQ feedback process is expected to be enabled between the transmitting NR V2X UE and the receiving NR V2X UE, which are using NR V2X resources.

Both the LTE V2X service and NR V2X service will be capable of transporting the SAE J2735 protocol messages, the Cooperative Awareness Message (CAM) protocol messages, and the Decentralized Environmental Notification Message (DENM) protocol message over the legacy PC5 based LTE V2X communication channel. In this regard, TSG RAN has agreed in TR 38.913 that NR V2X not replace the services offered by LTE V2X. Instead, the NR V2X shall complement LTE V2X for advanced V2X services and support interworking with LTE V2X. Thus, given the enhancements expected for NR V2X service, and agreement that NR V2X service will provide a super set of the services provided by LTE V2X service, there will be deployments of the following:

- NR V2X and LTE V2X where an NR V2X UE can to send a message to a LTE V2X UE using LTE type resources, e.g. LTE numerology, LTE SCS, e.g., 15 kHz, LTE frequency, e.g., LTE frequency band).
- NR V2X and NR V2X where an NR V2X UE can to send a message to a NR V2X UE using LTE type resources, e.g. LTE numerology, LTE SCS, e.g., 15 kHz, LTE frequency, e.g., LTE frequency band.
- NR V2X and NR V2X where an NR V2X UE can to send a message to a NR V2X UE using both NR and LTE type resources, e.g. LTE/NR numerology, LTE/NR SCS, e.g., 15 kHz, 30 kHz, 60 kHz, 120 kHz, and/or 240 kHz, LTE/NR frequency, e.g., LTE/NR frequency band.

In sending a V2X message, the UE processor 50 may execute V2X message characteristic-dependent resource selection procedure 70 to determine if the V2X message is to be transported between 3GPP V2X services using radio resources of a first radio access technology or radio resources of a second radio access technology. The V2X message characteristic-dependent resource selection procedure 70 may also be known as the V2X message categorization-dependent resource selection procedure 70, or the V2X message classification-dependent resource selection procedure 70. A portion of the UE processor 50 known as the UE V2X controller 52, and particularly V2X resource selection controller 54, may perform the V2X message characteristic-dependent resource selection procedure 70. For example, in an example scenario in which the two radio access technologies include LTE and NR, the V2X resource selection controller 54 executes a V2X message characteristic-dependent resource selection procedure 70 to determine if a particular V2X message is to be transported between 3GPP V2X services using NR type resources or LTE type resources or both NR and LTE type resources. The user equipment 26 of FIG. 4 further comprises the transmitter 44 and/or receiver 46 which is configured to use the selected radio resource(s) for the transmission and/or reception of the V2X message.

The LTE specification TS23.285 specified a "V2X Control Function" as the logical function used for network related actions required for V2X, and that the V2X Control Function is used to provision the UE with necessary parameters that enable the UE to use V2X communication. The UE V2X controller 52 performs similar functions as specified in TS23.285 for UE 26, but the UE V2X controller 52 further serves as a NR V2X Control Function with the V2X resource selection controller 54 making a determination, based on a message characteristic of the V2X message, if the V2X message is to be transported using NR resources, or LTE resources, or both NR and LTE type services and resources.

The UE V2X controller 52, serving as a NR V2X Control Function, may enable or provide the NR V2X UE 26 with parameters for using NR or LTE or both NR and LTE transmission resources, and may provide an additional set of parameters related to QoS, or radio propagation conditions. The V2X resource selection controller 54 is thereby enabled to make an autonomous determination of which resources, enabled by the UE V2X controller 52, to use for the transport of the V2X message in dependence upon a characteristic of the V2X message. In other words, the UE is enabled to make an autonomous determination of which resources to use for the particular V2X message, based on its characteristic(s), and based on its current local radio frequency, RF, and traffic conditions.

In one of its example aspects, the technology disclosed herein includes the UE 26 making a determination of which resource to use (NR or LTE or both NR and LTE) to transport the V2X message over the V2X communication channel, per the parameters provided by UE V2X controller 52, and a Hybrid Automatic Repeat Request, HARQ, function between the NR UE transmitting V2X data on PC5 and the NR UE receiving the V2X data on PC5, and S-Measurement taken on the E-UTRA carrier frequency used for the communication channel. As previously explained, the communication channel may be an LTE-based PC5 interface, or a comparable interface between user equipments in other radio access technologies and/or generations. Usage of the term "PC5" and or "V2X communications channel" herein is thus not intended to be limited, but may refer to differently named interfaces of other radio access technologies and/or generations between wireless terminal having comparable or similar functions. The UE 26 of FIG. 4 is thus shown as further comprising both HARQ functionality 74 and signal measurement functionality 76. In an example implementation shown in FIG. 4, HARQ functionality 74 and signal measurement functionality 76 comprise UE processor 50, since these units may be involved in operations concerning transmissions with the radio access network as well as V2X HARQ and signal measurement functions.

FIG. 5A shows basic, representative acts or steps performed by the user equipment 26 of FIG. 4 in one example embodiment and mode. Act 5A-1 comprises UE processor 50 autonomously making a selection, from radio resources of at least two radio access technologies, of a selected radio resource(s) for transmission and/or reception of a V2X message of the V2X communication in dependence upon a characteristic of the V2X message. Act 5A-2 comprises using the selected radio resource(s) for the transmission and/or reception of the V2X message. For example, either the transmitter circuitry 44 may transmit, or the receiver circuitry 46 may receive, the V2X message using the selected radio resource(s).

FIG. 5B shows basic, representative acts or steps performed by the user equipment 26 of FIG. 4 in another example embodiment and mode in which the resource selection is not necessarily from two different radio access technologies. Act 5B-1 comprises UE processor 50 autonomously making a selection of a selected radio resource(s) for transmission and/or reception of a V2X message of the V2X communication in dependence upon a characteristic of the V2X message. In the FIG. 5B example embodiment and mode, the characteristic of the V2X message comprises at least one of message protocol and message type. Act 5B-2 comprises using the selected radio resource(s) for the transmission and/or reception of the V2X message. Again, either the transmitter circuitry 44 may transmit, or the receiver circuitry 46 may receive, the V2X message using the selected radio resource(s).

In one of its example aspects, the technology disclosed herein concerns how the UE determines which resource to use (e.g., NR or LTE or both NR and LTE) to transport the message over the V2X communication channel, in accordance with (1) parameters provided by the NR V2X Control Function, (2) quality of service information obtained a HARQ function between the NR UE transmitting V2X data on the V2X communications channel and the NR UE receiving the V2X data on the V2X communications channel, and (3) quality of service information in the form of a S-Measurement taken on the E-UTRA carrier frequency used for the V2X communications channel. In particular, in an example embodiment and mode the V2X resource selection controller 54 compares the quality of service information against certain parameters provided by the NR V2X Control Function. The certain parameters provided by the NR V2X Control Function involved in the comparison(s) may comprise a table of thresholds, and in addition a table of indices or pointers which operate on, e.g., specify a certain subset, of the table of thresholds. In an example implementation, the a table of thresholds may be referred to as Message Quality of Service Table 80, e.g., Msg_QoS_Table 80, and the table of indices or pointers may be referred to as Message Index Table 84, e.g., Msg Index Table 84. The Message Quality of Service Table 80 may also be referred to as the "configured threshold table". The parameters provided by the NR V2X Control Function may also comprise a Network Preference parameter 86, e.g., NW Preference 86.

As stated previously and as shown in FIG. 4, the quality of service, e.g., QoS, information for a V2X-utilized channel may be obtained from the HARQ functionality 74 for New Radio (NR) and the signal measurement functionality 76 for LTE. Thus, as used heren, it is to be understood that QoS information may encompass radio frequency (RF) link quality, such as when referring to LTE. FIG. 4 shows the V2X resource selection controller 54 as having access to the parameters provided by the NR V2X Control Function, including Message Quality of Service Table 80, Message Index Table 84, and Network Preference parameter 86.

In an example embodiment and mode, the Message Quality of Service Table 80 may comprise sets of thresholds. In an example implementation of Message Quality of Service Table 80 comprising sets of thresholds, a first radio access technology may be New Radio (NR) 5G, wherein for the comparison with the thresholds the error rate and delay rate for the first radio access technology are reported by HARQ functionality 74, and a second radio access technology may be Long Term Evolution (LTE) wherein the signal measurement is reported by signal measurement functionality 76, and the V2X-utilized channel is a Sidelink PC5 or comparable channel. For this example implementation, FIG. 6A shows an example threshold set 88, i.e., a set of thresholds. In an example implementation, the set of thresholds 88 may comprise at least a triology of threshold values: a threshold for error rate for the V2X-utilized channel, e.g., T-error rate; a threshold for delay rate for the V2X-utilized channel, e.g., T-delay rate; and, a threshold for the received signal measurement for the V2X-utilized channel, e.g., T-RSRP. The first and second of the thresholds of threshold set 88 are used for comparison with QoS values obtained from the NR 5G radio access technology, the third threshold of the threshold set 88 is used for comparison as a QoS value obtained from an LTE radio access technology. Although the received signal measurement is represented as reference signal received power, RSRP, any other measure of signal strength or quality may be utilized, such as, for example, reference signal received quality, RSRQ. The V2X-utilized channel may be a Sidelink PC5 or comparable channel.

Figure 6B:
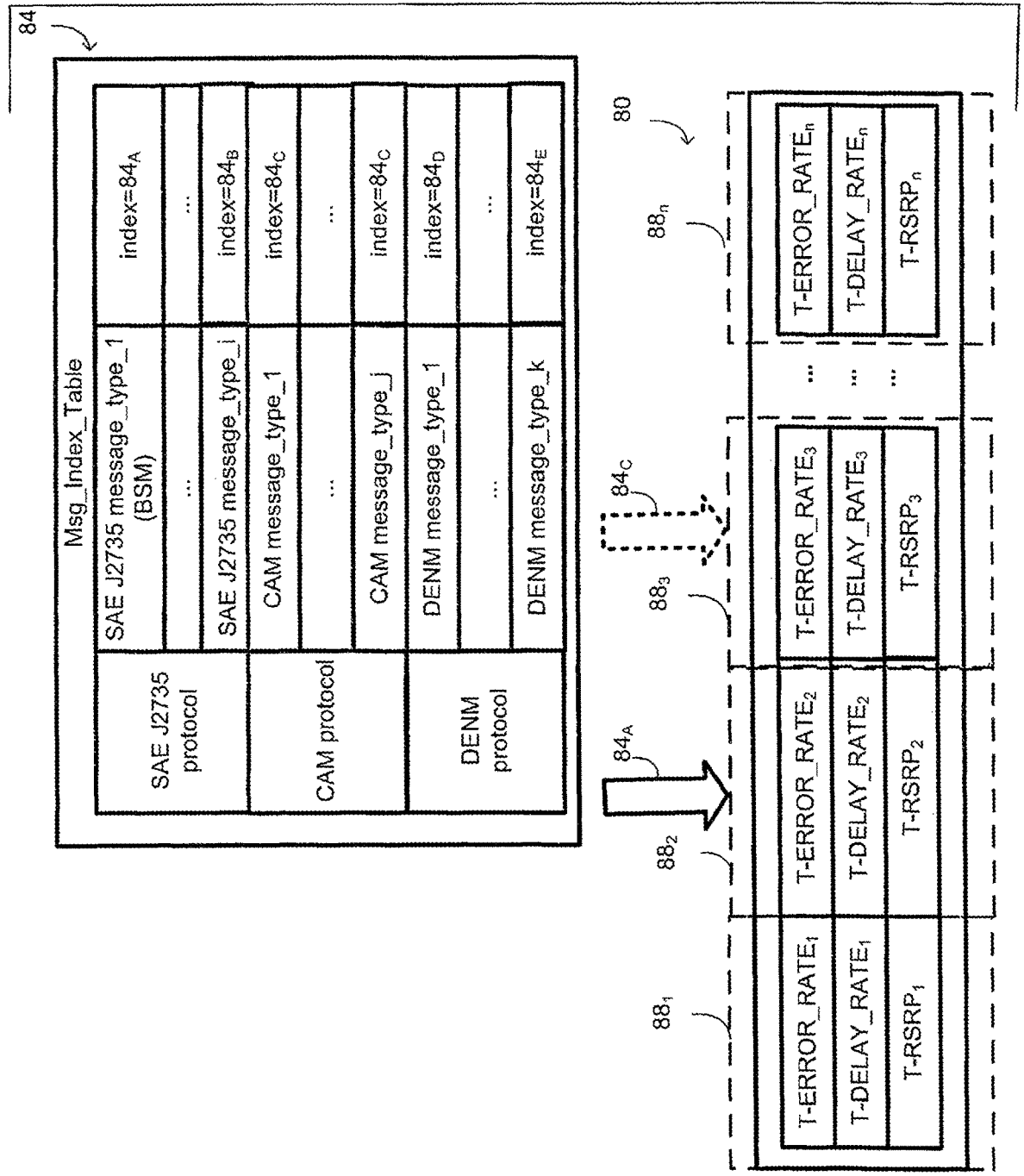
FIG. 6B is a diagrammatic view of an example Message Quality of Service Table comprising plural sets of thresholds which may be used by the user equipment of FIG. 4 in making a selection of radio resources for a V2X message, as well as a Message Index Table which is used to obtain an table index for accessing a specified set of the Message Quality of Service Table according to message characteristic, and wherein the message characteristic comprises both message protocol and message type.

In an example embodiment and mode, illustrated in FIG. 6B, the Message Quality of Service Table 80 may comprise plural sets of thresholds. In the FIG. 6B example implementation, the Message Quality of Service Table 80 may be a two-dimensional matrix with each column of the matrix corresponding to a set of thresholds, e.g., set 881, set 882, and so forth to set 88g. In the FIG. 6B implementation, the V2X resource selection controller 54 utilizes at least one particular set of thresholds to be used for the comparison with the QoS information. The particular set of thresholds that the V2X resource selection controller 54 is to obtain from the Message Quality of Service Table 80 is indicated to the V2X resource selection controller 54 by an "index" value, also known as a "table index". For example, in an example non-limiting scenario, FIG. 6B shows by index arrow 84A that a table index specifies that the second column of Message Quality of Service Table 80, e.g., a second set of thresholds, is to be utilized for the comparison.

The particular table index that is to be used to retrieve the correct set of thresholds from the Message Quality of Service Table 80 is determined from the Message Index Table 84. FIG. 6B shows that, in an example embodiment and mode, Message Index Table 84 may also be conceptualized as a matrix. In the particular example implementation shown in FIG. 6B, the V2X message characteristic considers or comprises both message protocol and message type. Accordingly, a first column of Message Index Table 84 comprises elements that comprise or pertain to differing message protocols, such as the SAE J2735 protocol, the Cooperative Awareness Messages (CAM) protocol, and the Decentralized Environmental Notification Message (DENM). It should be understood that the first column of Message Index Table 84 may other protocols than, or protocols in addition to, the example protocols shown in FIG. 6B.

The second column of Message Index Table 84 comprises, in horizontal relation to the corresponding protocol of the first column, one or more message types that may belong to the protocol of the first column. For example, some of the elements the second column of Message Index Table 84 show SAE J2735 message-type_1 through SAE J2735 message-type_i being message types belonging to the SAE J2735 protocol of column 1. For example, SAE J2735 message-type_1 may be a Basic Service Message (BSM), SAE J2735 message-type_2 may be a MapData message (Map), SAE J2735 message-type_2 may be a Signal Phase and Timing (SPaT) message, and so forth to include one or more of the other SAE J2735 protocol messages including those mentioned herein. The SAE J2735 message types are essentially horizontally aligned with and grouped within the corresponding SAE J2735 protocol element of column 1 of Message Index Table 84. Others of the elements the second column of Message Index Table 84 show CAM message-type_1 through CAM message-type_j being message types belonging to the Cooperative Awareness Messages (CAM) protocol of column 1. Yet others of the elements the second column of Message Index Table 84 show DENM message-type_1 through DENM message-type_k being message types belonging to the Decentralized Environmental Notification Message (DENM) protocol of column 1. In the same manner as the SAE J2735 protocol message types, the Cooperative Awareness Messages (CAM) protocol message types are essentially horizontally aligned with and grouped within the corresponding CAM protocol element of column 1 of Message Index Table 84, and the Decentralized Environmental Notification Message (DENM) protocol message types are essentially horizontally aligned with and grouped within the corresponding DENM protocol element of column 1 of Message Index Table 84.

The third column of Message Index Table 84 comprises, in horizontal relation to the corresponding message type of the second column, elements that comprise the table indexes or pointers for the respective message types of the second column. For example, the first element of the third column of Message Index Table 84 comprises an index=84$_A$. The first element of the third column of Message Index Table 84 thus indicates that, for SAE J2735 message_type_1, the table index that is used to retrieve a set of thresholds from Message Quality of Service Table 80 is index=84$_A$. For an example scenario, when the V2X message to be transmitted is a BSM (Basic Safety Message), the V2X resource selection controller 54 consults the Message Index Table 84 and determines that the index 84$_A$ corresponds to the BSM (Basic Safety Message), and using Message Index Table 84 the V2X resource selection controller 54 obtains the set of thresholds indicated by index arrow 84A, the trilogy of thresholds comprising threshold set 88$_2$. The V2X resource selection controller 54 then uses the thresholds comprising threshold set 88$_2$ for making the selection of radio resource(s) to use for the V2X message, e.g., for the BSM (Basic Safety Message). How the V2X resource selection controller 54 uses the pointed-to threshold set for making the selection of radio resources is described further herein, e.g., with reference to FIG. 7A-FIG. 7D, for example.

The Message Index Table 84 may be used to obtain an appropriate table index for any message included in Message Index Table 84. As a an alternative scenario to what is described above, for example, if the V2X resource selection controller 54 were making resource selection for message which is classified as a CMA message-type_1, the V2X resource selection controller 54 would obtain table index=84$_C$ from Message Index Table 84. The V2X resource selection controller 54 therefore would use table index=84$_C$ to obtain the thresholds of threshold set 88$_3$ from the Message Quality of Service Table 80, as shown by broken arrow 84$_C$ in FIG. 6B.

FIG. 6B further shows that different message types of the same message protocol may have the same table index, and that even different message types of different message protocols may have the same table index. This is understood from the fact that, e.g., differing messages may have similar quality of service requirements.

Figure 6C:
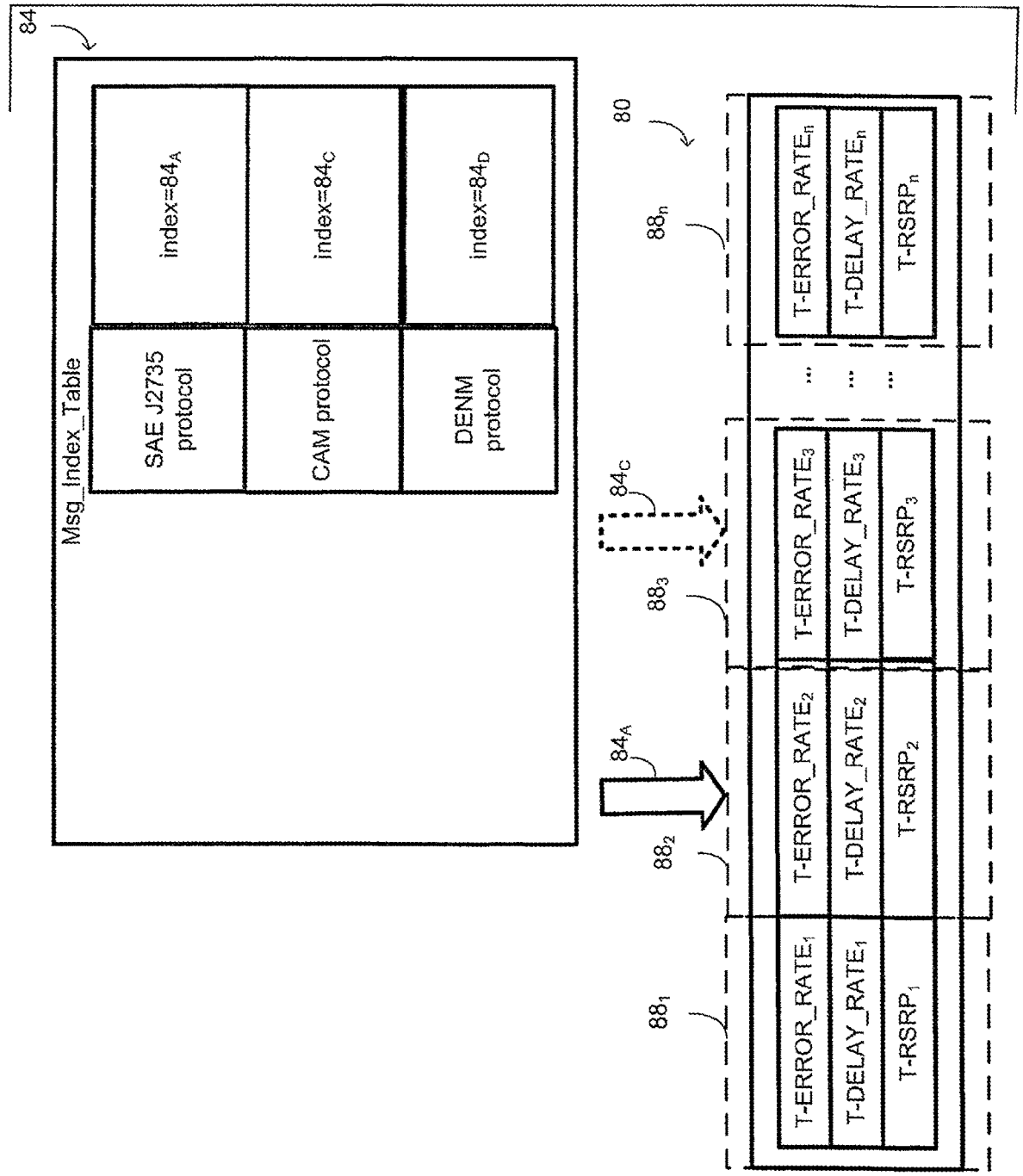
FIG. 6C is a diagrammatic view of an example Message Quality of Service Table comprising plural sets of thresholds which may be used by the user equipment of FIG. 4 in making a selection of radio resources for a V2X message, as well as a Message Index Table which is used to obtain an table index for accessing a specified set of the Message Quality of Service Table according to message characteristic, and wherein the message characteristic comprises only message protocol.

As indicated above, the Message Index Table 84 of FIG. 6B shows an example implementation in which the message characteristic comprises both message protocol and message type within the protocol. In other example implementations, the message characteristic may include either one, but not both, of message protocol and message type. For example, FIG. 6C shows an example implementation in which resource selection depends on message characteristic, and the message characteristic is only message protocol. FIG. 6C therefore assumes that all message types of the same message protocol have essentially the same quality of service requirements. FIG. 6C shows that any message belonging to the SAE J2735 protocol is associated with table index 84$_A$, that any message belonging to the CAM protocol is associated with table index 84$_C$, and that any message belonging to the DENM protocol is associated with table index 84$_D$.

Figure 6D:
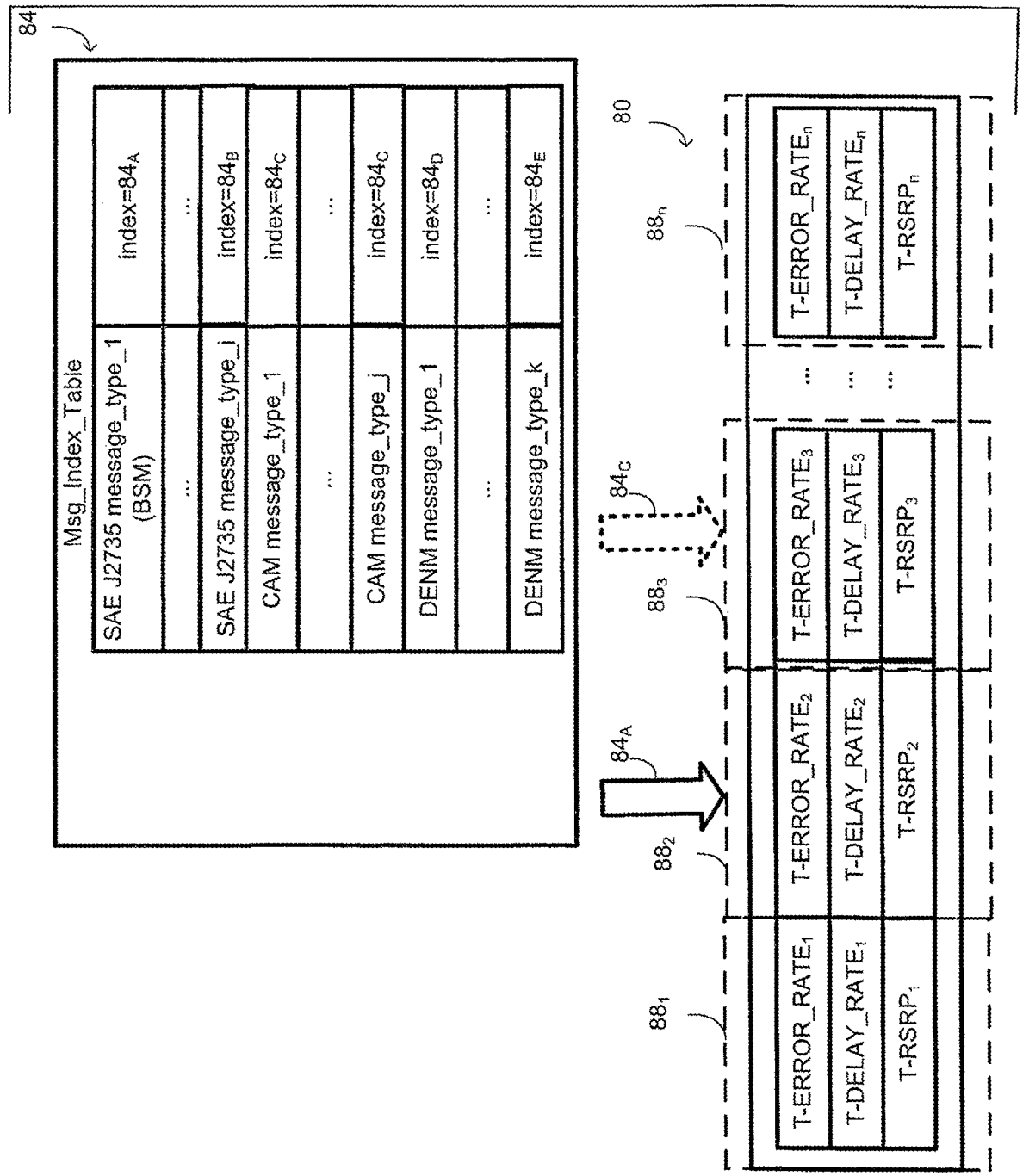
FIG. 6D is a diagrammatic view of an example Message Quality of Service Table comprising plural sets of thresholds which may be used by the user equipment of FIG. 4 in making a selection of radio resources for a V2X message, as well as a Message Index Table which is used to obtain an table index for accessing a specified set of the Message Quality of Service Table according to message characteristic, and wherein the message characteristic comprises only message type.

As another example implementation in which the message characteristic may include either one, but not both, of message protocol and message type, FIG. 6D shows an example implementation in which resource selection depends on message characteristic, and the message characteristic is only message type.

Figure 6E:
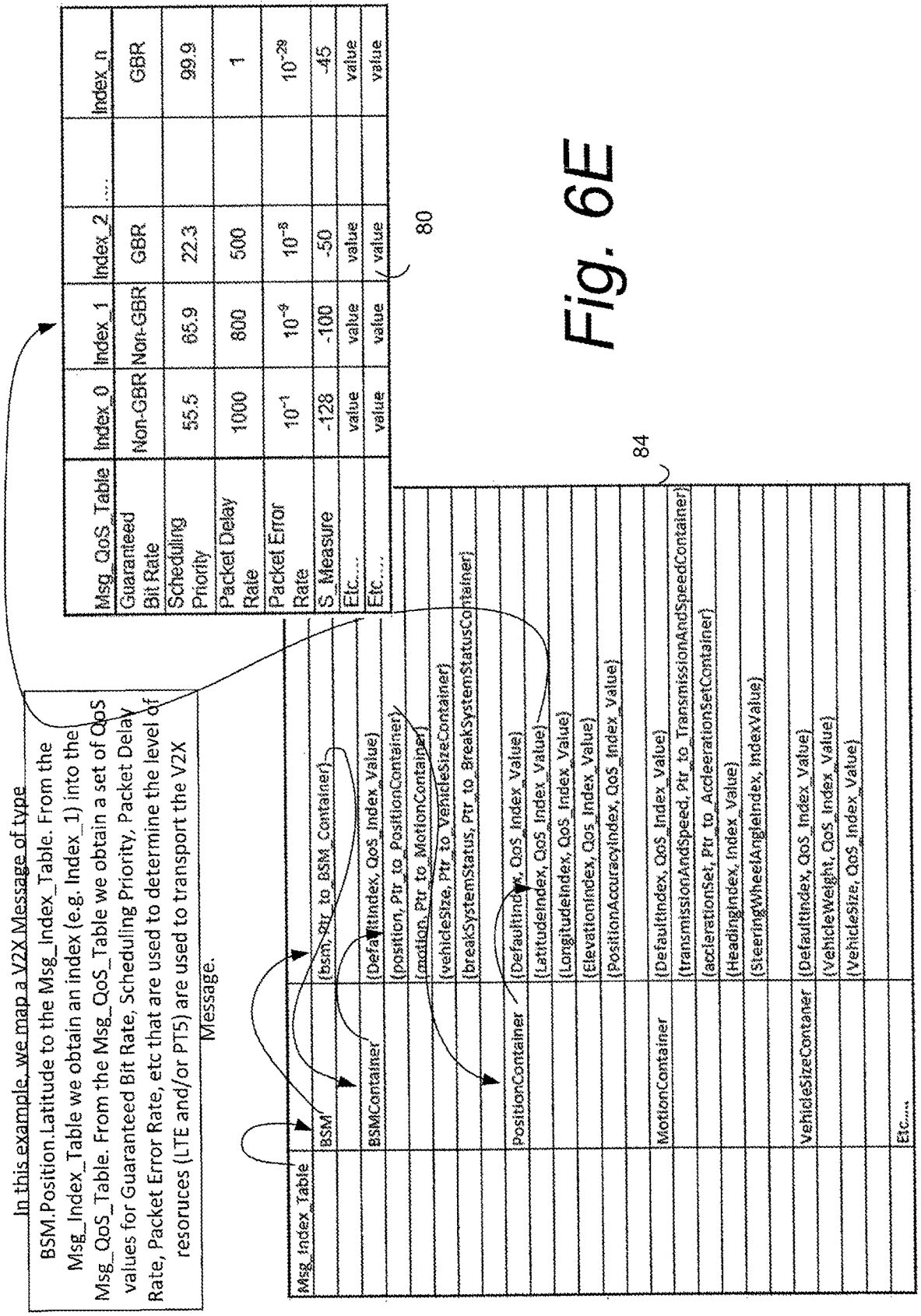
FIG. 6E is a diagrammatic view of an example Message Quality of Service Table and example Message Index Table which illustrates example elements of the tables in an example scenario for a BSM.Position.Latitude message.

FIG. 6E shows another example, non-limiting implementation including a portion of a Message Quality of Service Table 80 and portion of a Message Index Table 84, and showing in more detail example contents of elements of the Message Quality of Service Table 80 and the Message Index Table 84. In showing a partial Message Quality of Service Table 80, FIG. 6E illustrates only a portion of the Message Quality of Service Table 80 which may pertain to a BSM (Basic Safety Message). FIG. 6E shows that the BSM (Basic Safety Message) may comprise plural containers, such as BSMContainer, PositionContainer, MotionContainer, and VehicleSizeContainer. The BSM container includes pointers within Message Quality of Service Table 80 to the other containers. Each of the other containers, e.g., PositionContainer, MotionContainer, and VehicleSizeContainer, include constituent elements, and many of those elements include an associated index, e.g., Index or Index_Value). In the particularly example shown in FIG. 6E, the V2X message has a message type of BSM.Position.Latitude. Upon entering the Message Index Table 84, as shown by the arrows in FIG. 6E the V2X resource selection controller 54 proceeds through Message Index Table 84 to find the PositionContainer, and in the PositionContainer locates the element corresponding to Latitude, e.g., Latitudeindex, QoS index_value) from which the V2X resource selection controller 54 obtains the Index "Qos Index_Value". For this particular scenario, the Qos Index_Value has the value Index_1, which directs the V2X resource selection controller 54 to the Index_1 column of Message Quality of Service Table 80. From the Index_1 column of Message Quality of Service Table 80 the V2X resource selection controller 54 is able to obtain the threshold, e.g., a set or triology of thresholds, which are appropriate for use in selecting a resource for the BSM.Position.Latitude message. FIG. 6E further shows example numerical values for the threshold(s) for the BSM.Position.Latitude message as may be obtained from the Index_1 column of Message Quality of Service Table 80. In view of the fact that each set of thresholds, each column of Message Quality of Service Table 80, comprises plural thresholds, e.g., a threshold for error rate, a threshold for delay rate, and a threshold for RSRP, for example, each set may be viewed as representing or providing a composite threshold which is essentially the union or superposition of all thresholds of the set. If FIG. 6E were viewed as an implementation of FIG. 6B but including example numerical values, in pointing to the second column of FIG. 6E the index arrow pointing to Index_1 essentially designates a threshold, which is the union of the three separate thresholds T-ERROR RATE$_2$, T-DELAY RATE$_2$, and T-RSRP$_2$ of FIG. 6B. Such composite threshold is herein also referred to more simply as "threshold".

Since the Message Quality of Service Table 80 shown in FIG. 6E is merely partial, it should be understood that other types of messages, e.g., other types of SAE J2735 messages, Cooperative Awareness Messages (CAM) protocol messages, and Decentralized Environmental Notification Message (DENM) messages may also be listed in Message Quality of Service Table 80, although not shown as such in FIG. 6E.

How the V2X resource selection controller 54 uses the index pointed-to threshold set for making a selection of radio resources is described, for an example implementation, with reference to FIG. 7A—FIG. 7D.

Figure 7A:
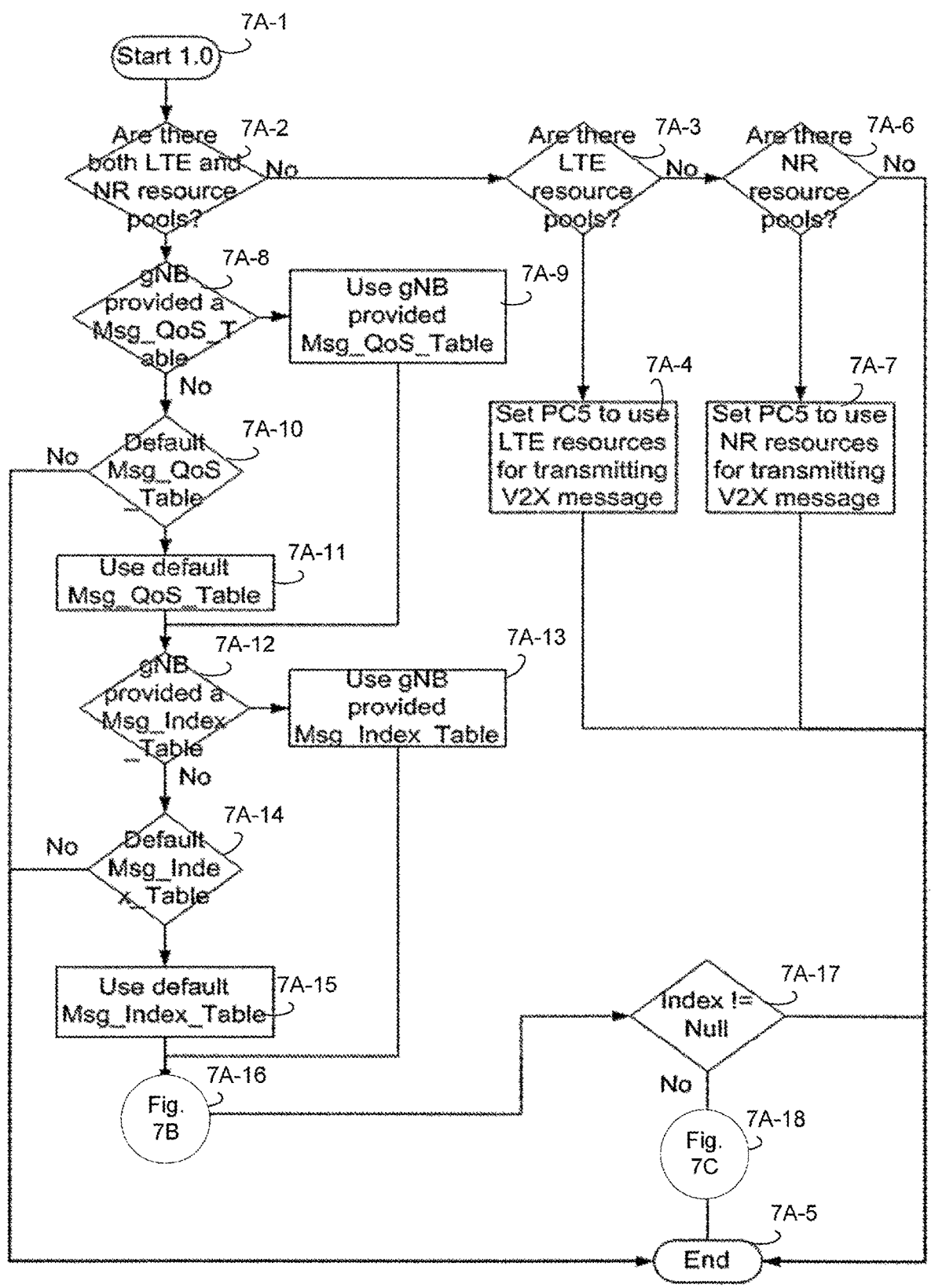
FIG. 7A is a flowchart depicting example, representative, basic acts or steps implemented in an example embodiment and mode of a V2X message resource selection procedure.
Figure 7B:
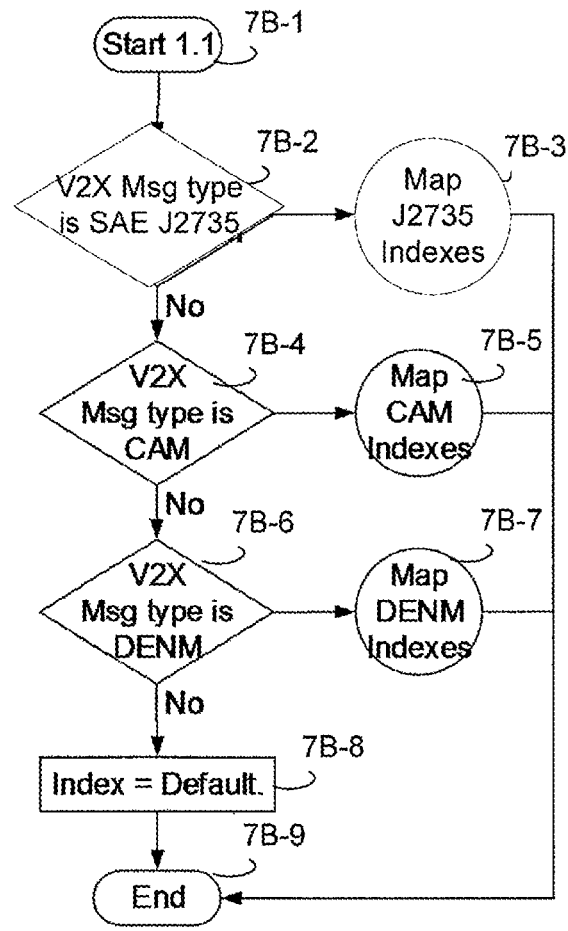
FIG. 7B is a flowchart depicting example, representative, basic acts or steps implemented in an example embodiment and mode of a V2X message resource selection procedure.
Figure 7C:
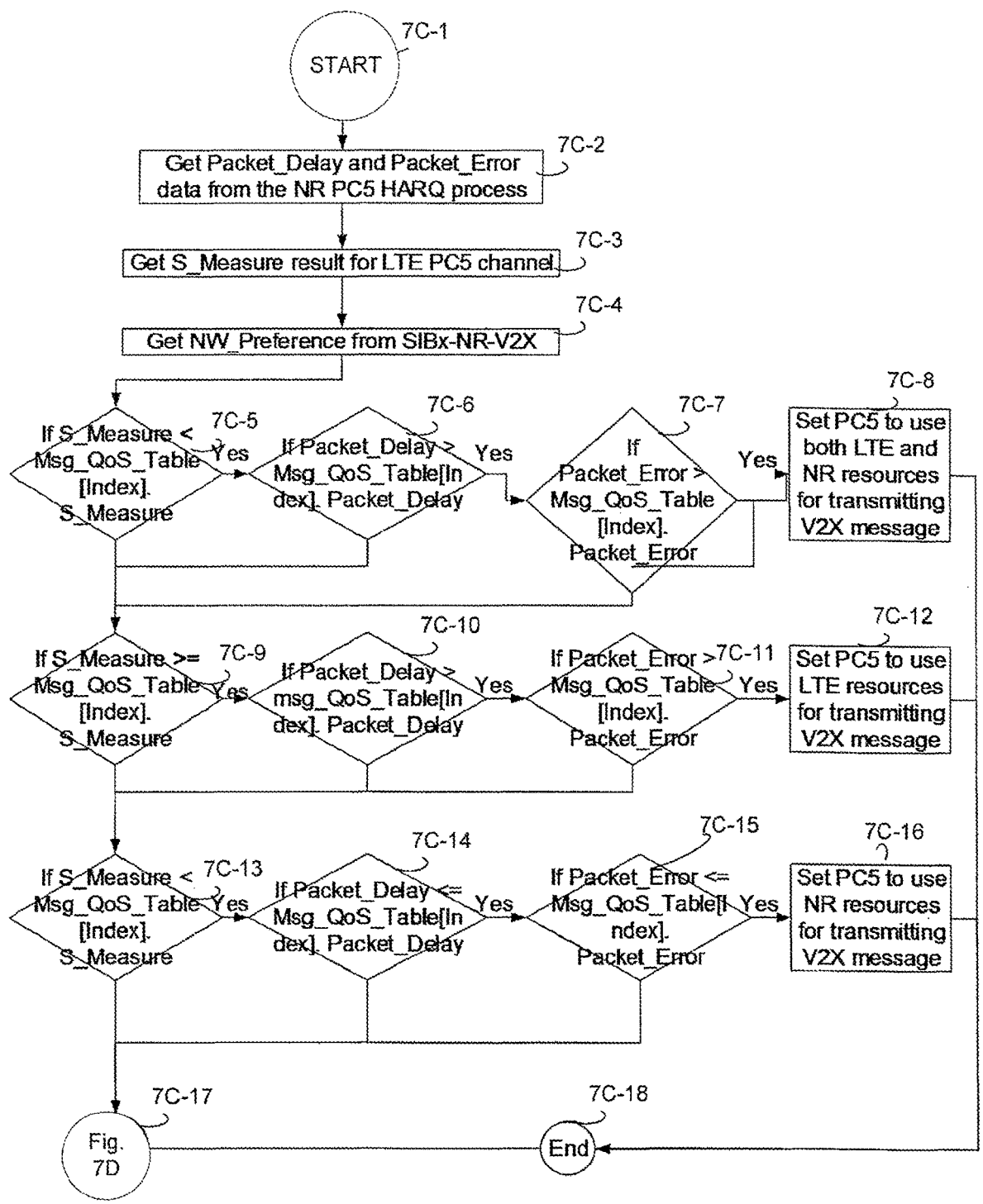
FIG. 7C is a flowchart depicting example, representative, basic acts or steps implemented in an example embodiment and mode of a V2X message resource selection procedure.

FIG. 7A describes an example, non-limiting, embodiment and mode of an instance of a V2X message characteristic-dependent resource selection procedure 70. For sake of discussion, in each of FIG. 7A, FIG. 7B, and FIG. 7C, it is presumed that, by way of non-limiting example, an instance of the V2X message characteristic-dependent resource selection procedure 70 is executed for the purpose of selecting resources for a V2X basic safety message (BSM). Certain aspects of a V2X basic safety message (BSM) have been described above. It should be understood that the example of a BSM (Basic Safety Message) is illustrated in FIG. 7A, FIG. 7B, and FIG. 7C just to represent or typify the selection of resources of any appropriate V2X message, e.g., any type of V2X message. Thus the technology disclosed herein, although encompassing the BSM (Basic Safety Message), is not limited thereto. Moreover, the instance of the V2X message characteristic-dependent resource selection procedure 70 is described herein by way of example as using New Radio as a first radio technology type and LTE as a second radio technology type. It should be understood that these radio technology types are merely illustrative and representative, and that in other embodiments and modes one or more other radio technologies may be utilized instead.

The beginning of the V2X message characteristic-dependent resource selection procedure 70 is indicated by act 7A-1. The V2X message characteristic-dependent resource selection procedure 70 is executed when the wireless terminal 26 realizes that a V2X message is to be transported. When a V2X message is to be sent, V2X message characteristic-dependent resource selection procedure 70 checks at act 7A-2 whether both LTE and NR resource pools are available to be utilized, if justified by the conditions imposed on V2X message characteristic-dependent resource selection procedure 70. If both LTE and NR resource pools are not available, V2X message characteristic-dependent resource selection procedure 70 continues its execution at act 7A-3. In other words, if only one of LTE resource pools and NR resource pools are available, but not both, execution continues it at act 7A-3.

As act 7A-3 the V2X message characteristic-dependent resource selection procedure 70 determines whether LTE resource pools are available. If it is determined at act 7A-3 that LTE resource pools are available, as act 7A-4 the V2X message characteristic-dependent resource selection procedure 70 specifies that LTE resources are to be used for transmitting the V2X message. Thereafter, as indicated by act 5A-2 of FIG. 5A, the V2X message is transmitted by transmitter circuitry 44, after which the instance of the V2X message characteristic-dependent resource selection procedure 70 terminates at act 7A-5.

If it is determined at act 7A-3 that LTE resource pools are not available, then as act 7A-6 the V2X message characteristic-dependent resource selection procedure 70 confirms that NR resource pools are available. If act 7A-6 confirms that NR resource pools are available, as act 7A-7 the V2X message characteristic-dependent resource selection procedure 70 specifies that NR resources are to be used for transmitting the V2X message. Thereafter, as indicated by act 5A-2 of FIG. 5A, the V2X message is transmitted by transmitter circuitry 44, after which the instance of the V2X message characteristic-dependent resource selection procedure 70 terminates at act 7A-5.

Should be determined at act 7A-2 that both LTE resource pools and NR resource pools are available, as act 7A-8 the V2X message characteristic-dependent resource selection procedure 70 checks if the network, e.g., a gNB node, has provided a configured threshold table 80. As explained above, the configured threshold table 80 may also be referred to as "Msg_QoS_Table" or Message Quality of Service Table 80. If the Message Quality of Service Table 80 has been provided by the network, as act 7A-9 the V2X message characteristic-dependent resource selection procedure 70 uses the network-provided configured Message Quality of Service Table 80, e.g., the network-provided "Msg_QoS_Table" and thereafter continues execution at act 7A-12. On the other hand, if a Message Quality of Service Table 80 has not been provided by the network, as act 7A-10 the V2X message characteristic-dependent resource selection procedure 70 checks to determine if a default configured threshold table 80, e.g., a "Msg_QoS_Table" exists, e.g., has been preconfigured at user equipment 26. If there is no default Message Quality of Service Table 80, execution ends at act 7A-5. But if the default Message Quality of Service Table 80 does exist, as act 7A-11 the V2X message characteristic-dependent resource selection procedure 70 uses a default Message Quality of Service Table 80, and thereafter continues execution at act 7A-12.

As act 7A-12 the V2X message characteristic-dependent resource selection procedure 70 determines whether the network has provided a Message Index Table 84, such as that shown in FIG. 6B. If no Message Index Table 84 has been provided by the network, this instance of V2X message characteristic-dependent resource selection procedure 70 terminates at act 7A-5. If a Message Index Table 84 has been provided by the network, as act 7A-13 the V2X message characteristic-dependent resource selection uses the network-provided Message Index Table 84 to obtain a table index. If the network has not provided a Message Index Table 84, as act 7A-14 the V2X resource selection controller 54 checks to see if there is a default Message Index Table 84, e.g., a Message Index Table 84 that has been pre-stored at the wireless terminal. If there is no default Message Index Table 84, execution ends at act 7A-5. But if the default Message Index Table 84 does exist, as act 7A-15 the V2X message characteristic-dependent resource selection procedure 70 uses the default Message Index Table 84.

If a Message Index Table 84 does exist, either a network-provided Message Index Table 84 or a default Message Index Table 84, execution continues using a table index retrieval routine. A purpose of the routine of FIG. 7B is to obtain a table index from the Message Index Table 84. The person skilled in the art understands from FIG. 6B and/or FIG. 6C and/or FIG. 6D how the V2X resource selection controller 54 may use the Message Index Table 84 to obtain a table index. By way of example, acts of FIG. 7B, as indicated by act 7A-16 of FIG. 7A, may comprise an example table index retrieval routine for an implementation such as that of FIG. 6B and/or FIG. 6C, e.g., in which the message characteristic upon which resource choice is dependent includes at least message protocol. If it is determined at act 7A-17, following termination of the table index retrieval routine, that the table index retrieval routine (of FIG. 7B or any comparable routine) has failed to provide a table index, then the V2X message characteristic-dependent resource selection procedure 70 is terminated as shown by act 7A-5. On the other hand, if the table index retrieval routine does provide a table index, then the V2X message characteristic-dependent resource selection procedure 70 continues with act 7A-18, which comprises the acts of FIG. 7C.

As mentioned above, FIG. 7B shows an example, non-limiting implementation of a table index retrieval routine that may be executed as or branched to by act 7A-16 of FIG. 7A. Act 7B-1 represented the start of the table index retrieval routine of FIG. 7B. As act 7B-2, the V2X resource selection controller 54 checks if the message characteristic of the V2X message to be sent indicates that the message belongs to the SAE J2735 message protocol. If the determination of act 7B-2 is affirmative, act 7B-3, e.g., a map J2735 indexes routine, is executed to obtain a usable table index, "Index", and then the table index retrieval routine terminates as indicated by act 7B-9. If the determination of act 7B-2 is negative, as act 7B-4 V2X resource selection controller 54 checks if the message characteristic of the V2X message to be sent indicates that the message belongs to the Cooperative Awareness Messages (CAM) protocol. If the determination of act 7B-4 is affirmative, act 7B-5, e.g., a map CAM indexes ruoitine, is executed to obtain a usable table index, "Index", and then the table index retrieval routine terminates as indicated by act 7B-9. If the determination of act 7B-4 is negative, as act 7B-6 V2X resource selection controller 54 checks if the message characteristic of the V2X message to be sent indicates that the message belongs to the Decentralized Environmental Notification Message (DENM) protocol. If the determination of act 7B-6 is affirmative, act 7B-7, e.g., a map DENM indexes routine, is executed to obtain a usable table index, "Index", and then the table index retrieval routine terminates as indicated by act 7B-9. If the determination of act 7B-6 is negative, as act 7B-8 V2X resource selection controller 54 sets the table index to a default value, after which the table index retrieval routine terminates as shown by act 7B-9. The default value may, in at least some instances, be received from the network. FIG. 7B illustrates, by way of simplifying example, the three protocols SAE J2735, CAM, and DENM. If other protocols are encompassed, further checks would be made (such as acts 7B-2, 7B-4, and 7B-6) and further mapping acts (such as acts 7B-3, 7B-5, and 7B-7) for such further protocols, before assuming that all protocols had been checked and before setting the table index to the default value.

FIG. 7B shows that act 7B-3 is executed to obtain a usable table index, "Index", when the message characteristic of the V2X message indicates that the V2X message belongs to the SAE J2735 protocol; that act 7B-5 is executed to obtain a usable table index, "Index", when the message characteristic of the V2X message indicates that the V2X message belongs to the Cooperative Awareness Messages (CAM) protocol; and that act 7B-3 is executed to obtain a usable table index, "Index", when the message characteristic of the V2X message indicates that the V2X message belongs to the Decentralized Environmental Notification Message (DENM) protocol. How the V2X resource selection controller 54 determines the table index, "Index", in a simple case in which all components of the V2X message require the same quality of service is understood from one or more of FIG. 6B, FIG. 6C, and/or FIG. 6D, in accordance with respective embodiments of how the message characteristic is specified. For example, in the implementation of FIG. 6C in which all SAE J2735 message types require the same quality of service, the V2X resource selection controller 54 determines the table index from the element of the third column of Message Index Table 84 that corresponds to the SAE J2735 protocol. If the message characteristic comprises or depends on both message protocol and message type as in FIG. 6B, the V2X resource selection controller 54 also checks the second column of Message Index Table 84 to find the message type of the V2X message, and the selects the table index that corresponds to the message type of the V2X message. For example, in the example scenario of FIG. 6B in which the V2X message is a BSM (Basic Safety Message), as act 7B-3 the V2X resource selection controller 54 obtains the table index=84A to be the "Index". The retrieval of a table index for the Cooperative Awareness Messages (CAM) protocol at act 7B-5 and the retrieval of a table index for the Decentralized Environmental Notification Message (DENM) protocol at act 7B-7 are similar.

In some situations the implementation of the table index retrieval routine may not be as simple as described above. That is, in more complex situations it is possible that some V2X messages transported over the the V2X communications channel may encapsulate multiple sub-messages, and that each sub-message may be assigned a specific QoS Level. However, either the V2X communications channel transport layer or the application layer may not choose to, or be capable of, decomposing the encapsulating message into individual sub-messages for individual transport using the resources to meet the QoS assigned to each sub-message. Thus the process (aka NR_V2X_QoS) that determines the level of service provided by the NR Sidelink V2X communications channel channel, as executed e.g., by V2X resource selection controller 54, may select a single QoS Level from the plurality of sub-messages. Preferably that selected QoS Level may be the highest QoS Level of all sub-messages in the encapsulating message, and that highest QoS Level is applied to the encapsulating message and, by extension, to all the sub-messages, and thus used to select the QoS Thresholds.

Thus, in the more complex situation described above in which the V2X message encapsulates multiple sub-messages of differing quality of service levels, the act 7B-3, which obtains a usable table index, "Index", when the message characteristic of the V2X message indicates that the V2X message belongs to the SAE J2735 protocol, the act 7B-5, which obtains a usable table index, "Index", when the message characteristic of the V2X message indicates that the V2X message belongs to the Cooperative Awareness Messages (CAM) protocol; and the act 7B-7, which obtains a usable table index, "Index", when the message characteristic of the V2X message indicates that the V2X message belongs to the Decentralized Environmental Notification Message (DENM) protocol, may be more complicated. In essence, in the multiple sub-messages of differing quality of service scenario, the table index retrieval routine must check each sub-message of the V2X message in order to obtain the table index. As used herein and the code shown above, the retrieved table index is also known simply as "Index".

Thus, in an example embodiment and mode wherein the V2X message comprises sub-messages of differing quality of service requirements, the V2X resource selection controller 54 is configured to determine the level of importance that is associated with the V2X message on the basis of a sub-message having a highest quality of service requirement.

Table 3 below shows example logic that may be implemented by the table index retrieval routine for handling a V2X message that is a BSM (Basic Safety Message), when the BSM (Basic Safety Message) comprises multiple sub-messages of differing quality of service. In essence, in such complex multiple sub-messages of differing quality of service scenario, the table index retrieval routine may examine each sub-message and chose an appropriate table index, "Index", based on the sub-message that requires the greatest quality of service.

In particular, the pseudo example of Table 3 describes how the NR V2X UE identify the highest QoS Level assigned to a V2X Message of type BSM. This example represents the process "Map J2735 Index" of act 7B-3 of FIG. 7B when the message type is BSM (Basic Safety Message). Again it is mentioned that acts or logic for identifying the Index for other protocols may be understood from Table 3. In Table 3, there is a parsing of information included in quality of service information obtained for the channel that carries the V2X message. In Table 3, such quality of service information is understood to be obtained from a table known as sl-Msg Index table-r16, which is described in more detail herein.

TABLE 3

```
Index = DefaultIndex
If (sl-Msg_Index_Table == NULL)
    Exit.
If (sl-Msg_Index_Table.BSM == NULL)
    Index = BSMDefaultIndex
    Exit.
Else
    BSM = sl-Msg_Index_Table.BSM
    If (BSM.bsm == TRUE) and (V2XMsg.bsm == TRUE)
        If IndexBSM < BSM.bsm.DefaultIndex
        Then IndexBSM = BSM.bsm.DefaultIndex
        If (BSM.bsm.position == TRUE) and (V2XMsg.bsm.position == TRUE)
            If IndexBSM < BSM.bsm.position.DefaultIndex
                Then IndexBSM = BSM.bsm.position.DefaultIndex
            If (BSM.bsm.position.LatitudeIndex == TRUE) and
(V2XMsg.bsm.position.Latitude == TRUE)
                If IndexBSM < BSM.bsm.position. LatitudeIndex
                    Then IndexBSM = BSM.bsm.position. LatitudeIndex
            If (BSM.bsm.position.LongitudeIndex == TRUE) and
(V2XMsg.bsm.position.Longitude == TRUE)
                If IndexBSM < BSM.bsm.position. LongitudeIndex
                Then IndexBSM = BSM.bsm.position. LongitudeIndex
            Etc....for bsm.position container
        If (BSM.bsm.motion == TRUE) and (V2XMsg.bsm.motion == TRUE)
            If IndexBSM < BSM.bsm.motion.DefaultIndex
                Then IndexBSM = BSM.bsm.motion.DefaultIndex
            If (BSM.bsm.motion.transmissionAndSpeed == TRUE) and
(V2XMsg.bsm.motion.transmissionAndSpeed == TRUE)
                If IndexBSM < BSM.bsm.motion.trans-
missionAndSpeed.DefaultIndex
                    Then IndexBSM = SM.bsm.motion.trans-
missionAndSpeed.DefaultIndex
                If (BSM.bsm.motion.transmissionAndSpeed.Trans-
missionStateIndex == TRUE) and (V2XMsg.bsm.motion.trans-
missionAndSpeed.TransmissionState == TRUE)
                    If IndexBSM <
BSM.bsm.motion.transmissionAndSpeed.TransmissionStateIndex
                        Then IndexBSM =
SM.bsm.motion.transmissionAndSpeed.TransmissionStateIndex
                Etc....for bsm.motion.TransmissionState
            If (BSM.bsm.motion.HeadingIndex == TRUE) and
(V2XMsg.bsm.motion.Heading == TRUE)
                If IndexBSM < BSM.bsm.motion.HeadingIndex
                    Then IndexBSM = BSM.bsm.motion.HeadingIndex
            Etc....for bsm.motion container
        Etc....for bsm container
Index = IndexBSM
Exit
```

Figure 7D:
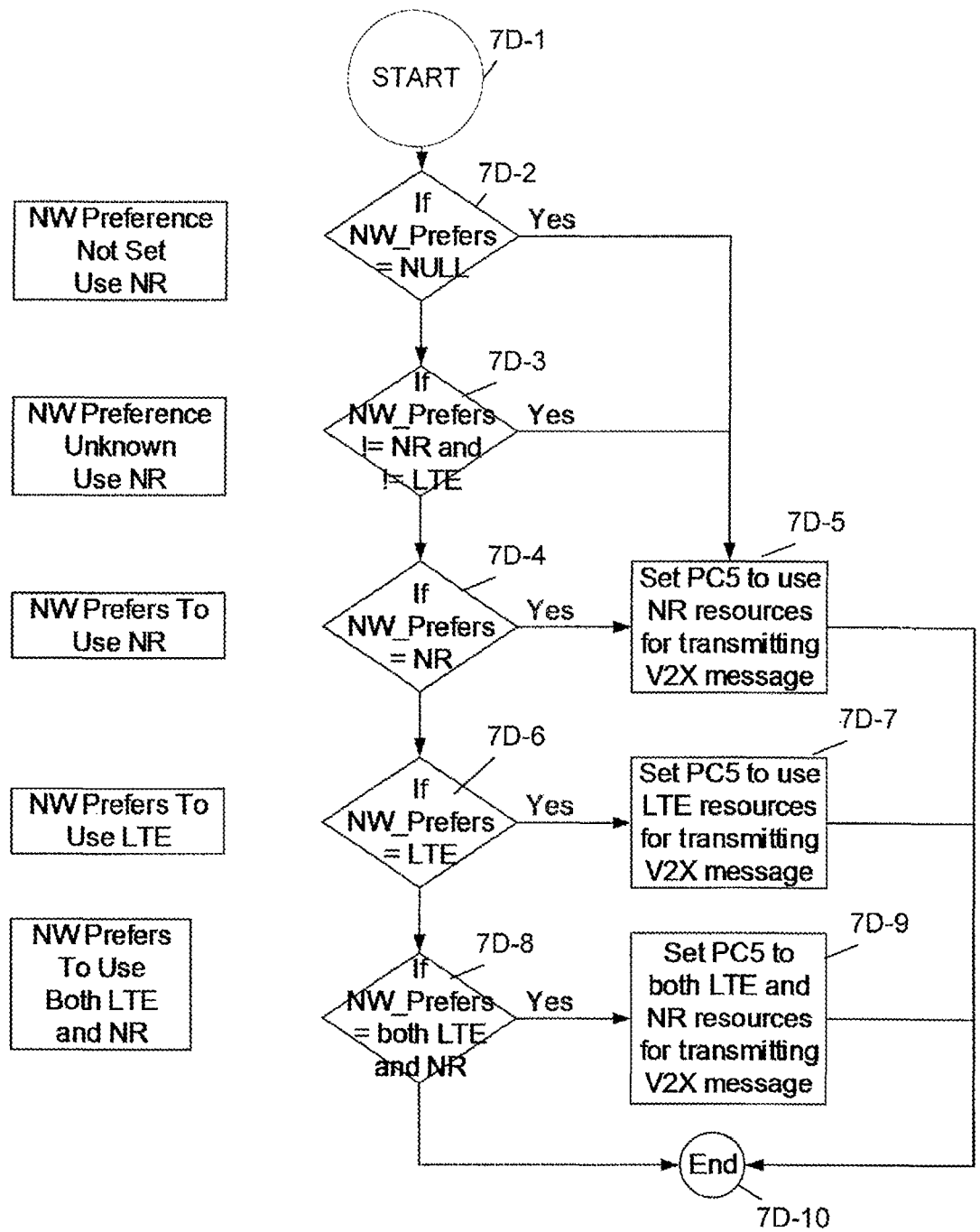
FIG. 7D is a flowchart depicting example, representative, basic acts or steps implemented in an example embodiment and mode of a V2X message resource selection procedure.
Figure 8:
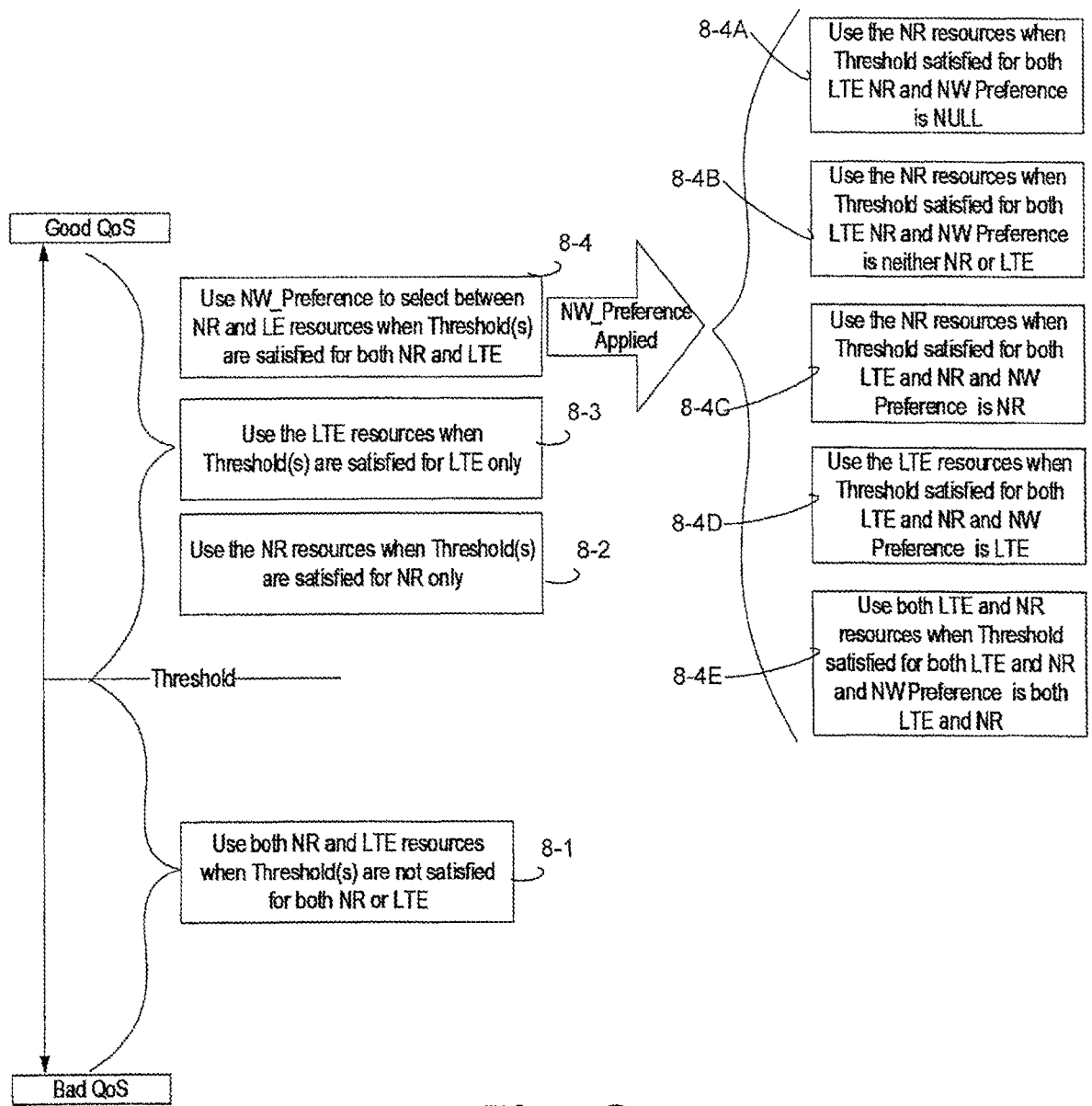
FIG. 8 is a diagrammatic view showing basic acts or steps involved in an example resource selection strategy.

Assuming that the Index value returned from the table index retrieval routine of FIG. 7B is not null, the Index returned by the table index retrieval routine is utilized in the execution of the resource selection routine of FIG. 7C, as reflected by act 7A-18 of FIG. 7A. The resource selection routine of FIG. 7C aims to implement a resource selection strategy such as that shown in FIG. 8. FIG. 8 shows, by a vertical line at its left margin, a range of QoS values, ranging from "Bad QoS" to "Good QoS". Essentially midway between the "Bad QoS" level and the "Good QoS" level is a "threshold", which represents the set of thresholds indicated by the table index, e.g., the Index value obtained from the table index retrieval routine. As previously explained, the set of thresholds selected by the Index comprises a triology of QoS values, including (1) the threshold for error rate for the V2X-utilized channel, e.g., T-error rate; (2) the threshold for delay rate for the V2X-utilized channel, e.g., T-delay rate; and, (3) the threshold for the received signal measurement for the V2X-utilized channel, e.g., T-RSRP. According to the resource selection routine of FIG. 8:

- as shown by act 8-1 the V2X resource selection controller 54 selects both NR and LTE resources when the thresholds(s) of the Index-pointed-to threshold set 88 is not satisfied for both NR and LTE.
- as shown by act 8-2 the V2X resource selection controller 54 selects only NR resources when the thresholds(s) of the Index-pointed-to threshold set 88 are satisfied for only NR.
- as shown by act 8-3 the V2X resource selection controller 54 selects only LTE resources when the thresholds(s) of the Index-pointed-to threshold set 88 are satisfied only for LTE.
- as shown by act 8-4 the V2X resource selection controller 54 uses another parameter, the Network Preference parameter 86, NW Preference, to select between NR and LTE resources when the thresholds(s) of the Index-pointed-to threshold set 88 are satisfied for both NR and LTE. In an example implementation, the Network Preference parameter 86 may have the value of NR, LTE, both NR and LTE, or null, and as also illustrated in FIG. 7D be utilized in the following manner;
  - as shown by act 8-4A the V2X resource selection controller 54 uses NR resources when the thresholds(s) of the Index-pointed-to threshold set 88 are satisfied for both NR and LTE and the Network Preference parameter 86 is null.
  - as shown by act 8-4B the V2X resource selection controller 54 uses NR resources when the thresholds(s) of the Index-pointed-to threshold set 88 are satisfied for both NR and LTE and the Network Preference parameter 86 is neither NR or LTE.
  - as shown by act 8-4C the V2X resource selection controller 54 uses NR resources when the thresholds(s) of the Index-pointed-to threshold set 88 are satisfied for both NR and LTE and the Network Preference parameter 86 is NR.
  - as shown by act 8-4D the V2X resource selection controller 54 uses LTE resources when the thresholds(s) of the Index-pointed-to threshold set 88 are satisfied for both NR and LTE and the Network Preference parameter 86 is LTE.
  - as shown by act 8-4E the V2X resource selection controller 54 uses both NR and LTE resources when the thresholds(s) of the Index-pointed-to threshold set 88 are satisfied for both NR and LTE and the Network Preference parameter 86 is both NR and LTE.

The resource selection routine of FIG. 7C begins at act 7C-1. As act 7C-2 the V2X message characteristic-dependent resource selection procedure 70 obtains the packet delay and packet error date from the NR V2X communications channel channel HARQ process, e.g., from HARQ functionality 74. Then, as act 7C-3, the V2X message characteristic-dependent resource selection procedure 70 obtains the signal measurement, e.g., S_measure, for the LTE PC5 channel, e.g., from signal measurement functionality 76. As indicated above, the S_measure may be, for example, referenced signal received power (RSRP). As act 7C-4 the V2X message characteristic-dependent resource selection procedure 70 obtains Network Preference parameter 86.

FIG. 7C shows the V2X message characteristic-dependent resource selection procedure 70 as act 7C-5 checking to determine if the signal measurement is less than the respective indexed-indicated threshold RSRP pointed to by the Index A. The indexed-indicated threshold RSRP pointed to by the Index A is represented by Msg_QoS_Table[Index]

.S_Measure. In the symbol of act 7C-5, "Msg_QoS_Table" is understood to be the Message Quality of Service Table 80, "Index" is understood to point to a particular threshold set 88 of Message Quality of Service Table 80, and "S Measure" is understood to be the one member of the threshold of the pointed-to threshold set 88 that pertains to RSRP. If the determination of act 7C-5 is affirmative, as act 7C-6 the V2X message characteristic-dependent resource selection procedure 70 checks to determine if the HARQ-reported delay rate, Packet Delay, exceeds the respective indexed-indicated threshold T-DELAY_RATE pointed to by the Index. In the symbol of act 7C-6, "Msg_QoS_Table" is again understood to be the Message Quality of Service Table 80, "Index" is again understood to point to a particular threshold set 88 of Message Quality of Service Table 80, and "Packet delay" is understood to be the one member of the threshold of the pointed-to threshold set 88 that pertains to the T-DELAY RATE of the threshold set 88. If the determination of act 7C-6 is affirmative, as act 7C-7 the V2X message characteristic-dependent resource selection procedure 70 checks to determine if the HARQ-reported error rate, Packet Error, exceeds the respective indexed-indicated threshold T-ERROR RATE pointed to by the Index. In the symbol of act 7C-7, "Msg_QoS_Table" is again understood to be the Message Quality of Service Table 80, "Index" is again understood to point to a particular threshold set 88 of Message Quality of Service Table 80, and "Packet Error" is understood to be the one member of the threshold of the pointed-to threshold set 88 that pertains to the T-ERROR RATE of the threshold set 88. If the determinations of act 7C-5, 7C-6, and 7C-7 are all affirmative, then the composite threshold of the threshold set 88 pointed to by the Index is not satisfied for both LTE and NR. Accordingly, as shown by act 7C-8 of FIG. 7C, the V2X communications channel Interface is set to use both LTE and NR resources for transmitting the V2X message. Such is consistent with FIG. 8A which shows, with quality of service not exceeding the threshold, both NR and LTE resources are utilized for transmitting the V2X message over the V2X communications channel.

On the other hand, if the determinations of any of act 7C-5, 7C-6, and 7C-7 are negative then act 7C-9 is next executed. FIG. 7C shows the V2X message characteristic-dependent resource selection procedure 70 in act 7C-9 checking to determine if the signal measurement equals or exceeds the respective indexed-indicated threshold RSRP pointed to by the Index. If the determination of act 7C-9 is affirmative, as act 7C-10 the V2X message characteristic-dependent resource selection procedure 70 checks to determine if the HARQ-reported delay rate, Packet_Delay, exceeds the respective indexed-indicated threshold T-DELAY_RATE pointed to by the Index. If the determination of act 7C-10 is affirmative, as act 7C-11 the V2X message characteristic-dependent resource selection procedure 70 checks to determine if the HARQ-reported error rate, Packet Error, exceeds the respective indexed-indicated threshold T-ERROR RATE pointed to by the Index A. For the symbols of each of act 7C-9, 7C-10, ad 7C-11, "Msg_QoS_Table" is again understood to be the Message Quality of Service Table 80, "Index" is again understood to point to a particular threshold set 88 of Message Quality of Service Table 80, and S-Measure, Packet Delay, and Packet Error are understood from the preceding discussion. If the determinations of act 7C-9, 7C-10, and 7C-11 are all affirmative, then as act 7C-12 LTE resources are used for transmitting the V2X message over the V2X communications channel.

On the other hand, if any of the determinations of act 7C-9, 7C-10, and 7C-11 are negative, then act 7C-13 is next performed. FIG. 7C shows the V2X message characteristic-dependent resource selection procedure 70 as act 7C-13 checking to determine if the signal measurement is less than the respective indexed-indicated threshold RSRP pointed to by the Index. If the determination of act 7C-13 is affirmative, as act 7C-14 the V2X message characteristic-dependent resource selection procedure 70 checks to determine if the HARQ-reported delay rate, Packet Delay, equals or is less than the respective indexed-indicated threshold T-DELAY RATE pointed to by the Index. If the determination of act 7C-14 is affirmative, as act 7C-15 the V2X message characteristic-dependent resource selection procedure 70 checks to determine if the HARQ-reported error rate, Packet Error, equals or is less than the respective indexed-indicated threshold T-ERROR_RATE pointed to the Index A. If the determinations of act 7C-13, 7C-14, and 7C-15 are all affirmative, then as act 7C-16 NR resources are used for transmitting the V2X message over the V2X communications channel.

If any of the determinations of act 7C-13, 7C-14, and 7C-15 are negative, then act 7C-17 is next performed. Act 7C-17 essentially comprises the Network Preference routine of FIG. 7D. The Network Preference routine of FIG. 7D provides a method by which a NW Preference indicator is used to make a final determination on the appropriate resources to use (either NR or LTE or both NR and LTE) if the determination by thresholds, e.g., the determinations of FIG. 7C, does not produce a clear result. The Network Preference routine of FIG. 7D uses the Network Preference parameter 86, e.g., "NW_Prefers". The Network Preference routine of FIG. 7D begins with act 7D-1. Act 7D-2 comprises the V2X message characteristic-dependent resource selection procedure 70 making a determination that the Network Preference parameter 86 is not set. Act 7D-3 comprises the V2X message characteristic-dependent resource selection procedure 70 making a determination that the Network Preference parameter 86 is unknown. Act 7D-4 comprises the V2X message characteristic-dependent resource selection procedure 70 making a determination, based on the value of Network Preference parameter 86, that the network prefers to use New Radio (NR) 5G resources. If any of the determinations of act 7D-2, act 7D-3, and 7D-4 are affirmative, as act 7D-5 the V2X message characteristic-dependent resource selection procedure 70 selects New Radio (NR) 5G resources for transmission of the V2X message over the V2X communications channel.

Act 7D-6 comprises the V2X message characteristic-dependent resource selection procedure 70 making a determination, based on the value of Network Preference parameter 86, that the network prefers to use LTE resources. If the determination of act 7D-6 is affirmative, as act 7D-7 the V2X message characteristic-dependent resource selection procedure 70 selects LTE resources for transmission of the V2X message over the V2X communications channel.

Act 7D-8 comprises the V2X message characteristic-dependent resource selection procedure 70 making a determination, based on the value of Network Preference parameter 86, that the network prefers to use both NR and LTE resources. If the determination of act 7D-8 is affirmative, as act 7D-9 the V2X message characteristic-dependent resource selection procedure 70 selects both NR resources and LTE resources for transmission of the V2X message over the V2X communications channel. The end of Network Preference routine of FIG. 7D, which follows any of act 7D-5, 7D-7, and 7D-9 is indicated by act 7D-10.

The acts of FIG. 7D thus reflect the fact that the V2X resource selection controller 54 may make an attempt to make the selection using a set of thresholds associated with the characteristic of the V2X message, but in a case in which the attempt is not successful, to select radio resources in accordance with a Network Preference parameter supplied by a network. FIG. 7C shows act included in the attempt to make the selection using a set of thresholds associated with the characteristic of the V2X message. The acts of FIG. 7D illustrated that, in the case in which the attempt of FIG. 7C is not successful, the V2X resource selection controller 54 may select radio resources in accordance with the Network Preference parameter supplied by a network, e.g., Network Preference parameter 86.

After exit or end of the Network Preference routine of FIG. 7D, execution of V2X message characteristic-dependent resource selection procedure 70 returns to act 7C-18, which represents termination or end of the routine of FIG. 7C. After exit or end of the routine of FIG. 7C, execution of V2X message characteristic-dependent resource selection procedure 70 returns to act 7A-5 of FIG. 7A, which represents termination or end of the overall instance of execution of the V2X message characteristic-dependent resource selection procedure 70.

It was mentioned above that the configured threshold table 80, also known as Message Quality of Service Table 80, may be "configured by a network", e.g., transmitted to the user equipment 26 by a network. As described herein, the Message Quality of Service Table 80 may be transmitted to the user equipment 26 by a network using a unicast message or a broadcast message. A non-limiting example of a unicast message which transmits the Message Quality of Service Table 80 may be an RRC_Reconfiguration message, for example. A non-limiting example of a broadcast message which transmits the Message Quality of Service Table 80 may be system information block, SIB. These and other example messages and techniques for transmitting and receiving the Message Quality of Service Table 80 are described herein.

Figure 9:
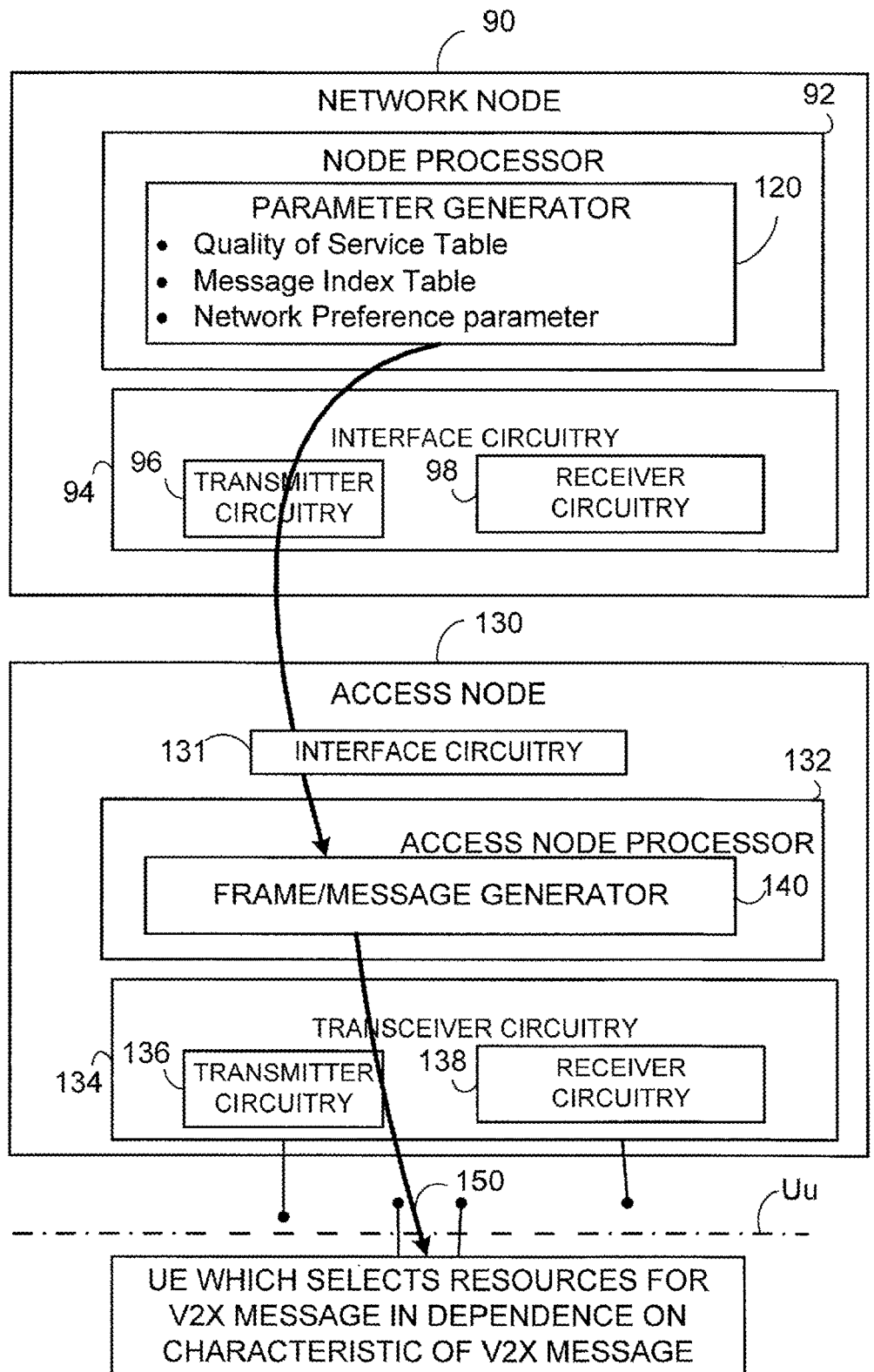
FIG. 9 is a schematic view of a network comprising a network node, an access node, and a user equipment wherein the user equipment implements a V2X message resource selection procedure based on a characteristic of a V2X message.

FIG. 9 illustrates an example, representative, generic network node 90 which generates and/or transmits information to enable user equipment 26 to select resources for a V2X message in dependence on a characteristic of the V2X message. The network node 90 comprises both node processor circuitry 92 and node interface circuitry 94. The node interface circuitry 94 may comprise node transmitter circuitry 96 and node receiver circuitry 98 for communication with other nodes and/or ultimately or immediately with user equipment 26.

FIG. 9 further shows node processor circuitry 92 as comprising parameter generator 120. The parameter generator 120 may generate one or more different types of parameters or information for transmission to the user equipment 26 in conjunction with the user equipment 26 selecting resources, depending on a characteristic of the V2X message, for use in transmitting or receiving a V2X message. Examples of the parameters that may be generated by the parameter generator 120 and which may transmitted to the user equipment 26 include the Message Quality of Service Table 80, the Message Index Table 84, and the Network Preference parameter 86. Optionally, the parameters generated by parameter generator 120 may include an indication of pools of radio resources from which the radio resource(s) for transmission and/or reception of the V2X message of the V2X communication may be selected. As explained below, the parameter(s) generated by parameter generator 120 may be transmitted to the user equipment 26 in one or more different types of messages, such as a unicast message or a broadcast message.

It should be understood that in some example embodiments and modes the parameter(s) generated by parameter generator 120 of network node 90 may actually be transmitted to user equipment 26 through the intermediary of a radio access network node, such as access node 130 shown in FIG. 9. The access node 130 may be a base station node, such as an eNodeB (e.g., eNB) or gNB, for example, or another wireless terminal. The node 130 comprises an interface 131 for communicating with the network node 90, access node processor circuitry 132, and access node transceiver circuitry 134. The access node transceiver circuitry 134 in turn comprises access node transmitter circuitry 136 and access node receiver circuitry 138. The access node processor circuitry 132 comprises access node frame/message generator 140. The access node 130 receives the parameters generated by parameter generator 120 through interface 131, and conveys same to the access node frame/message generator 140. The access node frame/message generator 140 generates the message, illustrated as message 150, which is transmitted by access node transmitter circuitry 136, for conveying to user equipment 26 the parameters that are utilized by the V2X message characteristic-dependent resource selection procedure 70.

Thus, concerning the Message Quality of Service Table 80, the network node 90 comprises parameter generator 120 which may generate, e.g., a set of thresholds. As understood from the preceding discussion, the set of thresholds may be configured for comparison by a user equipment with quality of service information obtained in conjunction with the user equipment making a selection, in dependence upon a characteristic of the V2X message, of a radio resource(s) for transmission and/or reception of a V2X message of the V2X communication.

Further, the network node 90 comprises parameter generator 120 which includes, in a message, an index table which associates a characteristic of a V2X message with an index. An example index table has been illustrated as Message Index Table 84. The index which is associated with the characteristic of the V2X message is configured for use by the wireless terminal 26 to access an appropriate set of thresholds of a table of thresholds. The table of thresholds, exemplified by Message Quality of Service Table 80, is configured for use by the wireless terminal 26 in an attempt to make a selection of a radio resource(s) for transmission and/or reception of the V2X message.

The node interface circuitry 94 of network node 90 transmits the set of thresholds, and the index table, ultimately to a node of a radio access network, such as access node 130, which is radio communication with the user equipment.

Figure 10:
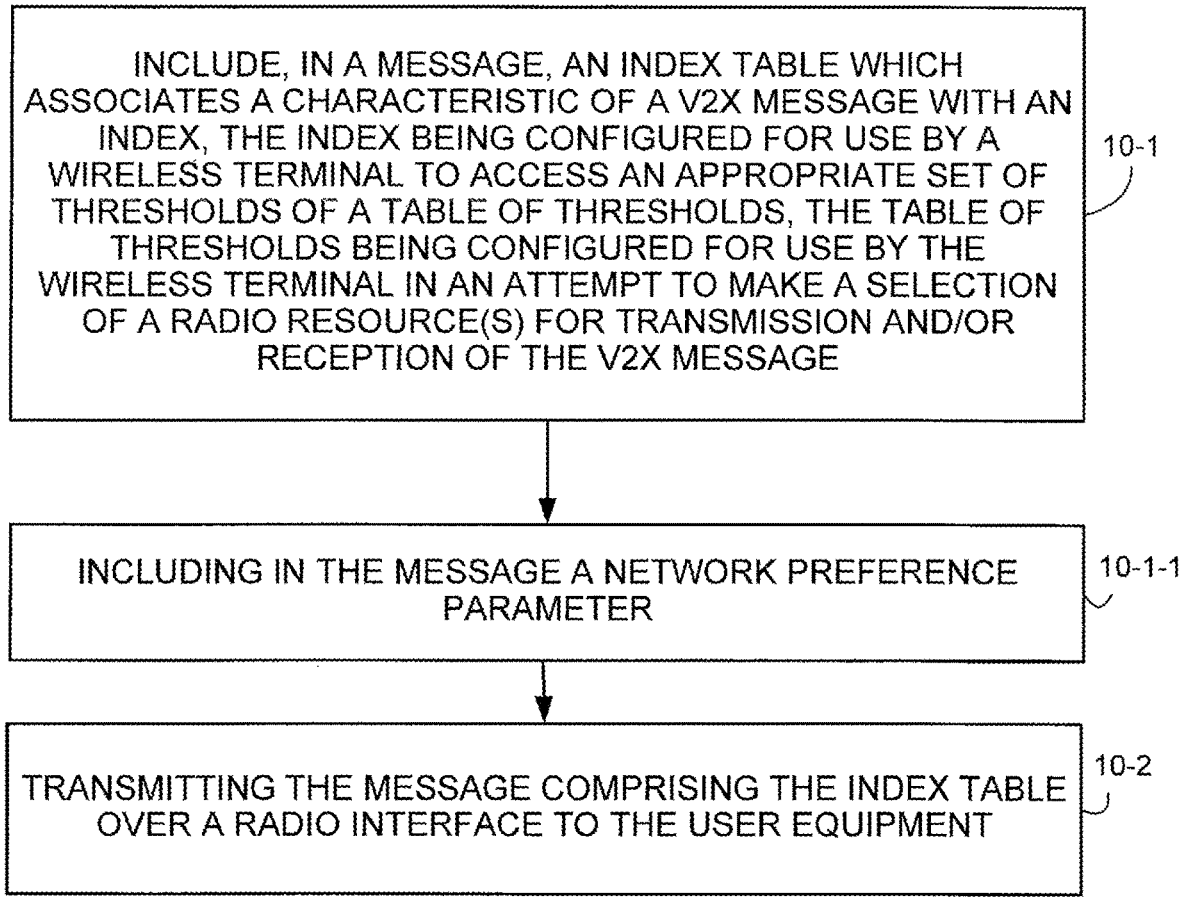
FIG. 10 is a flowchart showing example, representative, acts or steps performed by a network node of FIG. 9.

FIG. 10 illustrates example, representative, basic acts or steps performed by the network node 90 of FIG. 9. Act 10-1 comprises using processor circuitry to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message. Act 10-2 comprises transmitting the message comprising the index table over a radio interface to the user equipment.

Act 10-1-1 shows an optional act of including, in a message generated by the network node 90, a Network Preference parameter. As understood from FIG. 7D and elsewhere above, the Network Preference parameter is configured for use by the wireless terminal to select the radio resource(s) for transmission and/or reception of a V2X message when the attempt to make the selection using the table of thresholds is unsuccessful. The Network Preference parameter may be included in the same message as the index table, or another message.

One example, non-limiting role of access node 130 is thus to include parameters from network node 90 in a message, such as message 150 shown in FIG. 9, to user equipment 26. As mentioned above, the set of thresholds included in the message 150 by access node 130 is configured for comparison by user equipment 26 with quality of service information obtained in conjunction with the user equipment making a selection, dependent on a characteristic of the V2X message, of a radio resource(s) for transmission and/or reception of the V2X message of the V2X communication. The access node transmitter circuitry 136 of access node 130 serves, e.g., to transmit the message comprising the parameters obtained from the network node 90 over a radio interface, e.g., interface Uu, to the user equipment 26.

As understood from the foregoing and employed in the examples below, the QoS threshold elements may be captured in Message Quality of Service Table 80, and the thresholds are indicated by the table index(ices), e.g., an index obtained from Message Index Table 84. Each entry in Message Quality of Service Table 80 may comprise data objects. The examples of FIG. 6B-FIG. 6D show each entry, e.g., each set of thresholds 88, as comprising three data objects. More data objects may be included, such as (unillustrated in FIG. 6B and FIG. 6C, but shown in FIG. 6E) a first data object which specifies the Resource Type, which can take a value of [GRB, non-GBR]. A second data object also unillustrated in FIG. 6B and FIG. 6C but shown in FIG. 6E, is Scheduling priority, which can take a value in the range of [0.0 to 99.5]. A third data object may be Packet Delay Budget, which can take a value in the range of [0 to 1000 ms]. A fourth data object may be the Packet Error Rate, which can take a value in the range of [$10^4$ to $10^{-9}$]. The Index obtained from Message Index Table 84 points into the Message Quality of Service Table 80, and indicates which entry of Message Quality of Service Table 80 is to be used by the NR V2X QoS process.

As mentioned above, the Message Quality of Service Table 80 and/or the Message Index Table 84 may either be pre-configured at the user equipment 26 or configured by a network. Being "pre-configured" means that the table may be loaded into the UE memory 60 at time of manufacture, initial startup, or refurbishment of user equipment 26. Being "configured by a network" means that the table is transmitted to the user equipment 26 by a network using, e.g., techniques and/or messages and/or system information blocks, SIBs, as herein described.

In terms of the Message Quality of Service Table 80 and/or Message Index Table 84 being "configured by a network", in one of its example aspects the technology disclosed herein may provide configuration data into the NR V2X QoS process, e.g., the V2X message characteristic-dependent resource selection procedure 70 performed by UE V2X controller 52, by reuse and enhancement to the autonomous resource selection content of a particular information element. The particular information element that is reused and enhanced is known herein as e.g., IE SL-CommTxPool-SensingConfig-14. In yet another aspect, the technology disclosed herein also reuses a system information block (SIB), e.g., the Rel-14 SIB21, to transport the SL-CommTxPoolSensingConfig-14 information element.

In an example implementation, an information element is used to carry information regarding UE autonomous resource selection from the network to the wireless terminal. For present purpose, such information element is called "IE SL CommTxPoolSensingConfig-16". One enhancement to CommTxPoolSensingConfig-16 is the inclusion of one or more new configuration elements, e.g., Message Quality of Service Table 80, Message Index Table 84, and Network Preference parameter 86. In another of its example aspects, the technology disclosed herein carries the new IE SL CommTxPoolSensingConfig-16 in a system information block (SIB) known as, e.g., "SIBx-NR-V2X".

When the wireless terminal is pre-configured with the Message Quality of Service Table 80, a signaled Message Quality of Service Table 80 may take precedence over the pre-configuration. Moreover, the configured Message Quality of Service Table 80 and Message Index Table 84 may be sent to the wireless terminal as part of an RRC_Reconfiguration message, in which case the wireless terminal may use that data instead of the data sent in the SIBx-NR-V2X message until UE receives a new SIBx-NR-V2X from a different gNB.

Table 4 shows an example, non-limiting illustration of an information element SL-CommTxPoolSensingConfig-r16, with the addition of BSM_QoS_Table and BSM_QoS_Index_A and BSM_QoS_Index_B.

TABLE 4

```
-- ASN1START
SL-CommTxPoolSensingConfig-r16 ::= SEQUENCE {
    pssch-TxConfigList-r14              SL-PSSCH-TxConfigList-r14,
    thresPSSCH-RSRP-List-r14            SL-ThresPSSCH-RSRP-List-r14,
    restrictResourceReservationPeriod-r14
            SL-strictResourceReservationPeriodList-r14        OPTIONAL,    -- Need
        OR
    probResourceKeep-r14       ENUMERATED {v0, v0dot2, v0dot4, v0dot6,
                               v0dot8,spare3,spare2, spare1},
    p2x-SensingConfig-r14                  SEQUENCE {
        minNumCandidateSF-r14              INTEGER (1..13),
        gapCandidateSensing-r14            BIT STRING (SIZE (10))
    }         OPTIONAL,    -- Need OR
    sl-ReselectAfter-r14               ENUMERATED {n1, n2, n3, n4, n5, n6, n7, n8, n9,
                                       spare7, spare6, spare5, spare4, spare3,
    spare2,
                                       spare1}         OPTIONAL
        -- Need OR
    sl-Msg_QoS_Table-r16               SEQUENCE {
        sl-GBRTable-r16        SEQUENCE (SIZE (1..maxQoSTable)) OF
```

TABLE 4-continued

```
sl-GBRType-r16
    sl-GBRType-r16                      ENUMBERATED {GBR, non-GBR }
    sl-PriorityTable-r16     SEQUENCE (SIZE (1..maxQoSTable)) OF
sl-PriorityType-r16
    sl-PriorityType-r16                  ENUMBERATED {p000,
p001,.....p999 }
  Note that the values are interpreted in the range [0,1000): p000 = 0, p001
=00.1, ..., p999 = 99.9
    sl-PktDelayBdgtTable-r16             SEQUENCE (SIZE (1..maxQoSTable)) OF
                                         sl-PktDelayBdgtType-r16
    sl-PktDelayBdgtType-r16              ENUMBERATED {p000, p001,.....p999 }
Note that the values are interpreted in the range [0,1000): p000 = 0, p001 =1ms,
p010 = 10ms,..., p999 = 999ms
    sl-PktErrorRateTable-r16             SEQUENCE (SIZE (1..maxQoSTable)) OF
                                         sl-PktErrorRateType-r16
    sl-PktErrorRateType-r16              ENUMBERATED {p0, p1,.....p9 }
Note that the values are interpreted in the range [0,10): p0 = 10-0 ,p1 =10-1, ..., p9 = 10-9
    sl-RSRPTable-r16         SEQUENCE (SIZE (1..maxQoSTable)) of
sl-RSRPValue-r16
    sl-RSRPValue-r16         CSI-RSRP-Range-r12
}
sl-Msg_Index_table-r16                   SEQUENCE {
    CAM ::= SEQUENCE {
        header ItsPduHeader,
        cam CoopAwareness
}
    CoopAwareness ::= SEQUENCE {
        generationDeltaTime GenerationDeltaTime,
        camParameters           CamParameters
    }
    CamParameters ::= SEQUENCE {
        DefaultIndex            INTEGER (1..maxQoSTable)
            basicContainer                  BasicContainer,
            highFrequencyContainer          HighFrequencyContainer,
            lowFrequencyContainer           LowFrequencyContainer OPTIONAL,
            specialVehicleContainer SpecialVehicleContainer OPTIONAL,
            ...
        }
    HighFrequencyContainer ::= CHOICE {
        DefaultIndex                       INTEGER (1..maxQoSTable)
        basicVehicleContainerHighFrequency
BasicVehicleContainerHighFrequency,
            rsuContainerHighFrequency              RSUContainerHighFrequency,
        ...
        }
    LowFrequencyContainer ::= CHOICE {
        DefaultIndex                       INTEGER (1..maxQoSTable)
        basicVehicleContainerLowFrequency
BasicVehicleContainerLowFrequency,
        ...
        }
    SpecialVehicleContainer ::= CHOICE {
        DefaultIndex                    INTEGER (1..maxQoSTable)
        publicTransportContainer        PublicTransportContainer,
        specialTransportContainer       SpecialTransportContainer,
        dangerousGoodsContainer               DangerousGoodsContainer,
        roadWorksContainerBasic         RoadWorksContainerBasic,
        rescueContainer                 RescueContainer,
        emergencyContainer                    EmergencyContainer,
        safetyCarContainer              SafetyCarContainer,
        ...
        }
    BasicContainer ::= SEQUENCE {
        DefaultIndex       INTEGER (1..maxQoSTable)
        stationTypeIndex                INTEGER (1..maxQoSTable),
        referencePositionIndex          INTEGER (1..maxQoSTable),
        ...
        }
    BasicVehicleContainerHighFrequency ::= SEQUENCE {
        DefaultIndex                    INTEGER (1..maxQoSTable)
        headingIndex                    INTEGER (1..maxQoSTable),
        speedIndex                      INTEGER (1..maxQoSTable),
        driveDirectionIndex             INTEGER (1..maxQoSTable),
        vehicleLengthIndex                  INTEGER (1..maxQoSTable),
        vehicleWidthIndex               INTEGER (1..maxQoSTable),
        longitudinalAccelerationIndex   INTEGER (1..maxQoSTable),
        curvatureIndex                  INTEGER (1..maxQoSTable),
        curvatureCalculationModeIndex   INTEGER (1..maxQoSTable),
        yawRateIndex                    INTEGER (1..maxQoSTable),
        accelerationControlIndex        INTEGER (1..maxQoSTable)OPTIONAL,
```

TABLE 4-continued

```
        lanePositionIndex              INTEGER
(1..maxQoSTable)OPTIONAL,
        steeringWheelAngleIndex        INTEGER (1..maxQoSTable)OPTIONAL,
        lateralAccelerationIndex       INTEGER (1..maxQoSTable)OPTIONAL,
        verticalAccelerationIndex      INTEGER (1..maxQoSTable)OPTIONAL,
        performanceClassIndex          INTEGER
(1..maxQoSTable)OPTIONAL,
        cenDsrcTollingZoneIndex        INTEGER (1..maxQoSTable)OPTIONAL
        }
    BasicVehicleContainerLowFrequency ::= SEQUENCE {
        DefaultIndex    INTEGER (1..maxQoSTable)
        vehicleRoleIndex       INTEGER (1..maxQoSTable),
        exteriorLightsIndex    INTEGER (1..maxQoSTable),
        pathHistoryIndex       INTEGER (1..maxQoSTable)
        }
    PublicTransportContainer ::= SEQUENCE {
        DefaultIndex       INTEGER (1..maxQoSTable)
        embarkationStatus              INTEGER (1..maxQoSTable),
        ptActivationIndex      INTEGER (1..maxQoSTable)OPTIONAL
        }
    SpecialTransportContainer ::= SEQUENCE {
        DefaultIndex       INTEGER (1..maxQoSTable)
        specialTransportType           INTEGER (1..maxQoSTable),
        lightBarSirenInUseIndex        INTEGER (1..maxQoSTable)
        }
    DangerousGoodsContainer ::= SEQUENCE {
        DefaultIndex           INTEGER (1..maxQoSTable)
        dangerousGoodsBasicIndex       INTEGER (1..maxQoSTable)
        }
    RoadWorksContainerBasic ::= SEQUENCE {
        DefaultIndex           INTEGER (1..maxQoSTable)
        roadworksSubCauseCodeIndex     INTEGER
(1..maxQoSTable)OPTIONAL,
        lightBarSirenInUseIndex        INTEGER (1..maxQoSTable),
        closedLanesIndex                INTEGER (1..maxQoSTable)OPTIONAL
        }
    RescueContainer ::= SEQUENCE {
        DefaultIndex       INTEGER (1..maxQoSTable)
        lightBarSirenInUseIndex        INTEGER (1..maxQoSTable)
        }
    EmergencyContainer ::= SEQUENCE {
        DefaultIndex       INTEGER (1..maxQoSTable)
        lightBarSirenInUseIndex        INTEGER (1..maxQoSTable),
        incidentIndicationIndex        INTEGER (1..maxQoSTable)OPTIONAL,
        emergencyPriorityIndex         INTEGER (1..maxQoSTable)OPTIONAL
        }
    SafetyCarContainer ::= SEQUENCE {
        DefaultIndex       INTEGER (1..maxQoSTable)
        lightBarSirenInUseIndex        INTEGER (1..maxQoSTable),
        incidentIndicationIndex        INTEGER (1..maxQoSTable)OPTIONAL,
        trafficRuleIndex       INTEGER (1..maxQoSTable)OPTIONAL,
        speedLimitIndex                INTEGER (1..maxQoSTable)OPTIONAL
        }
    RSUContainerHighFrequency ::= SEQUENCE {
        DefaultIndex                   INTEGER (1..maxQoSTable)
        protectedCommunicationZonesRSUIndex    INTEGER
                                       (1..maxQoSTable)OPTIONAL,
        ...
}
DENM ::= SEQUENCE {
    header ItsPduHeader,
    denm DecentralizedEnvironmentalNotificationMessage
}
Decentralized EnvironmentalNotificationMessage ::= SEQUENCE {
    DefaultIndex    INTEGER (1..maxQoSTable)
    management          ManagementContainer,
    situation       SituationContainer OPTIONAL,
    location        LocationContainer OPTIONAL,
    alacarte        AlacarteContainer OPTIONAL
}
    ManagementContainer ::= SEQUENCE {
        DefaultIndexIndex              INTEGER (1..maxQoSTable)
        actionIDIndex                  INTEGER (1..maxQoSTable),
        detectionTimeIndex              INTEGER (1..maxQoSTable),
        referenceTimeIndex              INTEGER (1..maxQoSTable),
        terminationIndex       INTEGER
(1..maxQoSTable)OPTIONAL,
        eventPositionIndex              INTEGER (1..maxQoSTable),
        relevanceDistanceIndex         INTEGER
(1..maxQoSTable)OPTIONAL,
```

TABLE 4-continued

```
            relevanceTrafficDirectionIndex         INTEGER
(1..maxQoSTable)OPTIONAL,
            validityDuration Index                 INTEGER (1..maxQoSTable)DE
            transmissionIntervalIndex              INTEGER (1..maxQoSTable)OPTIONAL,
            stationTypeIndex                       INTEGER (1..maxQoSTable),
            ...
    }
    SituationContainer ::= SEQUENCE {
            DefaultIndex                   INTEGER (1..maxQoSTable)
            informationQualityIndex        INTEGER (1..maxQoSTable),
            eventTypeIndex                         INTEGER (1..maxQoSTable),
            linkedCauseIndex                       INTEGER (1..maxQoSTable)OPTIONAL,
            eventHistoryIndex                      INTEGER (1..maxQoSTable)OPTIONAL,
            ...
    }
    LocationContainer ::= SEQUENCE {
            DefaultIndex                   INTEGER (1..maxQoSTable)
            eventSpeedIndex                        INTEGER (1..maxQoSTable)OPTIONAL,
            eventPositionHeadingIndex              INTEGER (1..maxQoSTable)OPTIONAL,
            tracesIndex                    INTEGER (1..maxQoSTable),
            roadTypeIndex                          INTEGER (1..maxQoSTable)OPTIONAL,
            ...
    }
    ImpactReductionContainer ::= SEQUENCE {
            DefaultIndex                   INTEGER (1..maxQoSTable)
            heightLonCarrLeftIndex                 INTEGER (1..maxQoSTable),
            heightLonCarrRightIndex                INTEGER (1..maxQoSTable),
            posLonCarrLeftIndex                    INTEGER (1..maxQoSTable),
            posLonCarrRightIndex                   INTEGER (1..maxQoSTable),
            positionOfPillarsIndex                 INTEGER (1..maxQoSTable),
            posCentMassIndex                               INTEGER (1..maxQoSTable),
            wheelBaseVehicleIndex                  INTEGER (1..maxQoSTable),
            turningRadiusIndex                             INTEGER (1..maxQoSTable),
            posFrontAxIndex                        INTEGER (1..maxQoSTable),
            positionOfOccupantsIndex               INTEGER (1..maxQoSTable),
            vehicleMassIndex                       INTEGER (1..maxQoSTable),
            requestResponseIndicationIndex                 INTEGER (1..maxQoSTable)
    }
    RoadWorksContainerExtended ::= SEQUENCE {
            DefaultIndex                   INTEGER (1..maxQoSTable)
            lightBarSirenInUseIndex        INTEGER (1..maxQoSTable)OPTIONAL,
            closedLanesIndex               INTEGER
(1..maxQoSTable)OPTIONAL,
            restrictionIndex                       INTEGER (1..maxQoSTable)OPTIONAL,
            speedLimitIndex                        INTEGER
(1..maxQoSTable)OPTIONAL,
            incidentIndicationIndex                INTEGER (1..maxQoSTable)OPTIONAL,
            recommendedPathIndex                   INTEGER
(1..maxQoSTable)OPTIONAL,
            startingPointSpeedLimitIndex           INTEGER (1..maxQoSTable)OPTIONAL,
            trafficFlowRuleIndex                   INTEGER
(1..maxQoSTable)OPTIONAL,
            referenceDenmsIndex                    INTEGER
(1..maxQoSTable)OPTIONAL
    }
    StationaryVehicleContainer ::= SEQUENCE {
            DefaultIndex                   INTEGER (1..maxQoSTable)
            stationarySinceIndex           INTEGER (1..maxQoSTable)OPTIONAL,
            stationaryCauseIndex           INTEGER (1..maxQoSTable)OPTIONAL,
            carryingDangerousGoodsIndex            INTEGER (1..maxQoSTable)OPTIONAL,
            numberOfOccupantsIndex                 INTEGER
(1..maxQoSTable)OPTIONAL,
            vehicleIdentificationIndex     INTEGER (1..maxQoSTable)OPTIONAL,
            energyStorageTypeIndex         INTEGER (1..maxQoSTable)OPTIONAL
    }
    AlacarteContainer ::= SEQUENCE {
            DefaultIndex                           INTEGER (1..maxQoSTable)
            lanePositionIndex                      INTEGER (1..maxQoSTable)OPTIONAL,
            ImpactReductionIndex                   ImpactReductionContainer OPTIONAL,
            externalTemperatureIndex               INTEGER (1..maxQoSTable)OPTIONAL,
            roadWorks                              RoadWorksContainerExtended
OPTIONAL,
            positioningSolutionIndex               INTEGER (1..maxQoSTable)OPTIONAL,
            stationaryVehicle                      StationaryVehicleContainer OPTIONAL,
            ...
    }
    BSM ::= SEQUENCE {
            bsm                    BSMContainer
    }
    BSMContainer ::= SEQUENCE {
```

TABLE 4-continued

```
        DefaultIndex            INTEGER (1..maxQoSTable)
        position                PositionContainer
        motion                  MotionContainer
        breakSystemStatus       BreakeSystemStatusContainer
        vehicleSize             VehicleSizeContainer
    }
    PositionContainer ::= SEQUENCE {
        DefaultIndex            INTEGER (1..maxQoSTable)
        LatitudeIndex           INTEGER (1..maxQoSTable)
        LongitudeIndex          INTEGER (1..maxQoSTable)
        ElevationIndex          INTEGER (1..maxQoSTable)
        PositionalAccuracyIndex INTEGER (1..maxQoSTable)
    }
    MotionContainer ::== SEQUENCE {
        DefaultIndex            INTEGER (1..maxQoSTable)
        transmissionAndSpeed    TransmissionAndSpeedCantainer
        accelerationSet         AccelerationSetContainer
        HeadingIndex            INTEGER (1..maxQoSTable)
        SteeringWheelAngleIndex INTEGER (1..maxQoSTable)
    }
    BrakeSystemStatusContainer ::= SEQUENCE {
        DefaultIndex                INTEGER (1..maxQoSTable)
        BrakeAppliedStatusIndex     INTEGER (1..maxQoSTable)
        BrakeStatusNotAvailableIndex INTEGER (1..maxQoSTable)
        TractionControlStateIndex   INTEGER (1..maxQoSTable)
        AntilockBrakeStatusIndex    INTEGER (1..maxQoSTable)
        StabilityControlStatusIndex INTEGER (1..maxQoSTable)
        BrakeBoostAppliedIndex      INTEGER (1..maxQoSTable)
        AuxiliaryBrakeStatusIndex   INTEGER (1..maxQoSTable)
    }
    VehicleSizeContainer ::= SEQUENCE {
        DefaultIndex        INTEGER (1..maxQoSTable)
        VehicleWidthIndex   INTEGER (1..maxQoSTable)
        VehicleLengthIndex  INTEGER (1..maxQoSTable)
    }
    TransmissionAndSpeedContainer ::= SEQUENCE {
        DefaultIndex            INTEGER (1..maxQoSTable)
        TransmissionStateIndex  INTEGER (1..maxQoSTable)
        SpeedIndex              INTEGER (1..maxQoSTable)
    }
    AccelerationSetContainer ::= SEQUENCE {
        DefaultIndex                INTEGER (1..maxQoSTable)
        LongitudinalAccelrationIndex INTEGER (1..maxQoSTable)
        LateralAccelerationIndex    INTEGER (1..maxQoSTable)
        VerticalAccelerationIndex   INTEGER (1..maxQoSTable)
        YawRateIndex                INTEGER (1..maxQoSTable)
    }
}
sl-NW_Preference ENUMERATED {NR, LTE, BOTH_LTE_NR, spare5,
spare4,spare3,spare2, spare1} OPTIONAL
}
-- ASN1STOP
```

As described above, in an example embodiment and mode the UE 26 may perform the sidelink communication by using LTE type resources (LTE resources), NR type resources (NR resources), or LTE and NR type resources (LTE and NR resources). For example, the UE may switch the resources used for the sidelink communication, based on the conditions (e.g., the conditions configured by the gNB.

It was mentioned above that the parameter generator 120 may generate an indication of resource pools from which the resource(s) to be used for the V2X message may be selected. Accordingly:

In case that LTE resources (e.g., LTE resource pools) are used, the UE may receive, based on a parameter (e.g., v2x-RxPool-LTE), the sidelink communication (e.g., the sidelink communication monitoring). In case that LTE resources (e.g., LTE resource pools) are used, the UE may transmit, based on a parameter (e.g., v2x-TxPool-LTE), the sidelink communications. For example, if the UE is configured to receive the sidelink communication, the UE may use the LTE resources based on the parameter (e.g., v2x-RxPool-LTE). Also, if the UE is configured to transmit the sidelink communication, the UE may use the LTE resources based on the parameter (e.g., v2x-TxPool-LTE).

In case that NR resources (e.g., NR resource pools) are used, the UE may receive, based on a parameter (e.g., v2x-RxPool-NR), the sidelink communication (e.g., the sidelink communication monitoring). Also, in case that NR resources (e.g., NR resource pools) are used, the UE may transmit, based on a parameter (e.g., v2x-TxPool-NR), the sidelink communications. For example, if the UE is configured to receive the sidelink communication, the UE may use the NR resources based on the parameter (e.g., v2x-RxPool-NR). Also, if the UE is configured to transmit the sidelink communication, the UE may use the NR resources based on the parameter (e.g., v2x-TxPool-NR).

In case that LTE and/or NR resources (e.g., LTE resource pools and/or NR resource pools) are used, the UE may receive, based on a parameter (e.g., v2x-RxPool-LTE and/or v2x-RxPool-NR), the sidelink communication (e.g., the sidelink communication monitoring), as described above. Also, in case that LTE and/or NR resources (e.g., LTE resource pools and/or NR resource pools) are used, the UE may transmit, based on a parameter (e.g., v2x-TxPool-LTE, and/or v2x-TxPool-NR), the sidelink communications, as described above. For example, if the UE is configured to receive the sidelink communication, the UE may use LTE and/or NR resources based on the parameter (e.g., v2x-Rx-Pool-LTE, and/or v2x-RxPool-NR). Also, if the UE is configured to transmit the sidelink communication, the UE may use LTE and/or NR resources based on the parameter (e.g., v2x-TxPool-LTE, and/or v2x-TxPool-NR).

Thus, the parameters "v2x-TxPool-LTE", and/or "v2x-TxPool-NR" may be used for indicating the resources by which the UE is allowed to transmit the sidelink communication. Also, the parameters "v2x-RxPool-LTE", and/or "v2x-RxPool-NR" may be used for indicating the resources by which the UE is allowed to receive the sidelink communication. The maximum number of resource pools for "v2x-TxPool-LTE", "v2x-TxPool-NR", "v2x-RxPool-LTE", and/or "v2x-RxPool-NR" may be independently defined (e.g., configured). Namely, the different maximum number of pools for LTE resources (e.g., transmission pools and/or reception pools) and/or NR resources (e.g., transmission pools and/or reception pools) may be defined. Also, LTE resources (e.g., transmission pools and/or reception pools) indicated by the parameters and NR resources (e.g., transmission pools and/or reception pools) indicated by the parameters may be overlapped.

As an example of the foregoing, SIB "SIBx-NR-V2X" may include the parameters for LTE resources (e.g., LTE resources (e.g., v2x-RxPool-LTE, v2x-TxPool-LTE)) used for the sidelink communication. Also, SIB "SIBx-NR-V2X" may include the parameters for NR resources (e.g., NR resources (e.g., v2x-RxPool-NR, v2x-TxPool-NR)) used for the sidelink communication.

In a case that the parameter(s) for NR resources (e.g., v2x-RxPool-NR, v2x-TxPool-NR) is configured, the gNB may further configure a parameter(s) used for the sidelink communication.

Other parameter(s) configured by the gNB may comprise: configuration for a block comprising, at least, Primary Sidelink Synchronization Signal (PSSS), Secondary Sidelink Synchronization Signal (SSSS), Physical Broadcast Channel (PBCH), and/or Demodulation reference signal (DM-RS) associated with the PBCH.

FIG. 11 shows an example, non-limiting illustration of a SIB "SIBx-NR-V2X", e.g., a SystemInformationBlockTypeX-NR-V2X that comprises V2X sidelink communication configuration. The parameters "SL-CommRxPoolListV2X-LTE", "SL-CommTxPoolListV2X-LTE", "SL-CommRxPoolListV2X-NR", "SL-CommTxPoolListV2X-NR", utilized in FIG. 12 may each include, e.g.:

a parameter(s) used for identifying an identification for the resources (e.g., the resource pool(s)) for the sidelink transmission a parameter(s) used for indicating a periodicity for the side link transmission a parameter(s) used for indicating an offset value for the sidelink transmission a parameter(s) used for indicating a position of the resources (e.g., the resource pool(s)) for the sidelink transmission a parameter(s) used for indicating TDD configuration associated with the sidelink transmission FIG. 12 shows as example, representative illustration of a "SL-CommConfig" information element. With reference to the listing of FIG. 12, a parameter(s) "ssb-PositionsInBurst" may be used for indicating the time domain position(s) of the SSSB.

a parameter "shortBitmap" may be used for the sidelink transmission on sub 3 GHz (i.e., a frequency band(s) of sub 3 GHz).

a parameter "mediumBitmap" may be used for the sidelink transmission on 3-6 GHz (i.e., a frequency band(s) of 3-6 GHz).

a parameter "longBitmap" may be used for the sidelink transmission on above 6 GHz (i.e., a frequency band(s) of above 6 GHz).

a parameter(s) "ssb-periodicityServingCell" may be used for indicating periodicity of the SSSB.

a parameter(s) "subcarrierSpacing" may be used for indicating the SCS(s) (subcarrier spacing(s)) (e.g., the numerology) of the SSSB.

a parameter(s) "ss-PBCH-BlockPower" may be used for determining Tx power used for the SSSB transmission.

Table 5 provides a detailed description of a non-limiting, example algorithm or logic that may be implemented by V2X message characteristic-dependent resource selection procedure 70 upon reception of a SIBx-NR-V2X in accordance with an example embodiment and mode.

TABLE 5

Upon receiving SystemInformationBlockTypeX-NR-V2X, the UE shall:
1> if SystemInformationBlockTypex-NR-V2X message includes only
sl-V2X-Config-LTE:
   2> not perform HARQ feedback (e.g., ACK and/or NACK ransmission)
   2> if configured to receive V2X sidelink communication:
      3> use the resource pool indicated by v2x-RxPool-LTE in SL-V2X-Config-LTE for
V2X sidelink communication monitoring;
   2> if configured to transmit V2X sidelink communication:
      3> use the resource pool indicated by v2x-TxPool-LTE in SL-V2X-Config-LTE
for V2X sidelink communication transmission;
1> if SystemInformationBlockTypex-NR-V2X message includes only
sl-V2X-Config-NR:
   2> perform HARQ feedback (e.g., ACK and/or NACK transmission)
   2> if configured to receive V2X sidelink communication:
      3> use the resource pool indicated by v2x-RxPool-NR in SL-V2X-Config-NR for V2X
sidelink communication monitoring;
   2> if configured to transmit V2X sidelink communication:
      3> use the resource pool indicated by v2x-TxPool-NR in SL-V2X-Config-NR for
V2X sidelink communication transmission;
1> if SystemInformationBlockTypex-NR-V2X message includes both TABLE 5-continued

```
sl-V2X-Config-NR AND sl-V2X-Config-LTE:
   2> perform HARQ feedback (e.g., ACK and/or NACK transmission)
   2> if configured to transmit or receive V2X sidelink communication:
      3> if sl-V2X-Config-NR message includes SL-CommTxPoolSensingConfig-r16
         4> if SL-CommTxPoolSensingConfig-r16 message includes
sl-Msg_QoS_Table-r16
            5> use sl-Msg_QoS_Table-r16 from SL-CommTxPoolSensingConfig-r16;
         4> else
            5> if the UEs default configuration includes sl-Msg_QoS_Table-r16
               6> use sl-Msg_QoS_Table-r16 from the UEs default configuration;
            5> else
               6> exit
         4> if SL-CommTxPoolSensingConfig-r16 message includes sl-Msg_Index_Table-r16
            5> use sl-Msg_Index_Table-r16 from SL-CommTxPoolSensingConfig-r16;
         4> else
            5> if the UEs default configuration includes sl-Msg_Index_Table-r16
               6> use sl-Msg_Index_Table-r16 from the UEs default configuration;
            5> else
               6> exit
```

Figure 13:
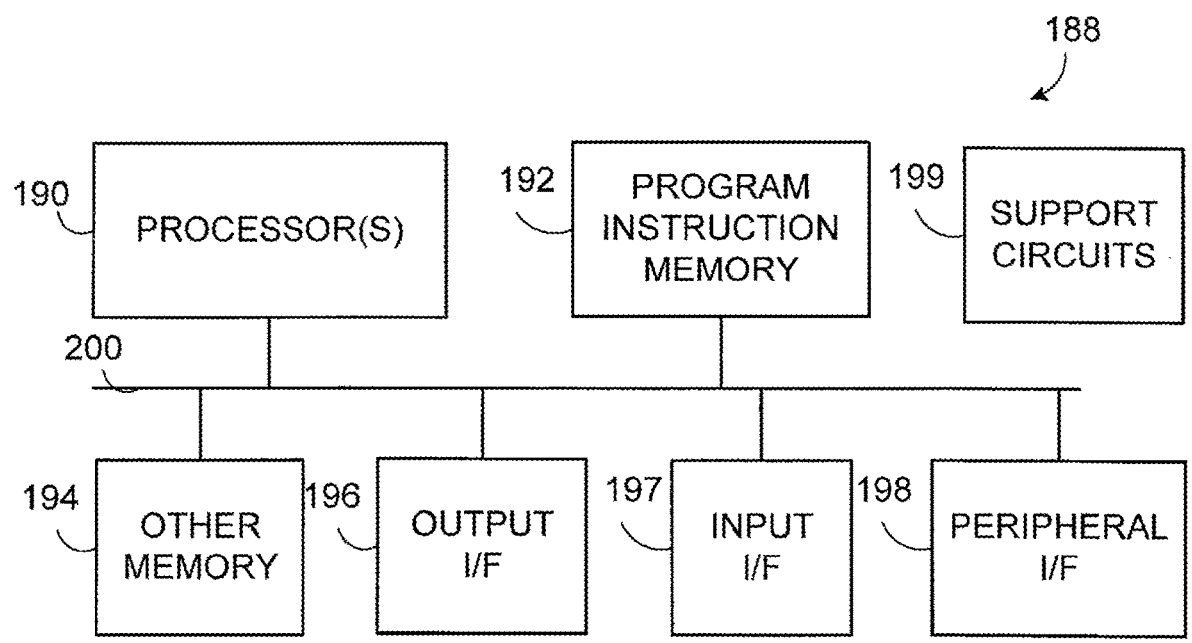
FIG. 13 is a diagrammatic view showing example elements comprising electronic machinery which may comprise a wireless terminal, a radio access node, and a core network node according to an example embodiment and mode.

Certain units and functionalities of wireless terminal 20 may be implemented by electronic machinery. For example, terminal electronic machinery 188 is shown for wireless terminal 26 in FIG. 4. The network node 90 and access node 130 similarly may employ electronic machinery. FIG. 13 shows an example of such electronic machinery as comprising one or more processors 190, program instruction memory 192; other memory 194 (e.g., RAM, cache, etc.); input/output interfaces 196 and 197, peripheral interfaces 198; support circuits 199; and busses 200 for communication between the aforementioned units. The processor(s) 190 may comprise the processor circuitries described herein, for example, the UE processor 50 of user equipment 26, the node processor circuitry 92 of network node 90, and/or the access node processor circuitry 132 of access node 130.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory 60 shown in FIG. 4. The support circuits 199 are coupled to the processors 190 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the user equipment 26 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Among its various embodiments and modes, the technology disclosed herein includes one or more of the following features and/or benefits:

- A Rel-16 NR UE process that uses data from a table of indices, where each index is associated with a specific V2X message type.
- A Rel-16 NR UE process that uses the index from the table of indices to assess a set of thresholds from the table of QoS Thresholds.
- A Rel-16 NR UE process that uses Error Rate and Delay Rate (provided by the NR Sidelink HARQ process) and RSRP (provided by the S-measure on the sidelink channel), and compares them to a set of QoS Thresholds.
- A Rel-16 NR UE process that determines if NR or LTE or both NR and LTE resources are used to transport a V2X Message, based on the QoS Level, that points to the QoS Threshold, that is compared to the UE's PC5 Error Rate and Delay Rate and RSRP.
- The QoS Configuration data is dynamically determined by a 5G Core network for transport to the UE.
- The QoS Configuration data is pre-provisioned in the UE at time of manufacture.
- The QoS Configuration data is transported to the UE by the 5G RAN via a broadcast message (i.e. a SIB).
- The QoS Configuration data is transported to the UE by the 5G RAN via a unicast a reconfiguration message.
- The broadcast QoS Configuration data has priory over pre-provisioned data.
- The unicast QoS Configuration data has priory over broadcast data, until a new broadcast QoS Configuration is received from a new macro cell.
- The QoS Configuration data is carried in a revised IE that is either broadcasted by the 5G network via a SIB, or is unicasted via a RRC reconfiguration message.

One or more features of the example embodiments and modes described herein may be used in conjunction with one or more other features, in any combination.

The following definitions and/or explanations apply to the corresponding terms as utilized herein:

- s-Measure: E-UTRAN provides this measurement configuration information element carried in the measConfig. The measConfig is transported to the UE via RRCConnectionReconfiguration or RRCConnectionResume message. The s-Measure defines when the UE is required to perform measurements. The UE is however allowed to perform measurements also when the RSRP exceeds s-Measure. When the received measConfig includes the s-Measure, the UE will set the parameter s-Measure within VarMeasConfig to the lowest value of the RSRP ranges indicated by the received value of s-Measure.
- Quality of Service (QoS): The description or measurement of the overall performance of a service, such as a telephony or computer network or a cloud computing service, particularly the performance seen by the users of the network. To quantitatively measure quality of service, several related aspects of the network service are often considered, such as packet loss, bit rate, throughput, transmission delay, availability, jitter, etc. In the field of computer networking and other packet-switched telecommunication networks, quality of service refers to traffic prioritization and resource reservation control mechanisms rather than the achieved service quality. Quality of service is the ability to provide different priority to different applications, users, or data flows, or to guarantee a certain level of performance to a data flow.
- Guaranteed Bit Rate (GBR): This parameter is used to describe a LTE bearer (PC5 in this case), and indicates the bandwidth (bit rate) to be guaranteed by the channel. It is not applied to a non-GBR bearer with no guaranteed bandwidth.
- Scheduling priority: This is a value that provides the scheduler to differentiate between different bearers. Higher-priority packets are transferred before lower-priority packets.
- Packet Delay Budget: The packet delay budget defines an upper boundary for the packet delay between the UE's (using PC5 in this case).
- Packet Error Rate: Is the percentage of packets that are lost during periods when the transport channel (PC5 in this case) is not congested.

The technology disclosed herein thus comprises and compasses the following non-exhaustive example embodiments and modes:

Example Embodiment 1: A user equipment which participates in vehicle-to-anything (V2X) communications, comprising:

processor circuitry configured to autonomously make a selection of a selected radio resource(s) for transmission and/or reception of a V2X message of the V2X communication in dependence upon a characteristic of the V2X message;

a transmitter and/or receiver configured to use the selected radio resource(s) for the transmission and/or reception of the V2X message.

Example Embodiment 2: The user equipment of Example Embodiment 1: wherein the characteristic of the V2X message comprises at least one of message protocol and message type.

Example Embodiment 3: The user equipment of Example Embodiment 1: wherein the characteristic of the V2X message comprises both message protocol and message type.

Example Embodiment 4: The user equipment of Example Embodiment 2, wherein the message protocol of the V2X message is one of SAE J2735 message, a Cooperative Awareness Messages (CAM), and a Decentralized Environmental Notification Message (DENM).

Example Embodiment 5: The user equipment of Example Embodiment 2, wherein the processor circuitry is configured to make the selection dependent upon type of message within the message protocol.

Example Embodiment 6: The user equipment of Example Embodiment 1, wherein the processor circuitry is configured to make the selection so that probability of message reception of V2X message is commensurate with a level of importance that is associated with the V2X message.

Example Embodiment 7: The user equipment of Example Embodiment 1, wherein the processor circuitry is configured to make the selection whereby resources allocated to the V2X message are commensurate with a level of importance that is associated with the V2X message.

Example Embodiment 8: The user equipment of Example Embodiment 7, wherein the V2X message comprises sub-messages of differing quality of service requirements, and wherein the processor circuitry is configured to determine the level of importance that is associated with the V2X message on the basis of a sub-message having a highest quality of service requirement.

Example Embodiment 9: The user equipment of Example Embodiment 7, wherein the processor circuitry is configured to make the selection whereby the of resources allocated to the V2X message comprises a number of protocol Resource Blocks (RBs) and a Modulation Schemes and Coding Scheme (MCS) used to transport the RBs of the V2X message.

Example Embodiment 10: The apparatus of Example Embodiment 1, wherein the processor circuitry is configured to make the selection of the radio resource(s) for transmission and/or reception of the V2X message of the V2X communication from either:
an LTE radio resource(s);
a New Radio (NR) 5G radio resource(s);
both the LTE radio resource(s) and the NR 5G radio resources.

Example Embodiment 11: The apparatus of Example Embodiment 1, wherein the processor circuitry is configured to make the selection, from radio resources of at least two radio access technologies, by making a comparison of:
quality of service information for a V2X-utilized channel obtained from each of the two radio access technologies; and
a set of thresholds comprising a respective threshold for the quality of service information obtained from each of the two radio access technologies.

Example Embodiment 12: The apparatus of Example Embodiment 11, further comprising memory circuitry, the memory circuitry comprising a configured table of plural sets of thresholds.

Example Embodiment 13: The apparatus of Example Embodiment 12, wherein at least one particular set(s) of thresholds to be used for the comparison is preconfigured at the user equipment.

Example Embodiment 14: The apparatus of Example Embodiment 12, wherein the at least one particular set(s) of thresholds to be used for the comparison by the processor circuitry is configured by a network.

Example Embodiment 15: The apparatus of Example Embodiment 14, wherein the processor circuitry is configured to determine the at least one particular set(s) of thresholds of the configured table to be used for the comparison based on a corresponding table index(ices) received by the user equipment from the network.

Example Embodiment 16: The apparatus of Example Embodiment 15, wherein the processor circuitry is configured to determine the configured table and the corresponding table index(ices) from a unicast message.

Example Embodiment 17: The apparatus of Example Embodiment 15, wherein the processor circuitry is configured to determine the configured table and the corresponding table index(ices) from a RRC_Reconfiguration message.

Example Embodiment 18: The apparatus of Example Embodiment 15, wherein the processor circuitry is configured to determine the configured table and the corresponding table index(ices) from a broadcast message.

Example Embodiment 19: The apparatus of Example Embodiment 15, wherein the processor circuitry is configured to determine the configured table and the corresponding table index(ices) from a system information block (SIB).

Example Embodiment 20: The apparatus of Example Embodiment 11, wherein the processor circuitry is configured to make an attempt to make the selection using a set of thresholds associated with the characteristic of the V2X message, but in a case in which the attempt is not successful, to select radio resources in accordance with a Network Preference parameter supplied by a network.

Example Embodiment 21: The apparatus of Example Embodiment 11, wherein the processor circuitry is configured to autonomously make the selection from radio resources of at least two radio access technologies, and wherein for a first radio access technology the quality of service information comprises error rate and delay rate for a V2X-utilized channel and for a second radio access technology the quality of service information comprises a received signal measurement for the V2X-utilized channel.

Example Embodiment 22: The apparatus of Example Embodiment 21, wherein the first radio access technology is New Radio (NR) 5G, wherein the error rate and delay rate for the first radio access technology are reported by a HARQ process, wherein the second radio access technology is Long Term Evolution (LTE), and wherein the V2X-utilized channel is a Sidelink V2X communications channel.

Example Embodiment 23: A method in a user equipment which participates in vehicle-to-anything (V2X) communications, the method comprising:
using processor circuitry configured to autonomously make a selection, from radio resources of at least two radio access technologies, of a selected radio resource(s) for transmission and/or reception of a V2X message of the V2X communication in dependence upon a characteristic of the V2X message;
using the selected radio resource(s) for the transmission and/or reception of the V2X message.

Example Embodiment 24: The method of Example Embodiment 23, wherein the characteristic of the V2X message comprises at least one of message protocol and message type.

Example Embodiment 25: The method of Example Embodiment 23, wherein the characteristic of the V2X message comprises both message protocol and message type.

Example Embodiment 26: The method of Example Embodiment 24, wherein the message protocol of the V2X message is one of SAE J2735 message, a Cooperative Awareness Messages (CAM), and a Decentralized Environmental Notification Message (DENM).

Example Embodiment 27: The method of Example Embodiment 24, further comprising making the selection dependent upon type of message within the message protocol.

Example Embodiment 27: The method of Example Embodiment 23, further comprising making the selection so that probability of message reception of V2X message is commensurate with a level of importance that is associated with the V2X message.

Example Embodiment 29: The method of Example Embodiment 23, further comprising making the selection whereby resources allocated to the V2X message are commensurate with a level of importance that is associated with the V2X message.

Example Embodiment 30: The method of Example Embodiment 29, wherein the V2X message comprises sub-messages of differing quality of service requirements, and wherein the method further comprises determining the level of importance that is associated with the V2X message on the basis of a sub-message having a highest quality of service requirement.

Example Embodiment 31: The method of Example Embodiment 29, further comprising making the selection whereby the resources allocated to the V2X message comprises a number of protocol Resource Blocks (RBs) and a Modulation Schemes and Coding Scheme (MC S) used to transport the RBs of the V2X message.

Example Embodiment 32: The method of Example Embodiment 23, further comprising making the selection of the radio resource(s) for transmission and/or reception of the V2X message of the V2X communication from either:
  an LTE radio resource(s);
  a New Radio (NR) 5G radio resource(s);
  both the LTE radio resource(s) and the NR 5G radio resources.

Example Embodiment 33: The method of Example Embodiment 23, further comprising making the selection by making a comparison of:
  quality of service information for a V2X-utilized channel obtained from each of the two radio access technologies; and
  a set of thresholds comprising a respective threshold for the quality of service information obtained from each of the two radio access technologies.

Example Embodiment 34: The method of Example Embodiment 33, further comprising providing in memory circuitry a configured table of plural sets of thresholds.

Example Embodiment 35: The method of Example Embodiment 34, further comprising preconfiguring at the user equipment at least one particular set(s) of thresholds to be used for the comparison.

Example Embodiment 36: The method of Example Embodiment 34, further comprising configuring by a network at least one particular set(s) of thresholds to be used for the comparison.

Example Embodiment 37: The method of Example Embodiment 36, further comprising determining the at least one particular set(s) of thresholds of the configured table to be used for the comparison based on a corresponding table index(ices) received by the user equipment from the network.

Example Embodiment 38: The method of Example Embodiment 37, further comprising determining the configured table and the corresponding table index(ices) from a unicast message.

Example Embodiment 39: The method of Example Embodiment 37, further comprising determining the configured table and the corresponding table index(ices) from a RRC_Reconfiguration message.

Example Embodiment 40: The method of Example Embodiment 37, further comprising determining the configured table and the corresponding table index(ices) from a broadcast message.

Example Embodiment 41: The method of Example Embodiment 37, further comprising determining the configured table and the corresponding table index(ices) from a system information block (SIB).

Example Embodiment 42: The method of Example Embodiment 33, further comprising:
  making an attempt to make the selection using a set of thresholds associated with the characteristic of the V2X message; and,
  in a case in which the attempt is not successful, selecting the radio resources in accordance with a Network Preference parameter supplied by a network.

Example Embodiment 43: The method of Example Embodiment 33, wherein for a first radio access technology the quality of service information comprises error rate and delay rate for a V2X-utilized channel and for a second radio access technology the quality of service information comprises a received signal measurement for the V2X-utilized channel.

Example Embodiment 44: The method of Example Embodiment 43, wherein the first radio access technology is New Radio (NR) 5G, wherein the error rate and delay rate for the first radio access technology are reported by a HARQ process, wherein the second radio access technology is Long Term Evolution (LTE), and wherein the V2X-utilized channel is a Sidelink V2X communications channel.

Example Embodiment 45: A node of a radio network comprising:
  processor circuitry configured to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message;
  transmitter circuitry configured to transmit the message comprising the index table over a radio interface to the user equipment.

Example Embodiment 46: Example Embodiment 45: The node of Example Embodiment 45, wherein the processor circuitry is further configured to include in the message a Network Preference parameter, the Network Preference parameter being configured for use by the wireless terminal to select the radio resource(s) for transmission and/or reception of a V2X message when the attempt to make the selection using the table of thresholds is unsuccessful.

Example Embodiment 47: The node of Example Embodiment 46, wherein a value of the Network Preference parameter is set to indicate:
  the network does not have a preference between radio resources of a first radio access technology or a second radio access technology for the V2X message;
  the network prefers to use radio resources of the first radio access technology rather than the second radio access technology for the V2X message;
  the network prefers to use radio resources of the second radio access technology rather than the first radio access technology for the V2X message;
  the network prefers to use radio resources of both the first radio access technology and the second radio access technology for the V2X message.

Example Embodiment 48: The node of Example Embodiment 45, wherein the processor circuitry is further configured to include the configured table and the corresponding table index(ices) in a unicast message.

Example Embodiment 49: The node of Example Embodiment 45, wherein the processor circuitry is further configured to include the configured table and the corresponding table index(ices) in a RRC_Reconfiguration message.

Example Embodiment 50: The node of Example Embodiment 45, wherein the processor circuitry is further configured to include the configured table and the corresponding table index(ices) in a broadcast message.

Example Embodiment 51: The node of Example Embodiment 45, wherein the processor circuitry is further configured to include the configured table and the corresponding table index(ices) in a system information block (SIB).

Example Embodiment 52: A method in a node of a radio network comprising:
  using processor circuitry to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message;

transmitting the message comprising the index table over a radio interface to the user equipment.

Example Embodiment 53: The method of Example Embodiment 52, further comprising including in the message a Network Preference parameter, the Network Preference parameter being configured for use by the wireless terminal to select the radio resource(s) for transmission and/or reception of a V2X message when the attempt to make the selection using the table of thresholds is unsuccessful.

Example Embodiment 54: The method of Example Embodiment 53, further comprising setting a value of the Network Preference parameter is set to indicate:
  the network does not have a preference between radio resources of a first radio access technology or a second radio access technology for the V2X message;
  the network prefers to use radio resources of the first radio access technology rather than the second radio access technology for the V2X message;
  the network prefers to use radio resources of the second radio access technology rather than the first radio access technology for the V2X message;
  the network prefers to use radio resources of both the first radio access technology and the second radio access technology for the V2X message.

Example Embodiment 55: The method of Example Embodiment 52, further comprising including the configured table and the corresponding table index(ices) in a unicast message.

Example Embodiment 56: The method of Example Embodiment 52, further comprising including the configured table and the corresponding table index(ices) in a RRC_Reconfiguration message.

Example Embodiment 57: The method of Example Embodiment 52, further comprising including the configured table and the corresponding table index(ices) in a broadcast message.

Example Embodiment 58: The method of Example Embodiment 52, further comprising including the configured table and the corresponding table index(ices) in a system information block (SIB).

Example Embodiment 59: A user equipment which participates in vehicle-to-anything (V2X) communications, comprising:
  processor circuitry configured to autonomously make a selection of a selected radio resource(s) for transmission and/or reception of a V2X message of the V2X communication in dependence upon a characteristic of the V2X message, wherein the characteristic of the V2X message comprises at least one of message protocol and message type;
  a transmitter and/or receiver configured to use the selected radio resource(s) for the transmission and/or reception of the V2X message.

Example Embodiment 60: The user equipment of Example Embodiment 59, wherein the characteristic of the V2X message comprises both message protocol and message type.

Example Embodiment 61: The user equipment of Example Embodiment 59, wherein the message protocol of the V2X message is one of SAE J2735 message, a Cooperative Awareness Messages (CAM), and a Decentralized Environmental Notification Message (DENM).

Example Embodiment 62: The user equipment of Example Embodiment 59, wherein the processor circuitry is configured to make the selection dependent upon type of message within the message protocol.

Example Embodiment 63: The user equipment of Example Embodiment 59, wherein the processor circuitry is configured to make the selection so that probability of message reception of V2X message is commensurate with a level of importance that is associated with the V2X message.

Example Embodiment 64: A method in user equipment which participates in vehicle-to-anything (V2X) communications, the method comprising:
  using processor circuitry to autonomously make a selection of a selected radio resource(s) for transmission and/or reception of a V2X message of the V2X communication in dependence upon a characteristic of the V2X message, wherein the characteristic of the V2X message comprises at least one of message protocol and message type;
  using the selected radio resource(s) for the transmission and/or reception of the V2X message.

Example Embodiment 65: The method of Example Embodiment 64, wherein the characteristic of the V2X message comprises both message protocol and message type.

Example Embodiment 66: The method of Example Embodiment 64, wherein the message protocol of the V2X message is one of SAE J2735 message, a Cooperative Awareness Messages (CAM), and a Decentralized Environmental Notification Message (DENM).

Example Embodiment 67: The method of Example Embodiment 64, further comprising making the selection dependent upon type of message within the message protocol.

Example Embodiment 68: The method of Example Embodiment 64, further comprising making the selection so that probability of message reception of V2X message is commensurate with a level of importance that is associated with the V2X message.

Example Embodiment 69: The method of Example Embodiment 64, further comprising making the selection whereby resources allocated to the V2X message are commensurate with a level of importance that is associated with the V2X message.

Example Embodiment 70: The method of Example Embodiment 69, further comprising making the selection whereby the resources allocated to the V2X message comprises a number of protocol Resource Blocks (RBs) and a Modulation Schemes and Coding Scheme (MC S) used to transport the RBs of the V2X message.

Example Embodiment 71: The method of Example Embodiment 64, further comprising making the selection of the radio resource(s) for transmission and/or reception of the V2X message of the V2X communication from either:
  an LTE radio resource(s);
  a New Radio (NR) 5G radio resource(s);
  both the LTE radio resource(s) and the NR 5G radio resources.

It will be appreciated that the technology disclosed herein is directed to solving radio communications-centric issues and is necessarily rooted in computer technology and overcomes problems specifically arising in radio communications. Moreover, the technology disclosed herein improves basic function of a wireless terminal, e.g., a user equipment, a network node, and a base station, so that, for example, operation of these entities may occur more effectively by prudent use of radio resources. For example, the technology disclosed herein enables the user equipment 26 to make a judicious use of radio resources for a V2X message, particularly in view of quality of service and other concerns/issues.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

<Summery>

In one example, a user equipment which participates in vehicle-to-anything (V2X) communications, comprising: processor circuitry configured to autonomously make a selection of a selected radio resource(s) for transmission and/or reception of a V2X message of the V2X communication in dependence upon a characteristic of the V2X message; a transmitter and/or receiver configured to use the selected radio resource(s) for the transmission and/or reception of the V2X message.

In one example, the user equipment, wherein the characteristic of the V2X message comprises at least one of message protocol and message type.

In one example, the user equipment, wherein the characteristic of the V2X message comprises both message protocol and message type.

In one example, the user equipment, wherein the message protocol of the V2X message is one of SAE J2735 message, a Cooperative Awareness Messages (CAM), and a Decentralized Environmental Notification Message (DENM).

In one example, the user equipment, wherein the processor circuitry is configured to make the selection dependent upon type of message within the message protocol.

In one example, the user equipment, wherein the processor circuitry is configured to make the selection so that probability of message reception of V2X message is commensurate with a level of importance that is associated with the V2X message.

In one example, the user equipment, wherein the processor circuitry is configured to make the selection whereby resources allocated to the V2X message are commensurate with a level of importance that is associated with the V2X message.

In one example, the user equipment, wherein the V2X message comprises sub-messages of differing quality of service requirements, and wherein the processor circuitry is configured to determine the level of importance that is associated with the V2X message on the basis of a sub-message having a highest quality of service requirement.

In one example, the user equipment, wherein the processor circuitry is configured to make the selection whereby the of resources allocated to the V2X message comprises a number of protocol Resource Blocks (RBs) and a Modulation Schemes and Coding Scheme (MCS) used to transport the RBs of the V2X message.

In one example, the apparatus, wherein the processor circuitry is configured to make the selection of the radio resource(s) for transmission and/or reception of the V2X message of the V2X communication from either: an LTE radio resource(s); a New Radio (NR) 5G radio resource(s); both the LTE radio resource(s) and the NR 5G radio resources.

In one example, the apparatus, processor circuitry configured to autonomously make the selection, from radio resources of at least two radio access technologies, by making a comparison of: quality of service information for a V2X-utilized channel obtained from each of the two radio access technologies; and a set of thresholds comprising a respective threshold for the quality of service information obtained from each of the two radio access technologies.

In one example, the apparatus, further comprising memory circuitry, the memory circuitry comprising a configured table of plural sets of thresholds.

In one example, the apparatus, wherein at least one particular set(s) of thresholds to be used for the comparison is preconfigured at the user equipment.

In one example, the apparatus, wherein the at least one particular set(s) of thresholds to be used for the comparison by the processor circuitry is configured by a network.

In one example, the apparatus, wherein the processor circuitry is configured to determine the at least one particular set(s) of thresholds of the configured table to be used for the comparison based on a corresponding table index(ices) received by the user equipment from the network.

In one example, the apparatus, wherein the processor circuitry is configured to determine the configured table and the corresponding table index(ices) from a unicast message.

In one example, the apparatus, wherein the processor circuitry is configured to determine the configured table and the corresponding table index(ices) from a RRC_Reconfiguration message.

In one example, the apparatus, wherein the processor circuitry is configured to determine the configured table and the corresponding table index(ices) from a broadcast message.

In one example, the apparatus, wherein the processor circuitry is configured to determine the configured table and the corresponding table index(ices) from a system information block (SIB).

In one example, the apparatus, wherein the processor circuitry is configured to make an attempt to make the selection using a set of thresholds associated with the characteristic of the V2X message, but in a case in which the attempt is not successful, to select radio resources in accordance with a Network Preference parameter supplied by a network.

In one example, the apparatus, wherein the processor circuitry is configured to autonomously make the selection from radio resources of at least two radio access technologies, and wherein for a first radio access technology the quality of service information comprises error rate and delay rate for a V2X-utilized channel and for a second radio access technology the quality of service information comprises a received signal measurement for the V2X-utilized channel.

In one example, the apparatus, wherein the first radio access technology is New Radio (NR) 5G, wherein the error rate and delay rate for the first radio access technology are reported by a HARQ process, wherein the second radio access technology is Long Term Evolution (LTE), and wherein the V2X-utilized channel is a Sidelink V2X communications channel.

In one example, a method in a user equipment which participates in vehicle-to-anything (V2X) communications, the method comprising: using processor circuitry configured to autonomously make a selection of a selected radio resource(s) for transmission and/or reception of a V2X message of the V2X communication in dependence upon a characteristic of the V2X message; using the selected radio resource(s) for the transmission and/or reception of the V2X message.

In one example, the method, wherein the characteristic of the V2X message comprises at least one of message protocol and message type.

In one example, the method, wherein the characteristic of the V2X message comprises both message protocol and message type.

In one example, the method, wherein the message protocol of the V2X message is one of SAE J2735 message, a Cooperative Awareness Messages (CAM), and a Decentralized Environmental Notification Message (DENM).

In one example, the method, further comprising making the selection dependent upon type of message within the message protocol.

In one example, the method, further comprising making the selection so that probability of message reception of V2X message is commensurate with a level of importance that is associated with the V2X message.

In one example, the method, further comprising making the selection whereby resources allocated to the V2X message are commensurate with a level of importance that is associated with the V2X message.

In one example, the method, wherein the V2X message comprises sub-messages of differing quality of service requirements, and wherein the method further comprises determining the level of importance that is associated with the V2X message on the basis of a sub-message having a highest quality of service requirement.

In one example, the method, further comprising making the selection whereby the resources allocated to the V2X message comprises a number of protocol Resource Blocks (RBs) and a Modulation Schemes and Coding Scheme (MCS) used to transport the RBs of the V2X message.

In one example, the method, further comprising making the selection of the radio resource(s) for transmission and/or reception of the V2X message of the V2X communication from either: an LTE radio resource(s); a New Radio (NR) 5G radio resource(s); both the LTE radio resource(s) and the NR 5G radio resources.

In one example, the method, further comprising making the selection by making a comparison of: quality of service information for a V2X-utilized channel obtained from each of two radio access technologies; and a set of thresholds comprising a respective threshold for the quality of service information obtained from each of the two radio access technologies.

In one example, the method, further comprising providing in memory circuitry a configured table of plural sets of thresholds.

In one example, the method, further comprising preconfiguring at the user equipment at least one particular set(s) of thresholds to be used for the comparison.

In one example, the method, further comprising configuring by a network at least one particular set(s) of thresholds to be used for the comparison.

In one example, the method, further comprising determining the at least one particular set(s) of thresholds of the configured table to be used for the comparison based on a corresponding table index(ices) received by the user equipment from the network.

In one example, the method, further comprising determining the configured table and the corresponding table index(ices) from a unicast message.

In one example, the method, further comprising determining the configured table and the corresponding table index(ices) from a RRC_Reconfiguration message.

In one example, the method, further comprising determining the configured table and the corresponding table index(ices) from a broadcast message.

In one example, the method, further comprising determining the configured table and the corresponding table index(ices) from a system information block (SIB).

In one example, the method, further comprising: making an attempt to make the selection using a set of thresholds associated with the characteristic of the V2X message; and, in a case in which the attempt is not successful, selecting the radio resources in accordance with a Network Preference parameter supplied by a network.

In one example, the method, wherein for a first radio access technology the quality of service information comprises error rate and delay rate for a V2X-utilized channel and for a second radio access technology the quality of service information comprises a received signal measurement for the V2X-utilized channel.

In one example, the method, wherein the first radio access technology is New Radio (NR) 5G, wherein the error rate and delay rate for the first radio access technology are reported by a HARQ process, wherein the second radio access technology is Long Term Evolution (LTE), and wherein the V2X-utilized channel is a Sidelink V2X communications channel.

In one example, a node of a radio network comprising: processor circuitry configured to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message; transmitter circuitry configured to transmit the message comprising the index table over a radio interface to the user equipment.

In one example, the node, wherein the processor circuitry is further configured to include in the message a Network Preference parameter, the Network Preference parameter being configured for use by the wireless terminal to select the radio resource(s) for transmission and/or reception of a V2X message when the attempt to make the selection using the table of thresholds is unsuccessful.

In one example, the node, wherein a value of the Network Preference parameter is set to indicate: the network does not have a preference between radio resources of a first radio access technology or a second radio access technology for the V2X message; the network prefers to use radio resources of the first radio access technology rather than the second radio access technology for the V2X message; the network prefers to use radio resources of the second radio access technology rather than the first radio access technology for the V2X message; the network prefers to use radio resources of both the first radio access technology and the second radio access technology for the V2X message.

In one example, the node, wherein the processor circuitry is further configured to include the configured table and the corresponding table index(ices) in a unicast message.

In one example, the node, wherein the processor circuitry is further configured to include the configured table and the corresponding table index(ices) in a RRC_Reconfiguration message.

In one example, the node, wherein the processor circuitry is further configured to include the configured table and the corresponding table index(ices) in a broadcast message.

In one example, the node, wherein the processor circuitry is further configured to include the configured table and the corresponding table index(ices) in a system information block (SIB).

In one example, a method in a node of a radio network comprising: using processor circuitry to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message; transmitting the message comprising the index table over a radio interface to the user equipment.

In one example, the method, further comprising including in the message a Network Preference parameter, the Network Preference parameter being configured for use by the wireless terminal to select the radio resource(s) for transmission and/or reception of a V2X message when the attempt to make the selection using the table of thresholds is unsuccessful.

In one example, the method, further comprising setting a value of the Network Preference parameter is set to indicate: the network does not have a preference between radio resources of a first radio access technology or a second radio access technology for the V2X message; the network prefers to use radio resources of the first radio access technology rather than the second radio access technology for the V2X message; the network prefers to use radio resources of the second radio access technology rather than the first radio access technology for the V2X message; the network prefers to use radio resources of both the first radio access technology and the second radio access technology for the V2X message.

In one example, the method, further comprising including the configured table and the corresponding table index(ices) in a unicast message.

In one example, the method, further comprising including the configured table and the corresponding table index(ices) in a RRC_Reconfiguration message.

In one example, the method, further comprising including the configured table and the corresponding table index(ices) in a broadcast message.

In one example, the method, further comprising including the configured table and the corresponding table index(ices) in a system information block (SIB).

In one example, a user equipment which participates in vehicle-to-anything (V2X) communications, comprising: processor circuitry configured to autonomously make a selection of a selected radio resource(s) for transmission and/or reception of a V2X message of the V2X communication in dependence upon a characteristic of the V2X message, wherein the characteristic of the V2X message comprises at least one of message protocol and message type; a transmitter and/or receiver configured to use the selected radio resource(s) for the transmission and/or reception of the V2X message.

In one example, the user equipment, wherein the characteristic of the V2X message comprises both message protocol and message type.

In one example, the user equipment, wherein the message protocol of the V2X message is one of SAE J2735 message, a Cooperative Awareness Messages (CAM), and a Decentralized Environmental Notification Message (DENM).

In one example, the user equipment, wherein the processor circuitry is configured to make the selection dependent upon type of message within the message protocol.

In one example, the user equipment, wherein the processor circuitry is configured to make the selection so that probability of message reception of V2X message is commensurate with a level of importance that is associated with the V2X message.

In one example, a method in user equipment which participates in vehicle-to-anything (V2X) communications, the method comprising: using processor circuitry to autonomously make a selection of a selected radio resource(s) for transmission and/or reception of a V2X message of the V2X communication in dependence upon a characteristic of the V2X message, wherein the characteristic of the V2X message comprises at least one of message protocol and message type; using the selected radio resource(s) for the transmission and/or reception of the V2X message.

In one example, the method, wherein the characteristic of the V2X message comprises both message protocol and message type.

In one example, the method, wherein the message protocol of the V2X message is one of SAE J2735 message, a Cooperative Awareness Messages (CAM), and a Decentralized Environmental Notification Message (DENM).

In one example, the method, further comprising making the selection dependent upon type of message within the message protocol.

In one example, the method, further comprising making the selection so that probability of message reception of V2X message is commensurate with a level of importance that is associated with the V2X message.

In one example, the method, further comprising making the selection whereby resources allocated to the V2X message are commensurate with a level of importance that is associated with the V2X message.

In one example, the method, further comprising making the selection whereby the resources allocated to the V2X message comprises a number of protocol Resource Blocks (RBs) and a Modulation Schemes and Coding Scheme (MCS) used to transport the RBs of the V2X message.

In one example, the method, further comprising making the selection of the radio resource(s) for transmission and/or reception of the V2X message of the V2X communication from either: an LTE radio resource(s); a New Radio (NR) 5G radio resource(s); both the LTE radio resource(s) and the NR 5G radio resources.

In one example, a user equipment which participates in vehicle-to-anything (V2X) communications, comprising: processor circuitry configured to autonomously make a selection of a selected radio resource(s) for transmission and/or reception of a V2X message of the V2X communication in dependence upon a characteristic of the V2X message; a transmitter and/or receiver configured to use the selected radio resource(s) for the transmission and/or reception of the V2X message.

In one example, the user equipment, wherein the characteristic of the V2X message comprises at least one of message protocol and message type.

In one example, the user equipment, wherein the processor circuitry is configured to make the selection so that probability of message reception of V2X message is commensurate with a level of importance that is associated with the V2X message.

In one example, the user equipment, wherein the processor circuitry is configured to make the selection whereby resources allocated to the V2X message are commensurate with a level of importance that is associated with the V2X message.

In one example, the apparatus, wherein the processor circuitry is configured to make the selection of the radio resource(s) for transmission and/or reception of the V2X message of the V2X communication from either: an LTE radio resource(s); a New Radio (NR) 5G radio resource(s); both the LTE radio resource(s) and the NR 5G radio resources.

In one example, the apparatus, processor circuitry configured to autonomously make the selection, from radio resources of at least two radio access technologies, by making a comparison of: quality of service information for a V2X-utilized channel obtained from each of the two radio access technologies; and a set of thresholds comprising a respective threshold for the quality of service information obtained from each of the two radio access technologies.

In one example, a method in a user equipment which participates in vehicle-to-anything (V2X) communications, the method comprising: using processor circuitry configured to autonomously make a selection of a selected radio resource(s) for transmission and/or reception of a V2X message of the V2X communication in dependence upon a characteristic of the V2X message; using the selected radio resource(s) for the transmission and/or reception of the V2X message.

In one example, the method, wherein the characteristic of the V2X message comprises at least one of message protocol and message type.

In one example, the method, further comprising making the selection so that probability of message reception of V2X message is commensurate with a level of importance that is associated with the V2X message.

In one example, the method, further comprising making the selection whereby resources allocated to the V2X message are commensurate with a level of importance that is associated with the V2X message.

In one example, the method, further comprising making the selection of the radio resource(s) for transmission and/or reception of the V2X message of the V2X communication from either: an LTE radio resource(s); a New Radio (NR) 5G radio resource(s); both the LTE radio resource(s) and the NR 5G radio resources.

In one example, the method, further comprising making the selection by making a comparison of: quality of service information for a V2X-utilized channel obtained from each of two radio access technologies; and a set of thresholds comprising a respective threshold for the quality of service information obtained from each of the two radio access technologies.

In one example, a node of a radio network comprising: processor circuitry configured to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message; transmitter circuitry configured to transmit the message comprising the index table over a radio interface to the user equipment.

In one example, the node, wherein the processor circuitry is further configured to include in the message a Network Preference parameter, the Network Preference parameter being configured for use by the wireless terminal to select the radio resource(s) for transmission and/or reception of a V2X message when the attempt to make the selection using the table of thresholds is unsuccessful.

In one example, the node, wherein the processor circuitry is further configured to include the configured table and the corresponding table index(ices) in a unicast message.

In one example, the node, wherein the processor circuitry is further configured to include the configured table and the corresponding table index(ices) in a broadcast message.

In one example, a method in a node of a radio network comprising: using processor circuitry to include, in a message, an index table which associates a characteristic of a V2X message with an index, the index being configured for use by a wireless terminal to access an appropriate set of thresholds of a table of thresholds, the table of thresholds being configured for use by the wireless terminal in an attempt to make a selection of a radio resource(s) for transmission and/or reception of the V2X message; transmitting the message comprising the index table over a radio interface to the user equipment.

In one example, the method, further comprising including in the message a Network Preference parameter, the Network Preference parameter being configured for use by the wireless terminal to select the radio resource(s) for transmission and/or reception of a V2X message when the attempt to make the selection using the table of thresholds is unsuccessful.

In one example, the method, further comprising including the configured table and the corresponding table index(ices) in a unicast message.

In one example, the method, further comprising including the configured table and the corresponding table index(ices) in a broadcast message.

What is claimed is:

1. A user equipment (UE) which participates in vehicle-to-anything (V2X) communications, the UE comprising:
   processor circuitry configured to autonomously make a selection of at least one radio resource for at least one of transmission or reception of a V2X message of a V2X communication based on a characteristic of the V2X message, wherein the selection of the at least one radio resource is made, from radio resources of at least two radio access technologies, by comparing quality-of-service information for a V2X-utilized channel obtained from each of the at least two radio access technologies with a set of thresholds comprising a corresponding threshold associated with the quality-of-service information obtained from each of the at least two radio access technologies; and
   at least one of a transmitter or receiver configured to use the selected at least one radio resource for the at least one of transmission or reception of the V2X message.

2. The UE of claim 1, wherein the characteristic of the V2X message comprises at least one of a message protocol and a message type.

3. The UE of claim 1, wherein the processor circuitry is further configured to make the selection such that a probability of a V2X message reception corresponds to a level of importance associated with the V2X message.

4. The UE of claim 1, wherein the processor circuitry is further configured to make the selection such that the at least one radio resource allocated to the V2X message corresponds to a level of importance associated with the V2X message.

5. The UE of claim 1, wherein one of the radio resources from which the at least one radio resource is selected comprises a Long Term Evolution (LTE) radio resource and another one of the radio resources comprises a New Radio (NR) 5G radio resource.

6. The UE of claim 1, wherein two of the radio resources from which the at least one radio resource is selected comprise either Long Term Evolution (LTE) radio resources or New Radio (NR) 5G radio resources.

7. A method for a user equipment (UE) that participates in vehicle-to-anything (V2X) communications, the method comprising:
  autonomously making a selection of at least one radio resource for at least one of transmission or reception of a V2X message of a V2X communication based on a characteristic of the V2X message, wherein the selection of the at least one radio resource is made, from radio resources of at least two radio access technologies, by comparing quality-of-service information for a V2X-utilized channel obtained from each of the at least two radio access technologies with a set of thresholds comprising a corresponding threshold associated with the quality-of-service information obtained from each of the at least two radio access technologies; and
  using the selected at least one radio resource for the at least one of transmission or reception of the V2X message.

8. The method of claim 7, wherein the characteristic of the V2X message comprises at least one of a message protocol and a message type.

9. The method of claim 7, further comprising making the selection such that a probability of a V2X message reception corresponds to a level of importance associated with the V2X message.

10. The method of claim 7, further comprising making the selection such that the at least one radio resource allocated to the V2X message corresponds to a level of importance associated with the V2X message.

11. The method of claim 7,
  wherein one of the radio resources from which the at least one radio resource is selected comprises a Long Term Evolution (LTE) radio resource and another one of the radio resources comprises a New Radio (NR) 5G radio resource.

12. The method of claim 7, wherein two of the radio resources from which the at least one radio resource is selected comprise either Long Term Evolution (LTE) radio resources or New Radio (NR) 5G radio resources.

\* \* \* \* \*